United States Patent
Garthwaite

(10) Patent No.: US 7,143,124 B2
(45) Date of Patent: Nov. 28, 2006

(54) DETECTION OF DEAD REGIONS DURING INCREMENTAL COLLECTION

(75) Inventor: Alexander T. Garthwaite, Beverly, MA (US)

(73) Assignee: Sun Microsystems, Inc., Santa Clara, CA (US)

(*) Notice: Subject to any disclaimer, the term of this patent is extended or adjusted under 35 U.S.C. 154(b) by 444 days.

(21) Appl. No.: 10/313,878

(22) Filed: Dec. 6, 2002

(65) Prior Publication Data

US 2004/0111451 A1  Jun. 10, 2004

(51) Int. Cl.
G06F 12/00 (2006.01)
G06F 17/30 (2006.01)

(52) U.S. Cl. ........................ 707/206; 707/205

(58) Field of Classification Search ................ 707/10, 707/205, 206, 100–104.1; 717/140, 148, 717/153, 159; 711/6, 133, 136, 153, 159, 711/160
See application file for complete search history.

(56) References Cited

U.S. PATENT DOCUMENTS

| | | |
|---|---|---|
| 4,724,521 A | 2/1988 | Carron et al. |
| 4,797,810 A | 1/1989 | McEntee et al. |
| 4,912,629 A | 3/1990 | Shuler, Jr. |
| 4,989,134 A | 1/1991 | Shaw |
| 5,088,036 A | 2/1992 | Ellis et al. |
| 5,333,318 A | 7/1994 | Wolf |
| 5,392,432 A | 2/1995 | Engelstad et al. |
| 5,485,613 A | 1/1996 | Engelstad et al. |
| 5,560,003 A | 9/1996 | Nilsen et al. |
| 5,687,370 A | 11/1997 | Garst et al. |
| 5,801,943 A | 9/1998 | Nasburg |
| 5,845,276 A | 12/1998 | Emerson et al. |
| 5,845,298 A | 12/1998 | O'Connor et al. |
| 5,857,210 A | 1/1999 | Tremblay et al. |
| 5,873,104 A | 2/1999 | Tremblay et al. |
| 5,873,105 A * | 2/1999 | Tremblay et al. ........... 707/206 |
| 5,900,001 A | 5/1999 | Wolczko et al. |
| 5,903,900 A * | 5/1999 | Knippel et al. ............. 707/206 |
| 5,930,807 A | 7/1999 | Ebrahim et al. |

(Continued)

FOREIGN PATENT DOCUMENTS

EP  0 904 055 A1  9/1999

(Continued)

OTHER PUBLICATIONS

Appleby, Karen: Garbage Collection for Prolog Based on WAM, Communication of the ACM, Jun. 1, 1998, vol. 31, Issue 6, pp. 719-741.*

(Continued)

Primary Examiner—Greta Robinson
Assistant Examiner—Jacques Veillard
(74) Attorney, Agent, or Firm—Kudirka & Jobse, LLP

(57) ABSTRACT

A garbage collector employs the train algorithm to collect a heap generation incrementally, collecting "car sections" in a collection order. As it updates the "remembered sets" by which it keeps track of where references to objects in respective car sections are located, it also updates oldest- and youngest-car indicators for each car section. The oldest- and youngest-car indicators for a given car section specify limits in the collection sequence beyond which references to objects in the given car have not been found. The garbage collector uses these indicators to identify cars that contain no objects that are reachable except through a reference chain that includes the collection set for the current collection increment. It adds one or more such cars to the collection set, and it collects the thus-expanded collection set without processing the remembered sets associated with the added cars.

68 Claims, 36 Drawing Sheets

U.S. PATENT DOCUMENTS

| | | | |
|---|---|---|---|
| 5,953,736 A | 9/1999 | O'Connor et al. | |
| 5,960,087 A | 9/1999 | Tribble et al. | |
| 5,999,974 A | 12/1999 | Ratcliff et al. | |
| 6,021,415 A | 2/2000 | Cannon et al. | |
| 6,047,125 A * | 4/2000 | Agesen et al. | 717/148 |
| 6,049,390 A | 4/2000 | Notredame et al. | |
| 6,049,810 A | 4/2000 | Schwartz et al. | |
| 6,065,020 A | 5/2000 | Dussud | |
| 6,098,089 A | 8/2000 | O'Connor et al. | |
| 6,148,309 A | 11/2000 | Azagury et al. | |
| 6,148,310 A * | 11/2000 | Azagury et al. | 707/206 |
| 6,173,294 B1 | 1/2001 | Azagury et al. | |
| 6,185,581 B1 | 2/2001 | Garthwaite | |
| 6,226,653 B1 | 5/2001 | Alpern et al. | |
| 6,243,720 B1 * | 6/2001 | Munter et al. | 707/206 |
| 6,260,120 B1 | 7/2001 | Blumenau et al. | |
| 6,289,358 B1 | 9/2001 | Mattis et al. | |
| 6,308,185 B1 | 10/2001 | Grarup et al. | |
| 6,314,436 B1 | 11/2001 | Houldsworth | |
| 6,321,240 B1 | 11/2001 | Chilimbi et al. | |
| 6,353,838 B1 | 3/2002 | Sauntry et al. | |
| 6,381,738 B1 * | 4/2002 | Choi et al. | 717/140 |
| 6,393,439 B1 | 5/2002 | Houldsworth et al. | |
| 6,415,302 B1 | 7/2002 | Garthwaite et al. | |
| 6,424,977 B1 | 7/2002 | Garthwaite | |
| 6,434,576 B1 | 8/2002 | Garthwaite | |
| 6,434,577 B1 | 8/2002 | Garthwaite | |
| 6,442,661 B1 | 8/2002 | Dreszer | |
| 6,449,626 B1 | 9/2002 | Garthwaite et al. | |
| 6,496,871 B1 | 12/2002 | Koyama et al. | |
| 6,529,919 B1 | 3/2003 | Agesen et al. | |
| 6,567,905 B1 | 5/2003 | Otis | |
| 6,640,278 B1 | 10/2003 | Nolan et al. | |
| 6,757,890 B1 * | 6/2004 | Wallman | 717/148 |
| 6,769,004 B1 | 7/2004 | Barrett | |
| 6,820,101 B1 * | 11/2004 | Wallman | 707/206 |
| 6,826,583 B1 | 11/2004 | Flood et al. | |
| 6,868,488 B1 | 3/2005 | Garthwaite | |
| 6,892,212 B1 | 5/2005 | Shuf et al. | |
| 6,928,450 B1 | 8/2005 | Mogi et al. | |
| 6,931,423 B1 | 8/2005 | Sexton et al. | |
| 2002/0032719 A1 | 3/2002 | Thomas et al. | |
| 2002/0095453 A1 | 7/2002 | Steensgaard | |
| 2002/0133533 A1 | 9/2002 | Czajkowski et al. | |
| 2002/0138506 A1 | 9/2002 | Shuf et al. | |
| 2003/0088658 A1 | 5/2003 | Davies et al. | |
| 2003/0200392 A1 | 10/2003 | Wright et al. | |
| 2003/0217027 A1 | 11/2003 | Farber et al. | |
| 2004/0010586 A1 | 1/2004 | Burton et al. | |
| 2004/0039759 A1 | 2/2004 | Detlefs et al. | |
| 2004/0215914 A1 | 10/2004 | Dussud | |

FOREIGN PATENT DOCUMENTS

| | | |
|---|---|---|
| EP | 0 969 377 A1 | 1/2000 |
| WO | WO0188713 A2 | 11/2001 |

OTHER PUBLICATIONS

Robert Courts: Improving Locality of Reference in Garbage Collecting Memory Management System, Communication of the ACM, Sep. 1988, vol. 31, No. 9, pp. 1128-1138.*

Jones and Lins, "Garbage Collection: Algorithms for Automatic Dynamic Memory Management," 1996, pp. 165-179, Wiley, New York.

Paul Wilson, "Uniprocessor Garbage Collection Techniques," Technical Report, University of Texas, 1994.

Hudson and Moss, "Incremental Collection of Mature Objects," Proceedings of International Workshop on Memory Management, 1992, Springer-Verlag.

Grarup and Seligmann, "Incremental Mature Garbage Collection," M.Sc. Thesis, Available at http://www.daimi.au.dk/~jacobse/Papers/.

Seligmann and Grarup, "Incremental Mature Garbage Collection Using the Train Algorithm," Proceedings of ECOOP '95, Ninth European Conference on Object-Oriented Programming, 1995, http://www.daimi.au.dk/~jacobse/Papers/.

Clark and Mason, "Compacting Garbage Collection can be Fast and Simple," Software-Practice and Experience, Feb. 1996, pp. 177-194, vol. 26, No. 2.

Henry Baker, "List Processing in Real Time on a Serial Computer," Communications of the ACM 21, Apr. 4, 1978, pp. 280-294.

Appel, Ellis, and Li, "Real-time Concurrent Collection on Stock Multiprocessors," ACM SIGPLAN Notices, 1988.

Rodney A. Brooks, "Trading Data Space for Reduced Time and Code Space in Real-Time Garbage Collection on Stock Hardware," Proceedings of the 1984 ACM Symposium on Lisp and Functional Programming, pp. 108-113, Aug. 1984. Austin, Texas.

Herlihy and Moss, "Lock-Free Garbage Collection for Multiprocessors," ACM SPAA, 1991, pp. 229-236.

Bacon, Attanasio, Lee, Rajan, and Smith, "Java without the Coffee Breaks: A Noninstrusive Multiprocessor Garbage Collector," SIGPLAN Conference on Programming Language Design and Implentation, Snowbird, Utah, Jun. 2001.

James Stamos, "Static Grouping of Small Objects to Enhance Performance of a Paged Virtual Memory," ACM Transactions on Computer Systems, vol. 2, No. 2, pp. 155-180, May 1984.

David A. Moon, "Garbage Collection in a Large Lisp System," Conference Record of the 1984 ACM Symposium on LISP and Functional Programming, Austin, Texas, Aug. 1984, pp. 235-246.

Robert Courts, "Improving Locality of Reference in a Garbage-Collecting Memory Management System," Communications of the ACM, Sep. 1988, pp. 1128-1138, vol. 31, No. 9.

Wilson, Lam, and Moher, "Effective Static-Graph Reorganization to Improve Locality in Garbage Collected System," Proceedings of ACM SIGPLAN Conference on Programming Language Design and Implementation, Jun. 1991, Toronto, Ontario, Canada.

Lam, Wilson, and Moher, "Object Type Directed Garbage Collection to Improve Locality," Proceedings of the International Workshop on Memory Management '92, St. Malo, France, Sep. 1992, pp. 404-425.

Chilimbi and Larus, "Using Generational Garbage Collection to Implement Cache-Conscious Data Placement," International Symposium on Memory Management, Oct. 1998.

Lieberman and Hewitt, "A real-time garbage collector based on the lifetimes of objects," Communications of the ACM, 1983, pp. 419-429, vol. 26, No. 6.

David Ungar, "Generation Scavenging: A Non-Disruptive High Performance Storage Reclamation Algorithm," ACM SIGPLAN Notices, Apr. 1984, pp. 157-167, vol. 19, No. 5.

Andrew W. Appel, "Simple Generational Garbage Collection and Fast Allocation," Software Practice and Experience, 1989, pp. 171-183, vol. 19, No. 2.

Hudson and Diwan, "Adaptive Garbage Collection for Modula-3 and Smalltalk," in OOPSLA/ECOOP Workshop on Garbage Collection in Object-Oriented Systems, Oct. 1990, Edited by Eric Jul and Niels-Cristial Juul.

Hudson and Hosking, "Remembered sets can also play cards," in OOPSLA/ECOOP Workshop on Garbage Collection in Object-Oriented Systems, Oct. 1993, Edited by Moss, Wilson, and Zorn.

Hosking and Moss, "Protection traps and alternatives for memory management of an object-oriented language," ACM Proceedings of the Fourteenth ACM Symposium on Operating Systems Principles, Dec. 1993, pp. 106-119, vol. 27, No. 5.

Hosking, Moss, and Stefanovic, "A Comparative Performance Evaluation of Write Barrier Implementation," in OOPSLA ACM Conference on Object-Oriented Programming, Systems, Languages, and Applications, Oct. 1992, pp. 92-109, vol. 27, No. 10, ACM SIGPLAN Notices, Vancouver, BC, ACM Press.

Patrick G. Sobalvarro, "A Lifetime-based Garbage Collector for LISP Systems on General-Purpose Computers," Massachusetts Institute of Technology, AITR-1417, 1988.

U.S. Appl. No. 10/287,851, filed Nov. 5, 2002, Garthwaite et al.

Arora, et al., "Thread Scheduling for Multiprogrammed Multiprocessors", Proceedings of the 10th Annual ACM Symposium on Parallel Algorithms and Architecture, Jun. 1998.

Barrett, et al., "Using Lifetime Predictors to Improve Memory Allocation Performance", SIGPLAN'93 Conference on Programming Languages Design and Implementation vol. 28(6) of Notices, Jun. 1993, 187-196, ACM Press, Albuquerque, NM.

Blackburn & McKinley, "In or Out? Putting Write Barriers in Their Place", Jun. 20, 2002, Berlin.

Clark, "An Efficient List-Moving Algorithm Using Constant Workspace, vol. 19 No. 6", Communications of the ACM, Jun. 1976, 352-354.

Flood, et al., "Parallel Garbage Collection for Shared Memory Multiprocessors", USENIX JVM Conference, Apr. 2001.

Goldstein, et al., "Lazy Threads: Implementing a Fast Parallel Call, vol. 37, No. 1", Journal of Parallel and Distributed Computing, Aug. 1996, 5-20.

Hanson, "Fast Allocation and Deallocation of Memory Based on Object Lifetimes", Software Practice and Experience, Jan. 1990, 20(1):5-12.

Harris, "Dynamic Adaptive Pre-Tenuring", In Proceedings of the Int'l Symposium on Memory Management, Oct. 2000, 127-136.

Holzle, Urs, "A Fast Write Barrier for Generational Garbage Collectors", Workshop on Garbage Collection in Object Oriented Systems, Oct. 1993.

Hosking, et al., "Protection Traps and Alternatives for Memory Management of an Object-Oriented Language", Object Systems Laboratory, Dec. 1993, 1-14, Dept. of Comp. Sci., Amherst, MA.

Hudson, et al., "A Language—Independent Garbage Collector Toolkit", Coins Technical Report, Sep. 1991.

Hudson, et al., "Training Distributed Garbage: The DMOS Collector", University of St. Andrews Tech Report, 1997, 1-26.

Hudson, et al., "Garbage Collecting the World: One Car at a Time", ACM SIGPLAN Notices 32, 1997, 162-175.

Hudson, et al., "Sapphire: Copying GC Without Stopping the World", Practice and Experience Special Issue, Date Unknown, JAVA/Grande/Iscope.

Liskov, et al., "Partitioned Garbage Collection of a Large Stable Heap", Proceedings of IWOOS, 1996, 117-121.

Moss, et al., "A Complete and Coarse-Grained Incremental Garbage Collection for Persisten Object Strores", Proceedings 7th Int'l Workshop on Persisten Object System, 1996, 1-13, Cape May, NJ.

Munro, et al., "Incremental Garbage Collection of a Persistent Object Store using PMOS", 3rd Int'l Workshop on Persistence and Java, 1998, 78-91, Tiburon, California.

Nettles, Scott, "Real-Time Replication Garbage Collection", Avionics Lab, Wright Research and Development Center, 1993, PDDI.

Papopoulos, "Hood: A User-Level Thread Library for Multiprogramming Multiprocessors, Thesis: The Uni. of TX", University of Texas, Aug. 1998, 1-71, Austin.

Roy, et al., "Garbage Collection in Object-Oriented Databases Using Transactional Cyclic Reference Counting", VLDB Journal—The International Journal on Very Large Da Bases, vol. 7, Issue 3, 1998, 179-193.

Shuf, et al., "Exploiting Profilic Types for Memory Management and Optimizations. ACM ISBN Sep. 2, 2001", POPL, Jan. 2002, Portland.

Stamos, "Static Grouping of Small Objects to Enhance Performance of a Paged Virtual Memory", ACM Transactions on Computer Systems, vol. 2, No. 2, May 1984, 155-180.

Ungar, et al., "Tenuring Policies for Generation-Based Storage Reclamation", ACM SIGPLAN Notices, 1988, 23(11)1-17.

Venners, "Garbage Collection, Inside the Java 2 Virtual Machine; Chapter 9", www.artima.com, Date Unknown, parts 1-18.

Wilson, "Uniprocessor Garbage Collection Techniques", Proceedings of Int'l Workshop on Memory Management, 1992, V. 637.

Withington, P.T., "How Real is "Real-Time" GC?", Symbolics, Inc., Oct. 6, 1991, Burlington, MA.

Zee, et al., "Write Barrier Removal by Static Analysis", OPPSLA '02, Nov. 2002.

Zorn, "Segregating Heap Objects by Reference Behavior and Lifetime", In 8th Int'l Conference on Architectural Support for Programming Languages and Operating Systems, Oct. 1998, 12-32, San Jose, CA.

Zorn, Benjamin, "Barrier Methods for Garbage Collection", Dept. of Computer Science, Uni. of Colorado, Nov. 1990, 1-37, Boulder.

Azagury, et al., "Combining Card Marking With Remembered Sets: How to Save Scanning Time", ACM SIGPLAN Notices, Oct. 1998, V. 34(3), ACM Press, Vancouver, Canada.

Cheney, "A Nonrecursive List Compacting Algorithm, vol. 12, No. 11", Communications of the ACM, Nov. 1970, 677-678, Uni. Math. Lab., Cambridge, European Patent Office.

Cheng, et al., "Generational Stack Collection and Profile-Driven Pretenuring", SIGPLAN'98 Conference on Programming Languages Design and Implementation, Jun. 1998, 162-173M ACM Press, Montreal, Canada.

Lam, et al., "Effective Static-Graph Reorganization to Improve Locality in Garbage Collected Systems", Proceedings of ACM SIGPLAN Conference on Programming Language Design and Implementation, Jun. 1991, Toronto, Canada.

Pirinen, Pekka, "Barrier Techniques for Incremental Tracing", Harlequin Limited, Date Unknown, 20-25, Cambridge, Great Britain.

* cited by examiner

DETECTION OF DEAD REGIONS DURING INCREMENTAL COLLECTION

CROSS-REFERENCE TO RELATED APPLICATION

The present application is related to U.S. patent application Ser. No. 10/313,254 of Alexander T. Garthwaite for Combining External and Intragenerational Reference-Processing in a Garbage Collector Based on the Train Algorithm, which was filed on the same day as this application.

BACKGROUND OF THE INVENTION

1. Field of the Invention

The present invention is directed to memory management. It particularly concerns what has come to be known as "garbage collection."

2. Background Information

In the field of computer systems, considerable effort has been expended on the task of allocating memory to data objects. For the purposes of this discussion, the term object refers to a data structure represented in a computer system's memory. Other terms sometimes used for the same concept are record and structure. An object may be identified by a reference, a relatively small amount of information that can be used to access the object. A reference can be represented as a "pointer" or a "machine address," which may require, for instance, only sixteen, thirty-two, or sixty-four bits of information, although there are other ways to represent a reference.

In some systems, which are usually known as "object oriented," objects may have associated methods, which are routines that can be invoked by reference to the object. They also may belong to a class, which is an organizational entity that may contain method code or other information shared by all objects belonging to that class. In the discussion that follows, though, the term object will not be limited to such structures; it will additionally include structures with which methods and classes are not associated.

The invention to be described below is applicable to systems that allocate memory to objects dynamically. Not all systems employ dynamic allocation. In some computer languages, source programs must be so written that all objects to which the program's variables refer are bound to storage locations at compile time. This storage-allocation approach, sometimes referred to as "static allocation," is the policy traditionally used by the Fortran programming language, for example.

Even for compilers that are thought of as allocating objects only statically, of course, there is often a certain level of abstraction to this binding of objects to storage locations. Consider the typical computer system 10 depicted in FIG. 1, for example. Data, and instructions for operating on them, that a microprocessor 11 uses may reside in on-board cache memory or be received from further cache memory 12, possibly through the mediation of a cache controller 13. That controller 13 can in turn receive such data from system read/write memory ("RAM") 14 through a RAM controller 15 or from various peripheral devices through a system bus 16. The memory space made available to an application program may be "virtual" in the sense that it may actually be considerably larger than RAM 14 provides. So the RAM contents will be swapped to and from a system disk 17.

Additionally, the actual physical operations performed to access some of the most-recently visited parts of the process's address space often will actually be performed in the cache 12 or in a cache on board microprocessor 11 rather than on the RAM 14, with which those caches swap data and instructions just as RAM 14 and system disk 17 do with each other.

A further level of abstraction results from the fact that an application will often be run as one of many processes operating concurrently with the support of an underlying operating system. As part of that system's memory management, the application's memory space may be moved among different actual physical locations many times in order to allow different processes to employ shared physical memory devices. That is, the location specified in the application's machine code may actually result in different physical locations at different times because the operating system adds different offsets to the machine-language-specified location.

Despite these expedients, the use of static memory allocation in writing certain long-lived applications makes it difficult to restrict storage requirements to the available memory space. Abiding by space limitations is easier when the platform provides for dynamic memory allocation, i.e., when memory space to be allocated to a given object is determined only at run time.

Dynamic allocation has a number of advantages, among which is that the run-time system is able to adapt allocation to run-time conditions. For example, the programmer can specify that space should be allocated for a given object only in response to a particular run-time condition. The C-language library function malloc( ) is often used for this purpose. Conversely, the programmer can specify conditions under which memory previously allocated to a given object can be reclaimed for reuse. The C-language library function free( ) results in such memory reclamation.

Because dynamic allocation provides for memory reuse, it facilitates generation of large or long-lived applications, which over the course of their lifetimes may employ objects whose total memory requirements would greatly exceed the available memory resources if they were bound to memory locations statically.

Particularly for long-lived applications, though, allocation and reclamation of dynamic memory must be performed carefully. If the application fails to reclaim unused memory—or, worse, loses track of the address of a dynamically allocated segment of memory—its memory requirements will grow over time to exceed the system's available memory. This kind of error is known as a "memory leak."

Another kind of error occurs when an application reclaims memory for reuse even though it still maintains a reference to that memory. If the reclaimed memory is reallocated for a different purpose, the application may inadvertently manipulate the same memory in multiple inconsistent ways. This kind of error is known as a "dangling reference," because an application should not retain a reference to a memory location once that location is reclaimed. Explicit dynamic-memory management by using interfaces like malloc( )/free( ) often leads to these problems.

A way of reducing the likelihood of such leaks and related errors is to provide memory-space reclamation in a more-automatic manner. Techniques used by systems that reclaim memory space automatically are commonly referred to as "garbage collection." Garbage collectors operate by reclaiming space that they no longer consider "reachable." Statically allocated objects represented by a program's global variables are normally considered reachable throughout a program's life. Such objects are not ordinarily stored in the garbage collector's managed memory space, but they may contain references to dynamically allocated objects that are, and such objects are considered reachable. Clearly, an object referred to in the processor's call stack is reachable, as is an object referred to by register contents. And an object referred to by any reachable object is also reachable.

The use of garbage collectors is advantageous because, whereas a programmer working on a particular sequence of code can perform his task creditably in most respects with only local knowledge of the application at any given time, memory allocation and reclamation require a global knowledge of the program. Specifically, a programmer dealing with a given sequence of code does tend to know whether some portion of memory is still in use for that sequence of code, but it is considerably more difficult for him to know what the rest of the application is doing with that memory. By tracing references from some conservative notion of a "root set," e.g., global variables, registers, and the call stack, automatic garbage collectors obtain global knowledge in a methodical way. By using a garbage collector, the programmer is relieved of the need to worry about the application's global state and can concentrate on local-state issues, which are more manageable. The result is applications that are more robust, having no dangling references and fewer memory leaks.

Garbage-collection mechanisms can be implemented by various parts and levels of a computing system. One approach is simply to provide them as part of a batch compiler's output. Consider FIG. 2's simple batch-compiler operation, for example. A computer system executes in accordance with compiler object code and therefore acts as a compiler 20. The compiler object code is typically stored on a medium such as FIG. 1's system disk 17 or some other machine-readable medium, and it is loaded into RAM 14 to configure the computer system to act as a compiler. In some cases, though, the compiler object code's persistent storage may instead be provided in a server system remote from the machine that performs the compiling. The electrical signals that carry the digital data by which the computer systems exchange that code are examples of the kinds of electromagnetic signals by which the computer instructions can be communicated. Others are radio waves, microwaves, and both visible and invisible light.

The input to the compiler is the application source code, and the end product of the compiler process is application object code. This object code defines an application 21, which typically operates on input such as mouse clicks, etc., to generate a display or some other type of output. This object code implements the relationship that the programmer intends to specify by his application source code. In one approach to garbage collection, the compiler 20, without the programmer's explicit direction, additionally generates code that automatically reclaims unreachable memory space.

Even in this simple case, though, there is a sense in which the application does not itself provide the entire garbage collector. Specifically, the application will typically call upon the underlying operating system's memory-allocation functions. And the operating system may in turn take advantage of various hardware that lends itself particularly to use in garbage collection. So even a very simple system may disperse the garbage-collection mechanism over a number of computer-system layers.

To get some sense of the variety of system components that can be used to implement garbage collection, consider FIG. 3's example of a more complex way in which various levels of source code can result in the machine instructions that a processor executes. In the FIG. 3 arrangement, the human applications programmer produces source code 22 written in a high-level language. A compiler 23 typically converts that code into "class files." These files include routines written in instructions, called "byte codes" 24, for a "virtual machine" that various processors can be software-configured to emulate. This conversion into byte codes is almost always separated in time from those codes' execution, so FIG. 3 divides the sequence into a "compile-time environment" 25 separate from a "run-time environment" 26, in which execution occurs. One example of a high-level language for which compilers are available to produce such virtual-machine instructions is the Java™ programming language. (Java is a trademark or registered trademark of Sun Microsystems, Inc., in the United States and other countries.)

Most typically, the class files' byte-code routines are executed by a processor under control of a virtual-machine process 27. That process emulates a virtual machine from whose instruction set the byte codes are drawn. As is true of the compiler 23, the virtual-machine process 27 may be specified by code stored on a local disk or some other machine-readable medium from which it is read into FIG. 1's RAM 14 to configure the computer system to implement the garbage collector and otherwise act as a virtual machine. Again, though, that code's persistent storage may instead be provided by a server system remote from the processor that implements the virtual machine, in which case the is code would be transmitted electrically or optically to the virtual-machine-implementing processor.

In some implementations, much of the virtual machine's action in executing these byte codes is most like what those skilled in the art refer to as "interpreting," so FIG. 3 depicts the virtual machine as including an "interpreter" 28 for that purpose. In addition to or instead of running an interpreter, many virtual-machine implementations actually compile the byte codes concurrently with the resultant object code's execution, so FIG. 3 depicts the virtual machine as additionally including a "just-in-time" compiler 29. We will refer to the just-in-time compiler and the interpreter together as "execution engines" since they are the methods by which byte code can be executed.

Now, some of the functionality that source-language constructs specify can be quite complicated, requiring many machine-language instructions for their implementation. One quite-common example is a source-language instruction that calls for 64-bit arithmetic on a 32-bit machine. More germane to the present invention is the operation of dynamically allocating space to a new object; the allocation of such objects must be mediated by the garbage collector.

In such situations, the compiler may produce "inline" code to accomplish these operations. That is, all object-code instructions for carrying out a given source-code-prescribed operation will be repeated each time the source code calls for the operation. But inlining runs the risk that "code bloat" will result if the operation is invoked at many source-code locations.

The natural way of avoiding this result is instead to provide the operation's implementation as a procedure, i.e., a single code sequence that can be called from any location in the program. In the case of compilers, a collection of procedures for implementing many types of source-code-specified operations is called a runtime system for the language. The execution engines and the runtime system of a virtual machine are designed together so that the engines "know" what runtime-system procedures are available in the virtual machine (and on the target system if that system provides facilities that are directly usable by an executing virtual-machine program.) So, for example, the just-in-time compiler 29 may generate native code that includes calls to memory-allocation procedures provided by the virtual machine's runtime system. These allocation routines may in turn invoke garbage-collection routines of the runtime system when there is not enough memory available to satisfy an allocation. To represent this fact, FIG. 3 includes block 30 to show that the compiler's output makes calls to the runtime system as well as to the operating system 31, which consists of procedures that are similarly system-resident but are not compiler-dependent.

Although the FIG. 3 arrangement is a popular one, it is by no means universal, and many further implementation types can be expected. Proposals have even been made to implement the virtual machine 27's behavior in a hardware processor, in which case the hardware itself would provide some or all of the garbage-collection function.

The arrangement of FIG. 3 differs from FIG. 2 in that the compiler 23 for converting the human programmer's code does not contribute to providing the garbage-collection function; that results largely from the virtual machine 27's operation. Those skilled in that art will recognize that both of these organizations are merely exemplary, and many modern systems employ hybrid mechanisms, which partake of the characteristics of traditional compilers and traditional interpreters both.

The invention to be described below is applicable independently of whether a batch compiler, a just-in-time compiler, an interpreter, or some hybrid is employed to process source code. In the remainder of this application, therefore, we will use the term compiler to refer to any such mechanism, even if it is what would more typically be called an interpreter.

In short, garbage collectors can be implemented in a wide range of combinations of hardware and/or software. As is true of most of the garbage-collection techniques described in the literature, the invention to be described below is applicable to most such systems.

By implementing garbage collection, a computer system can greatly reduce the occurrence of memory leaks and other software deficiencies in which human programming frequently results. But it can also have significant adverse performance effects if it is not implemented carefully. To distinguish the part of the program that does "useful" work from that which does the garbage collection, the term mutator is sometimes used in discussions of these effects; from the collector's point of view, what the mutator does is mutate active data structures' connectivity.

Some garbage-collection approaches rely heavily on interleaving garbage-collection steps among mutator steps. In one type of garbage-collection approach, for instance, the mutator operation of writing a reference is followed immediately by garbage-collector steps used to maintain a reference count in that object's header, and code for subsequent new-object storage includes steps for finding space occupied by objects whose reference count has fallen to zero. Obviously, such an approach can slow mutator operation significantly.

Other approaches therefore interleave very few garbage-collector-related instructions into the main mutator process but instead interrupt it from time to time to perform garbage-collection cycles, in which the garbage collector finds unreachable objects and reclaims their memory space for reuse. Such an approach will be assumed in discussing FIG. 4's depiction of a simple garbage-collection operation. Within the memory space allocated to a given application is a part 40 managed by automatic garbage collection. In the following discussion, this will be referred to as the "heap," although in other contexts that term refers to all dynamically allocated memory. During the course of the application's execution, space is allocated for various objects 42, 44, 46, 48, and 50. Typically, the mutator allocates space within the heap by invoking the garbage collector, which at some level manages access to the heap. Basically, the mutator asks the garbage collector for a pointer to a heap region where it can safely place the object's data. The garbage collector keeps track of the fact that the thus-allocated region is occupied. It will refrain from allocating that region in response to any other request until it determines that the mutator no longer needs the region allocated to that object.

Garbage collectors vary as to which objects they consider reachable and unreachable. For the present discussion, though, an object will be considered "reachable" if it is referred to, as object 42 is, by a reference in the root set 52. The root set consists of reference values stored in the mutator's threads' call stacks, the CPU registers, and global variables outside the garbage-collected heap. An object is also reachable if it is referred to, as object 46 is, by another reachable object (in this case, object 42). Objects that are not reachable can no longer affect the program, so it is safe to re-allocate the memory spaces that they occupy.

A typical approach to garbage collection is therefore to identify all reachable objects and reclaim any previously allocated memory that the reachable objects do not occupy. A typical garbage collector may identify reachable objects by tracing references from the root set 52. For the sake of simplicity, FIG. 4 depicts only one reference from the root set 52 into the heap 40. (Those skilled in the art will recognize that there are many ways to identify references, or at least data contents that may be references.) The collector notes that the root set points to object 42, which is therefore reachable, and that reachable object 42 points to object 46, which therefore is also reachable. But those reachable objects point to no other objects, so objects 44, 48, and 50 are all unreachable, and their memory space may be reclaimed. This may involve, say, placing that memory space in a list of free memory blocks.

To avoid excessive heap fragmentation, some garbage collectors additionally relocate reachable objects. FIG. 5 shows a typical approach. The heap is partitioned into two halves, hereafter called "semi-spaces." For one garbage-collection cycle, all objects are allocated in one semi-space 54, leaving the other semi-space 56 free. When the garbage-collection cycle occurs, objects identified as reachable are "evacuated" to the other semi-space 56, so all of semi-space 54 is then considered free. Once the garbage-collection cycle has occurred, all new objects are allocated in the lower semi-space 56 until yet another garbage-collection cycle occurs, at which time the reachable objects are evacuated back to the upper semi-space 54.

Although this relocation requires the extra steps of copying the reachable objects and updating references to them, it tends to be quite efficient, since most new objects quickly become unreachable, so most of the current semi-space is actually garbage. That is, only a relatively few, reachable objects need to be relocated, after which the entire semi-space contains only garbage and can be pronounced free for reallocation.

Now, a collection cycle can involve following all reference chains from the basic root set—i.e., from inherently reachable locations such as the call stacks, class statics and other global variables, and registers—and reclaiming all space occupied by objects not encountered in the process. And the simplest way of performing such a cycle is to interrupt the mutator to provide a collector interval in which the entire cycle is performed before the mutator resumes.

For certain types of applications, this approach to collection-cycle scheduling is acceptable and, in fact, highly efficient.

For many interactive and real-time applications, though, this approach is not acceptable. The delay in mutator operation that the collection cycle's execution causes can be annoying to a user and can prevent a real-time application from responding to its environment with the required speed. In some applications, choosing collection times opportunistically can reduce this effect. Collection intervals can be inserted when an interactive mutator reaches a point at which it awaits user input, for instance.

So it may often be true that the garbage-collection operation's effect on performance can depend less on the total collection time than on when collections actually occur. But another factor that often is even more determinative is the duration of any single collection interval, i.e., how long the mutator must remain quiescent at any one time. In an interactive system, for instance, a user may never notice hundred-millisecond interruptions for garbage collection, whereas most users would find interruptions lasting for two seconds to be annoying.

The cycle may therefore be divided up among a plurality of collector intervals. When a collection cycle is divided up among a plurality of collection intervals, it is only after a number of intervals that the collector will have followed all reference chains and be able to identify as garbage any objects not thereby reached. This approach is more complex than completing the cycle in a single collection interval; the mutator will usually modify references between collection intervals, so the collector must repeatedly update its view of the reference graph in the midst of the collection cycle. To make such updates practical, the mutator must communicate with the collector to let it know what reference changes are made between intervals.

An even more complex approach, which some systems use to eliminate discrete pauses or maximize resource-use efficiency, is to execute the mutator and collector in concurrent execution threads. Most systems that use this approach use it for most but not all of the collection cycle; the mutator is usually interrupted for a short collector interval, in which a part of the collector cycle takes place without mutation.

Independent of whether the collection cycle is performed concurrently with mutator operation, is completed in a single interval, or extends over multiple intervals is the question of whether the cycle is complete, as has tacitly been assumed so far, or is instead "incremental." In incremental collection, a collection cycle constitutes only an increment of collection: the collector does not follow all reference chains from the basic root set completely. Instead, it concentrates on only a portion, or collection set, of the heap. Specifically, it identifies every collection-set object referred to by a reference chain that extends into the collection set from outside of it, and it reclaims the collection-set space not occupied by such objects, possibly after evacuating them from the collection set.

By thus culling objects referenced by reference chains that do not necessarily originate in the basic root set, the collector can be thought of as expanding the root set to include as roots some locations that may not be reachable. Although incremental collection thereby leaves "floating garbage," it can result in relatively low pause times even if entire collection increments are completed during respective single collection intervals.

Most collectors that employ incremental collection operate in "generations" although this is not necessary in principle. Different portions, or generations, of the heap are subject to different collection policies. New objects are allocated in a "young" generation, and older objects are promoted from younger generations to older or more "mature" generations. Collecting the younger generations more frequently than the others yields greater efficiency because the younger generations tend to accumulate garbage faster; newly allocated objects tend to "die," while older objects tend to "survive."

But generational collection greatly increases what is effectively the root set for a given generation. Consider FIG. 6, which depicts a heap as organized into three generations 58, 60, and 62. Assume that generation 60 is to be collected. The process for this individual generation may be more or less the same as that described in connection with FIGS. 4 and 5 for the entire heap, with one major exception. In the case of a single generation, the root set must be considered to include not only the call stack, registers, and global variables represented by set 52 but also objects in the other generations 58 and 62, which themselves may contain references to objects in generation 60. So pointers must be traced not only from the basic root set 52 but also from objects within the other generations.

One could perform this tracing by simply inspecting all references in all other generations at the beginning of every collection interval, and it turns out that this approach is actually feasible in some situations. But it takes too long in other situations, so workers in this field have employed a number of approaches to expediting reference tracing. One approach is to include so-called write barriers in the mutator process. A write barrier is code added to a write operation to record information from which the collector can determine where references were written or may have been since the last collection interval. A reference list can then be maintained by taking such a list as it existed at the end of the previous collection interval and updating it by inspecting only locations identified by the write barrier as possibly modified since that interval.

One of the many write-barrier implementations commonly used by workers in this art employs what has been referred to as the "card table." FIG. 6 depicts the various generations as being divided into smaller sections, known for this purpose as "cards." Card tables 64, 66, and 68 associated with respective generations contain an entry for each of their cards. When the mutator writes a reference in a card, it makes an appropriate entry in the card-table location associated with that card (or, say, with the card in which the object containing the reference begins). Most write-barrier implementations simply make a Boolean entry indicating that the write operation has been performed, although some may be more elaborate. The mutator having thus left a record of where new or modified references may be, the collector can thereafter prepare appropriate summaries of that information, as will be explained in due course. For the sake of concreteness, we will assume that the summaries are maintained by steps that occur principally at the beginning of each collection interval.

Of course, there are other write-barrier approaches, such as simply having the write barrier add to a list of addresses where references where written. Also, although there is no reason in principle to favor any particular number of generations, and although FIG. 6 shows three, most generational garbage collectors have only two generations, of which one is the young generation and the other is the mature generation. Moreover, although FIG. 6 shows the generations as being of the same size, a more-typical configuration is for the young generation to be considerably smaller. Finally, although we assumed for the sake of simplicity that collection during a given interval was limited to only one generation, a more-typical approach is actually to collect the whole young generation at every interval but to collect the mature one less frequently.

Some collectors collect the entire young generation in every interval and may thereafter perform mature-generation collection in the same interval. It may therefore take relatively little time to scan all young-generation objects remaining after young-generation collection to find references into the mature generation. Even when such collectors do use card tables, therefore, they often do not use them for finding young-generation references that refer to mature-generation objects. On the other hand, laboriously scanning the entire mature generation for references to young-generation (or mature-generation) objects would ordinarily take too long, so the collector uses the card table to limit the amount of memory it searches for mature-generation references.

Now, although it typically takes very little time to collect the young generation, it may take more time than is acceptable within a single garbage-collection interval to collect the entire mature generation. So some garbage collectors may collect the mature generation incrementally; that is, they may perform only a part of the mature generation's collection during any particular collection cycle. Incremental collection presents the problem that, since the generation's unreachable objects outside the "collection set" of objects processed during that cycle cannot be recognized as unreachable, collection-set objects to which they refer tend not to be, either.

To reduce the adverse effect this would otherwise have on collection efficiency, workers in this field have employed the "train algorithm," which FIG. 7 depicts. A generation to be collected incrementally is divided into sections, which for reasons about to be described are referred to as "car sections." Conventionally, a generation's incremental collection occurs in fixed-size sections, and a car section's size is that of the generation portion to be collected during one cycle.

The discussion that follows will occasionally employ the nomenclature in the literature by using the term car instead of car section. But the literature seems to use that term to refer variously not only to memory sections themselves but also to data structures that the train algorithm employs to manage them when they contain objects, as well as to the more-abstract concept that the car section and managing data structure represent in discussions of the algorithm. So the following discussion will more frequently use the expression car section to emphasize the actual sections of memory space for whose management the car concept is employed.

According to the train algorithm, the car sections are grouped into "trains," which are ordered, conventionally according to age. For example, FIG. 7 shows an oldest train 73 consisting of a generation 74's three car sections described by associated data structures 75, 76, and 78, while a second train 80 consists only of a single car section, represented by structure 82, and the youngest train 84 (referred to as the "allocation train") consists of car sections that data structures 86 and 88 represent. As will be seen below, car sections' train memberships can change, and any car section added to a train is typically added to the end of a train.

Conventionally, the car collected in an increment is the one added earliest to the oldest train, which in this case is car 75. All of the generation's cars can thus be thought of as waiting for collection in a single long line, in which cars are ordered in accordance with the order of the trains to which they belong and, within trains, in accordance with the order in which they were added to those trains.

As is usual, the way in which reachable objects are identified is to determine whether there are references to them in the root set or in any other object already determined to be reachable. In accordance with the train algorithm, the collector additionally performs a test to determine whether there are any references at all from outside the oldest train to objects within it. If there are not, then all cars within the train can be reclaimed, even though not all of those cars are in the collection set. And the train algorithm so operates that inter-car references tend to be grouped into trains, as will now be explained.

To identify references into the car from outside of it, train-algorithm implementations typically employ "remembered sets." As card tables are, remembered sets are used to keep track of references. Whereas a card-table entry contains information about references that the associated card contains, though, a remembered set associated with a given region contains information about references into that region from locations outside of it. In the case of the train algorithm, remembered sets are associated with car sections. Each remembered set, such as car 75's remembered set 90, lists locations in the generation that contain references into the associated car section.

The remembered sets for all of a generation's cars are typically updated at the start of each collection interval. To illustrate how such updating and other collection operations may be carried out, FIG. 8 depicts an operational sequence in a system of the typical type mentioned above. That is, it shows a sequence of operations that may occur in a system in which the entire garbage-collected heap is divided into two generations, namely, a young generation and an old generation, and in which the young generation is much smaller than the old generation. FIG. 8 is also based on the assumption and that the train algorithm is used only for collecting the old generation.

Block 102 represents a period of the mutator's operation. As was explained above, the mutator makes a card-table entry to identify any card that it has "dirtied" by adding or modifying a reference that the card contains. At some point, the mutator will be interrupted for collector operation. Different implementations employ different events to trigger such an interruption, but we will assume for the sake of concreteness that the system's dynamic-allocation routine causes such interruptions when no room is left in the young generation for any further allocation. A dashed line 103 represents the transition from mutator operation and collector operation.

In the system assumed for the FIG. 8 example, the collector collects the (entire) young generation each time such an interruption occurs. When the young generation's collection ends, the mutator operation usually resumes, without the collector's having collected any part of the old generation. Once in a while, though, the collector also collects part of the old generation, and FIG. 8 is intended to illustrate such an occasion.

When the collector's interval first starts, it first processes the card table, in an operation that block 104 represents. As was mentioned above, the collector scans the "dirtied" cards for references into the young generation. If a reference is found, that fact is memorialized appropriately. If the reference refers to a young-generation object, for example, an expanded card table may be used for this purpose. For each card, such an expanded card table might include a multi-byte array used to summarize the card's reference contents. The summary may, for instance, be a list of offsets that indicate the exact locations within the card of references to young-generation objects, or it may be a list of fine-granularity "sub-cards" within which references to young-generation objects may be found. If the reference refers to an old-generation object, the collector often adds an entry to the remembered set associated with the car containing that old-generation object. The entry identifies the reference's location, or at least a small region in which the reference can be found. For reasons that will become apparent, though, the collector will typically not bother to place in the remembered set the locations of references from objects in car sections farther forward in the collection queue than the referred-to object, i.e., from objects in older trains or in cars added earlier to the same train.

The collector then collects the young generation, as block 105 indicates. (Actually, young-generation collection may be interleaved with the dirty-region scanning, but the drawing illustrates it for purpose of explanation as being separate.) If a young-generation object is referred to by a reference that card-table scanning has revealed, that object is considered to be potentially reachable, as is any young-generation object referred to by a reference in the root set or in another reachable young-generation object. The space occupied by any young-generation object thus considered reachable is withheld from reclamation. For example, it may be evacuated to a young-generation semi-space that will be used for allocation during the next mutator interval. It may instead be promoted into the older generation, where it is placed into a car containing a reference to it or into a car in the last train. Or some other technique may be used to keep the memory space it occupies off the system's free list. The collector then reclaims any young-generation space occupied by any other objects, i.e., by any young-generation objects not identified as transitively reachable through references located outside the young generation.

The collector then performs the train algorithm's central test, referred to above, of determining whether there are any references into the oldest train from outside of it. As was mentioned above, the actual process of determining, for each object, whether it can be identified as unreachable is performed for only a single car section in any cycle. In the absence of features such as those provided by the train algorithm, this would present a problem, because garbage structures may be larger than a car section. Objects in such structures would therefore (erroneously) appear reachable, since they are referred to from outside the car section under consideration. But the train algorithm additionally keeps track of whether there are any references into a given car from outside the train to which it belongs, and trains' sizes are not limited. As will be apparent presently, objects not found to be unreachable are relocated in such a way that garbage structures tend to be gathered into respective trains into which, eventually, no references from outside the train point. If no references from outside the train point to any objects inside the train, the train can be recognized as containing only garbage. This is the test that block 106 represents. All cars in a train thus identified as containing only garbage can be reclaimed.

The question of whether old-generation references point into the train from outside of it is (conservatively) answered in the course of updating remembered sets; in the course of updating a car's remembered set, it is a simple matter to flag the car as being referred to from outside the train. The step—106 test additionally involves determining whether any references from outside the old generation point into the oldest train. Various approaches to making this determination have been suggested, including the conceptually simple approach of merely following all reference chains from the root set until those chains (1) terminate, (2) reach an old-generation object outside the oldest train, or (3) reach an object in the oldest train. In the two-generation example, most of this work can be done readily by identifying references into the collection set from live young-generation objects during the young-generation collection. If one or more such chains reach the oldest train, that train includes reachable objects. It may also include reachable objects if the remembered-set-update operation has found one or more references into the oldest train from outside of it. Otherwise, that train contains only garbage, and the collector reclaims all of its car sections for reuse, as block 107 indicates. The collector may then return control to the mutator, which resumes execution, as FIG. 8B's block 108 indicates.

If the train contains reachable objects, on the other hand, the collector turns to evacuating potentially reachable objects from the collection set. The first operation, which block 110 represents, is to remove from the collection set any object that is reachable from the root set by way of a reference chain that does not pass through the part of the old generation that is outside of the collection set. In the illustrated arrangement, in which there are only two generations, and the young generation has previously been completely collected during the same interval, this means evacuating from a collection set any object that (1) is directly referred to by a reference in the root set, (2) is directly referred to by a reference in the young generation (in which no remaining objects have been found unreachable), or (3) is referred to by any reference in an object thereby evacuated. All of the objects thus evacuated are placed in cars in the youngest train, which was newly created during the collection cycle. Certain of the mechanics involved in the evacuation process are described in more detail in connection with similar evacuation performed, as blocks 112 and 114 indicate, in response to remembered-set entries.

FIG. 9 illustrates how the processing represented by block 114 proceeds. The entries identify heap regions, and, as block 116 indicates, the collector scans the thus-identified heap regions to find references to locations in the collection-set. As blocks 118 and 120 indicate, that entry's processing continues until the collector finds no more such references. Every time the collector does find such a reference, it checks to determine whether, as a result of a previous entry's processing, the referred-to object has already been evacuated. If it has not, the collector evacuates the referred-to object to a (possibly new) car in the train containing the reference, as blocks 122 and 124 indicate.

As FIG. 10 indicates, the evacuation operation includes more than just object relocation, which block 126 represents. Once the object has been moved, the collector places a forwarding pointer in the collection-set location from which it was evacuated, for a purpose that will become apparent presently. Block 128 represents that step. (Actually, there are some cases in which the evacuation is only a "logical" evacuation: the car containing the object is simply re-linked to a different logical place in the collection sequence, but its address does not change. In such cases, forwarding pointers are unnecessary.) Additionally, the reference in response to which the object was evacuated is updated to point to the evacuated object's new location, as block 130 indicates. And, as block 132 indicates, any reference contained in the evacuated object is processed, in an operation that FIGS. 11A and 11B depict.

For each one of the evacuated object's references, the collector checks to see whether the location that it refers to is in the collection set. As blocks 134 and 136 indicate, the reference processing continues until all references in the evacuated object have been processed. In the meantime, if a reference refers to a collection-set location that contains an object not yet evacuated, the collector evacuates the referred-to object to the train to which the evacuated object containing the reference was evacuated, as blocks 138 and 140 indicate. If the reference refers to a location in the collection set from which the object has already been evacuated, then the collector uses the forwarding pointer left in that location to update the reference, as block 142 indicates. Before the processing of FIG. 11, the remembered set of the referred-to object's car will have an entry that identifies the evacuated object's old location as one containing a reference to the referred-to object. But the evacuation has placed the reference in a new location, for which the remembered set of the referred-to object's car may not have an entry. So, if that new location is not as far forward as the referred-to object, the collector adds to that remembered set an entry identifying the reference's new region, as blocks 144 and 146 indicate. As the drawings show, the same type of remembered-set update is performed if the object referred to by the evacuated reference is not in the collection set.

Now, some train-algorithm implementations postpone processing of the references contained in evacuated collection-set objects until after all directly reachable collection-set objects have been evacuated. In the implementation that FIG. 10 illustrates, though, the processing of a given evacuated object's references occurs before the next object is evacuated. So FIGS. 11's blocks 134 and 148 indicate that the FIG. 11 operation is completed when all of the references contained in the evacuated object have been processed. This completes FIG. 10's object-evacuation operation, which FIG. 9's block 124 represents.

As FIG. 9 indicates, each collection-set object referred to by a reference in a remembered-set-entry-identified location is thus evacuated if it has not been already. If the object has already been evacuated from the referred-to location, the reference to that location is updated to point to the location to which the object has been evacuated. If the remembered set associated with the car containing the evacuated object's new location does not include an entry for the reference's location, it is updated to do so if the car containing the reference is younger than the car containing the evacuated object. Block 150 represents updating the reference and, if necessary, the remembered set.

As FIG. 8's blocks 112 and 114 indicate, this processing of collection-set remembered sets is performed initially only for entries that do not refer to locations in the oldest train. Those that do are processed only after all others have been, as blocks 152 and 154 indicate.

When this process has been completed, the collection set's memory space can be reclaimed, as block 164 indicates, since no remaining object is referred to from outside the collection set: any remaining collection-set object is unreachable. The collector then relinquishes control to the mutator.

FIGS. 12A–12J illustrate results of using the train algorithm. FIG. 12A represents a generation in which objects have been allocated in nine car sections. The oldest train has four cars, numbered 1.1 through 1.4. Car 1.1 has two objects, A and B. There is a reference to object B in the root set (which, as was explained above, includes live objects in the other generations). Object A is referred to by object L, which is in the third train's sole car section. In the generation's remembered sets 170, a reference in object L has therefore been recorded against car 1.1.

Processing always starts with the oldest train's earliest-added car, so the garbage collector refers to car 1.1's remembered set and finds that there is a reference from object L into the car being processed. It accordingly evacuates object A to the train that object L occupies. The object being evacuated is often placed in one of the selected train's existing cars, but we will assume for present purposes that there is not enough room. So the garbage collector evacuates object A into a new car section and updates appropriate data structures to identify it as the next car in the third train. FIG. 12B depicts the result: a new car has been added to the third train, and object A is placed in it.

FIG. 12B also shows that object B has been evacuated to a new car outside the first train. This is because object B has an external reference, which, like the reference to object A, is a reference from outside the first train, and one goal of the processing is to form trains into which there are no further references. Note that, to maintain a reference to the same object, object L's reference to object A has had to be rewritten, and so have object B's reference to object A and the inter-generational pointer to object B. In the illustrated example, the garbage collector begins a new train for the car into which object B is evacuated, but this is not a necessary requirement of the train algorithm. That algorithm requires only that externally referenced objects be evacuated to a newer train.

Since car 1.1 no longer contains live objects, it can be reclaimed, as FIG. 12B also indicates. Also note that the remembered set for car 2.1 now includes the address of a reference in object A, whereas it did not before. As was stated before, remembered sets in the illustrated embodiment include only references from cars further back in the order than the one with which the remembered set is associated. The reason for this is that any other cars will already be reclaimed by the time the car associated with that remembered set is processed, so there is no reason to keep track of references from them.

The next step is to process the next car, the one whose index is 1.2. Conventionally, this would not occur until some collection cycle after the one during which car 1.1 is collected. For the sake of simplicity we will assume that the mutator has not changed any references into the generation in the interim.

FIG. 12B depicts car 1.2 as containing only a single object, object C, and that car's remembered set contains the address of an inter-car reference from object F. The garbage collector follows that reference to object C. Since this identifies object C as possibly reachable, the garbage collector evacuates it from car set 1.2, which is to be reclaimed. Specifically, the garbage collector removes object C to a new car section, section 1.5, which is linked to the train to which the referring object F's car belongs. Of course, object F's reference needs to be updated to object C's new location. FIG. 12C depicts the evacuation's result.

FIG. 12C also indicates that car set 1.2 has been reclaimed, and car 1.3 is next to be processed. The only address in car 1.3's remembered set is that of a reference in object G. Inspection of that reference reveals that it refers to object F. Object F may therefore be reachable, so it must be evacuated before car section 1.3 is reclaimed. On the other hand, there are no references to objects D and E, so they are clearly garbage. FIG. 12D depicts the result of reclaiming car 1.3's space after evacuating possibly reachable object F.

In the state that FIG. 12D depicts, car 1.4 is next to be processed, and its remembered set contains the addresses of references in objects K and C. Inspection of object K's reference reveals that it refers to object H, so object H must be evacuated. Inspection of the other remembered-set entry, the reference in object C, reveals that it refers to object G, so that object is evacuated, too. As FIG. 12E illustrates, object H must be added to the second train, to which its referring object K belongs. In this case there is room enough in car 2.2, which its referring object K occupies, so evacuation of object H does not require that object K's reference to object H be added to car 2.2's remembered set. Object G is evacuated to a new car in the same train, since that train is where referring object C resides. And the address of the reference in object G to object C is added to car 1.5's remembered set.

FIG. 12E shows that this processing has eliminated all references into the first train, and it is an important part of the train algorithm to test for this condition. That is, even though there are references into both of the train's cars, those cars' contents can be recognized as all garbage because there are no references into the train from outside of it. So all of the first train's cars are reclaimed.

The collector accordingly processes car 2.1 during the next collection cycle, and that car's remembered set indicates that there are two references outside the car that refer to objects within it. Those references are in object K, which is in the same train, and object A, which is not. Inspection of those references reveals that they refer to objects I and J, which are evacuated.

The result, depicted in FIG. 12F, is that the remembered sets for the cars in the second train reveal no inter-car references, and there are no inter-generational references into it, either. That train's car sections therefore contain only garbage, and their memory space can be reclaimed.

So car 3.1 is processed next. Its sole object, object L, is referred to inter-generationally as well as by a reference in the fourth train's object M. As FIG. 12G shows, object L is therefore evacuated to the fourth train. And the address of the reference in object L to object A is placed in the remembered set associated with car 3.2, in which object A resides.

The next car to be processed is car 3.2, whose remembered set includes the addresses of references into it from objects B and L. Inspection of the reference from object B reveals that it refers to object A, which must therefore be evacuated to the fifth train before car 3.2 can be reclaimed. Also, we assume that object A cannot fit in car section 5.1, so a new car 5.2 is added to that train, as FIG. 12H shows, and object A is placed in its car section. All referred-to objects in the third train having been evacuated, that (single-car) train can be reclaimed in its entirety.

A further observation needs to be made before we leave FIG. 12G. Car 3.2's remembered set additionally lists a reference in object L, so the garbage collector inspects that reference and finds that it points to the location previously occupied by object A. This brings up a feature of copying-collection techniques such as the typical train-algorithm implementation. When the garbage collector evacuates an object from a car section, it marks the location as having been evacuated and leaves the address of the object's new location. So, when the garbage collector traces the reference from object L, it finds that object A has been removed, and it accordingly copies the new location into object L as the new value of its reference to object A.

In the state that FIG. 12H illustrates, car 4.1 is the next to be processed. Inspection of the fourth train's remembered sets reveals no inter-train references into it, but the inter-generational scan (possibly performed with the aid of FIG. 6's card tables) reveals inter-generational references into car 4.2. So the fourth train cannot be reclaimed yet. The garbage collector accordingly evacuates car 4.1's referred-to objects in the normal manner, with the result that FIG. 12I depicts.

In that state, the next car to be processed has only inter-generational references into it. So, although its referred-to objects must therefore be evacuated from the train, they cannot be placed into trains that contain references to them. Conventionally, such objects are evacuated to a train at the end of the train sequence. In the illustrated implementation, a new train is formed for this purpose, so the result of car 4.2's processing is the state that FIG. 12J depicts.

Processing continues in this same fashion. Of course, subsequent collection cycles will not in general proceed, as in the illustrated cycles, without any reference changes by the mutator and without any addition of further objects. But reflection reveals that the general approach just described still applies when such mutations occur.

SUMMARY OF THE INVENTION

I have devised a way of improving the productivity of a collector that employs the train algorithm or otherwise imposes a collection order on regions within a heap generation, as the train algorithm does on car sections. My approach is based upon associating respective youngest-and/or oldest-region indicators with those regions. The youngest- and oldest-region indicators associated with a given region represent limits on where references to objects in that region can be found. In a system in which younger car sections are numbered with higher numbers than older car sections, for example, a youngest-car indicator associated with car 3.2 and having a value of 4.2 indicates that no car younger than car 4.2 contains a reference into car 3.2. (Oldest and youngest in this discussion refer to priority in the current collection order rather than chronological age; if, as will be typical, the regions are car sections, the youngest car section is not necessarily the one that has been linked most recently into a train.) As will be seen below, the use of such youngest-and oldest-train indicators can sometimes enable the collector to identify some regions that may not initially belong to the collection set as "dead," i.e., as containing only objects that are unreachable, at least with respect to the portion of the heap outside the collection set. Regions known to be dead can be usually be collected easily, so the collector can add them to the collection set and thereby reclaim a relatively great amount of memory space with relatively little effort.

BRIEF DESCRIPTION OF THE DRAWINGS

The invention description below refers to the accompanying drawings, of which.

DETAILED DESCRIPTION OF AN ILLUSTRATIVE EMBODIMENT

The present invention can be practiced in a wide range of incremental collectors, not just those that treat the heap as divided into more than one generation, not just those that employ the train algorithm, and not just those that perform most of their collection in dedicated collection intervals. For the sake of example, though, the invention will be exemplified in a collector that exhibits those features, as the above example does.

As was mentioned above, the present invention employs youngest- and/or oldest-region indicators to recognize certain regions in the generation as being dead and therefore as candidates for addition to the collection set. In embodiments that employ the train algorithm, it will be convenient (although not absolutely necessary) that candidates for addition to the collection set be identified in units of car sections. It will also be convenient that the reference-containing regions identified by the illustrated embodiment's youngest- and oldest-region indicators be car sections, too. The illustrated embodiment employs the train algorithm and takes this approach, and those indicators will therefore be referred to below as youngest- and oldest-car indicators.

Figure 8A:
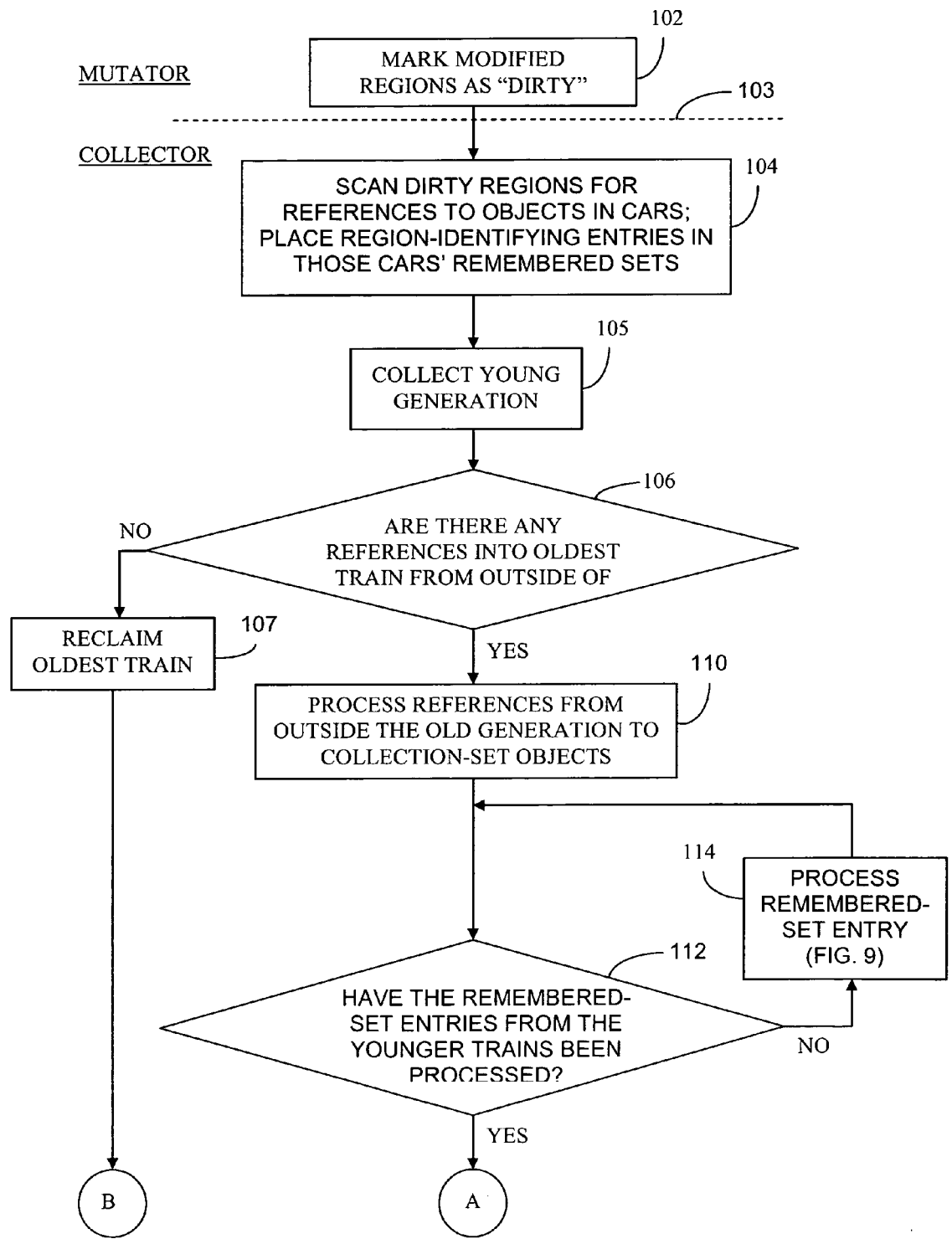
FIGS. 8A and 8B, discussed above, together constitute a flow chart that illustrates a garbage-collection interval that includes old-generation collection.
Figure 8B:
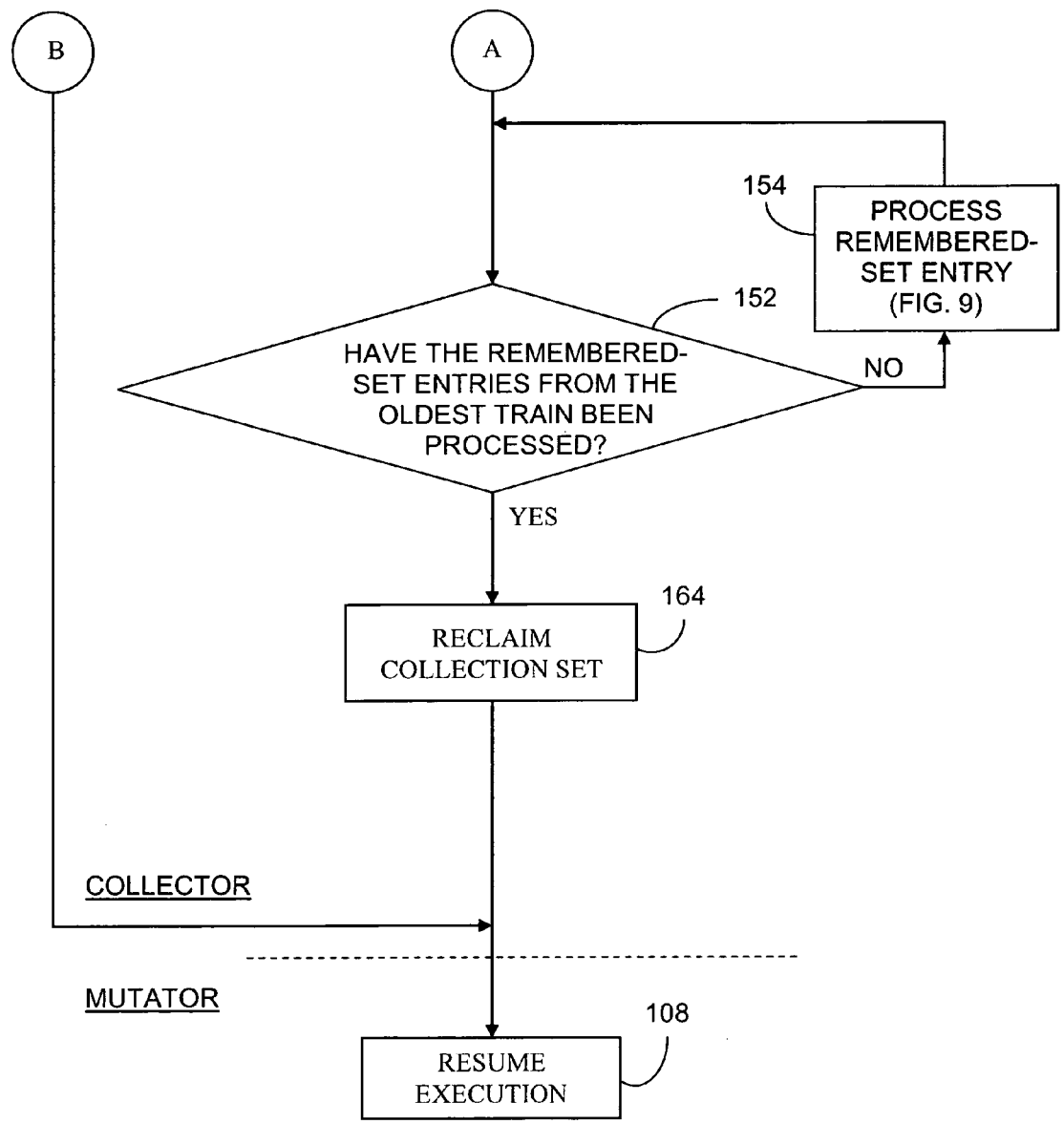
Figure 9:
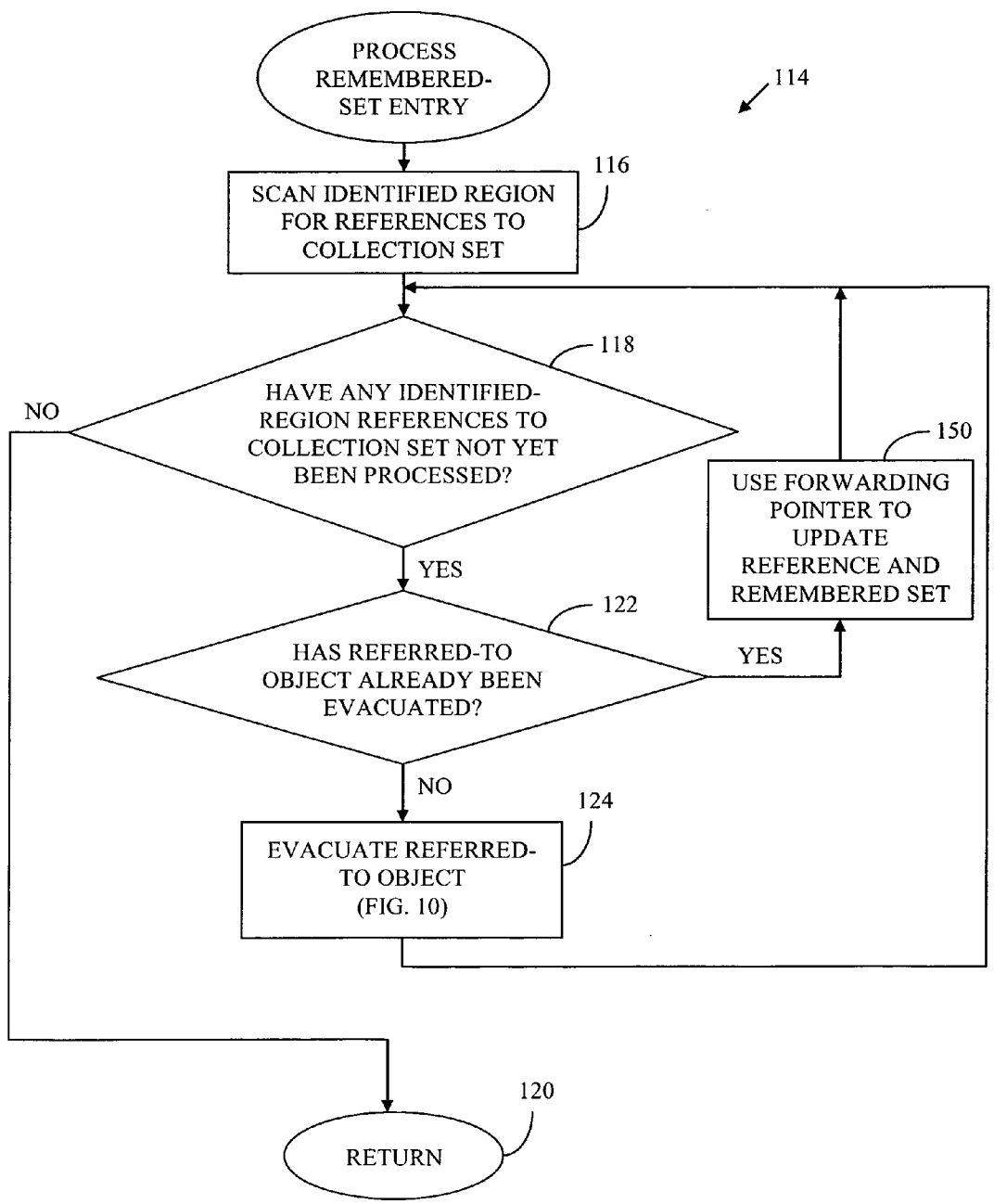
FIG. 9, discussed above, is a flow chart that illustrates in more detail the remembered-set processing included in FIG. 8A.
Figure 10:
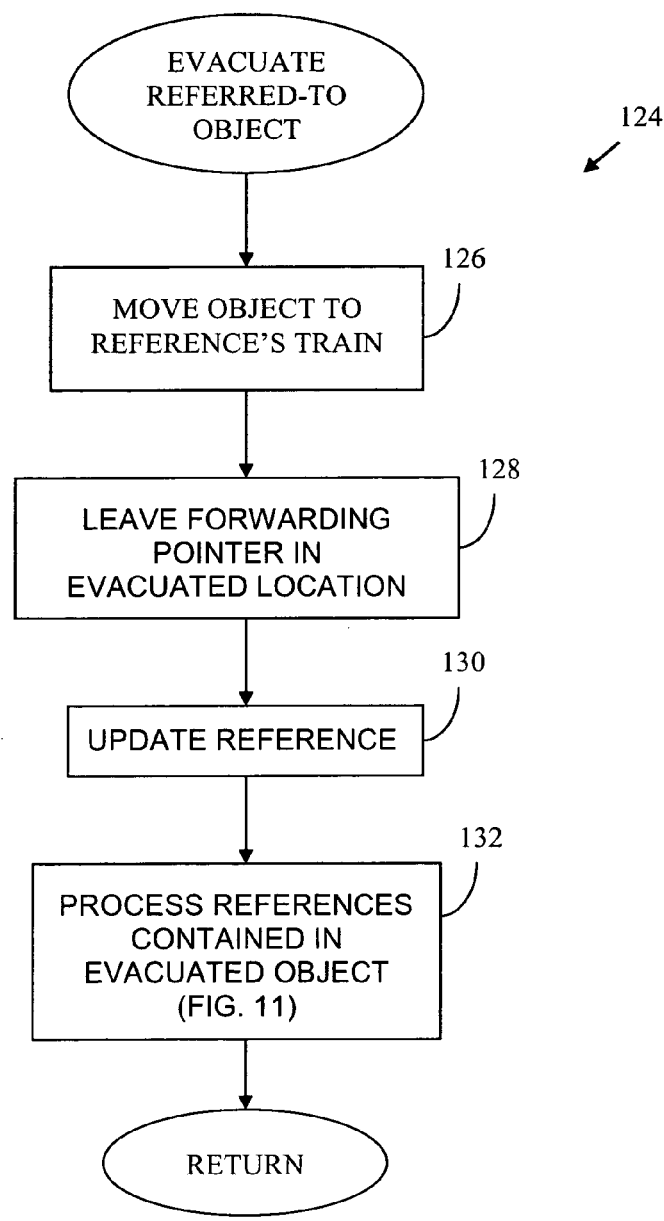
FIG. 10, discussed above, is a block diagram that illustrates in more detail the referred-to-object evacuation that FIG. 9 includes.
Figure 13A:
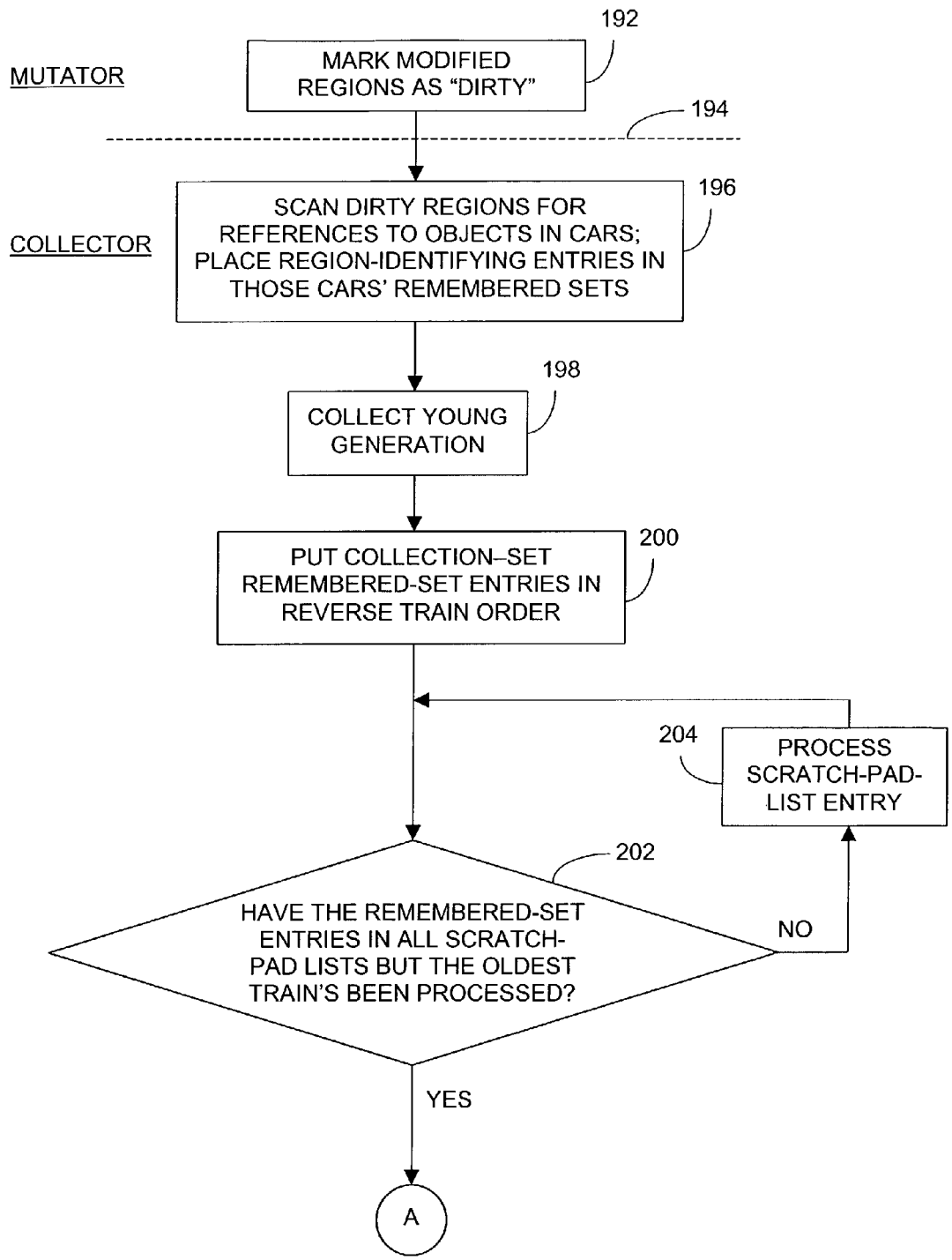
FIGS. 13A and 13B together constitute a flow char that illustrates a garbage-collection interval executed by an embodiment of the present invention.
Figure 13B:
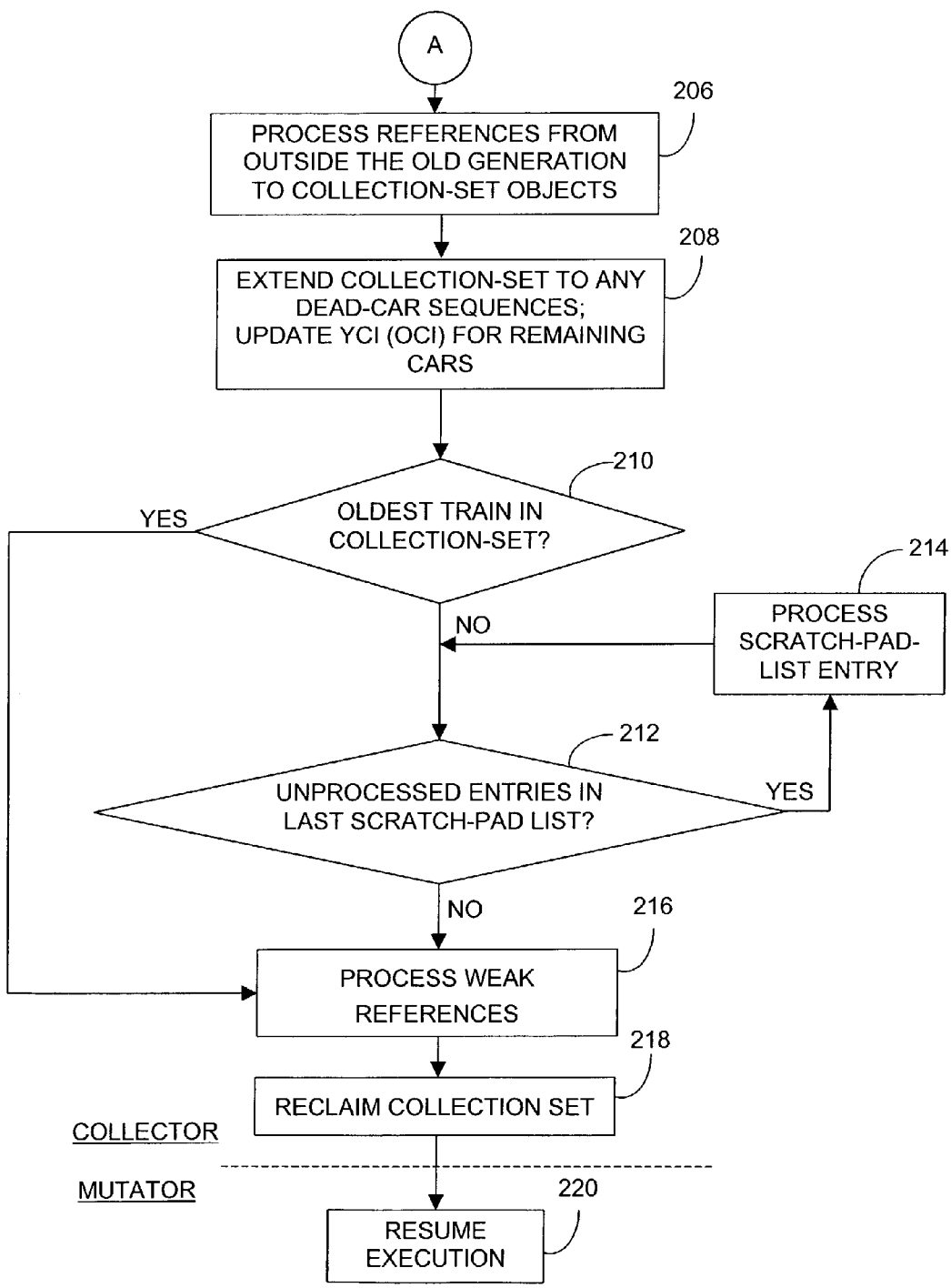

FIGS. 13A and 13B (together, "FIG. 13") illustrate the example collector's collection operation at the level that FIG. 8 employed to illustrate a conventional train-algorithm implementation. FIG. 13's overall sequence begins in a manner similar to that in which FIG. 8's does. In particular, blocks 172, 176, and 178 represent operations that roughly correspond to those that FIG. 8's blocks 102, 106, and 108 do, and dashed line 174 represents the passage of control from the mutator to the collector, as FIG. 8's dashed line 104 does.

But FIG. 13's remembered-set updating 176 (as well as the remembered-set updating that accompanies evacuation of objects from the collection set) is augmented to include maintenance of youngest- and/or oldest-car indicators. Consider youngest-car-indicator maintenance, for example. If the entry that the collector is adding to a given car's remembered set identifies a reference-containing location in a car younger than the one currently identified by the given car's youngest-car indicator, the collector updates the youngest-car indicator to a value representing that younger car. Oldest-car indicators are maintained similarly. If the system supports strong references (direct references or a chain of ordinary references from the root set to an object) and weak references (references to an object that all involve a weak reference object), the collector preferably places entries only for strong-reference-containing locations into the remembered-set data structure; to memorialize weak references' locations, it preferably employs some separate mechanism, such as a linked list through the objects that contain those weak references. And the youngest-and oldest-car indicators, too, are preferably updated only if the reference encountered by the collector is a strong reference. So the youngest-car indicator, for instance, preferably represents the youngest possible location only of strong references into the car with which the indicator is associated; there may be weak references in younger cars.

To implement the present invention's teachings, the illustrated embodiment also augments the young-generation-collection operation 178. As was explained above in connection with FIG. 8's block 106, the young-generation collection that block 178 represents includes (1) identifying as potentially reachable any young-generation objects to which references located outside the young generation refer and (2) identifying as potentially reachable any young-generation objects that are referred to by references in other potentially reachable young-generation objects. This involves scanning references in the basic root set and in the young generation for references to young-generation objects. In the process, the collector often encounters references to old-generation objects, too.

To understand what the illustrated embodiment does when it encounters such references, recall how externally referred-to old-generation objects are evacuated when the conventional train-algorithm routine described above in connection with FIG. 8 reaches old-generation collection. Any old-generation collection-set object referred to by an external reference—i.e., by a reference located outside the old generation—is evacuated during that old-generation collection to a car section belonging to the youngest, external-reference train. Specifically, it is evacuated to a train that is empty at the beginning of the increment and, during that collection increment, is reserved for objects referred to by external references or by references belonging to objects that have been evacuated to that train during the same increment.

In contrast, the FIG. 13 embodiment's old-generation collection does not always evacuate externally referred-to collection-set objects to an external-reference train. It does sometimes, though, so the collector prepares for this possibility when the young-generation collection operation 178 encounters an external reference to an old-generation object. If the referred-to object is in the collection set, the collector records that reference's location in a scratch-pad list that it associates with the external-reference train. If the referred-to object does not belong to the collection set, the collector will not thus record that external reference's location. For reasons that will become apparent in due course, though, it marks the referred-to object's car as one that contains an object referred to directly by an external reference.

The way in which such marking is done is not important. One possible way, though, is to make an appropriate entry in a metadata structure maintained for that car. That is, whereas a car section is a part of the heap that contains data generated and used by the mutator, the collector will typically keep additional information that it needs about the car section, which we will refer to as "metadata," in a typically separate structure.

Figure 14:
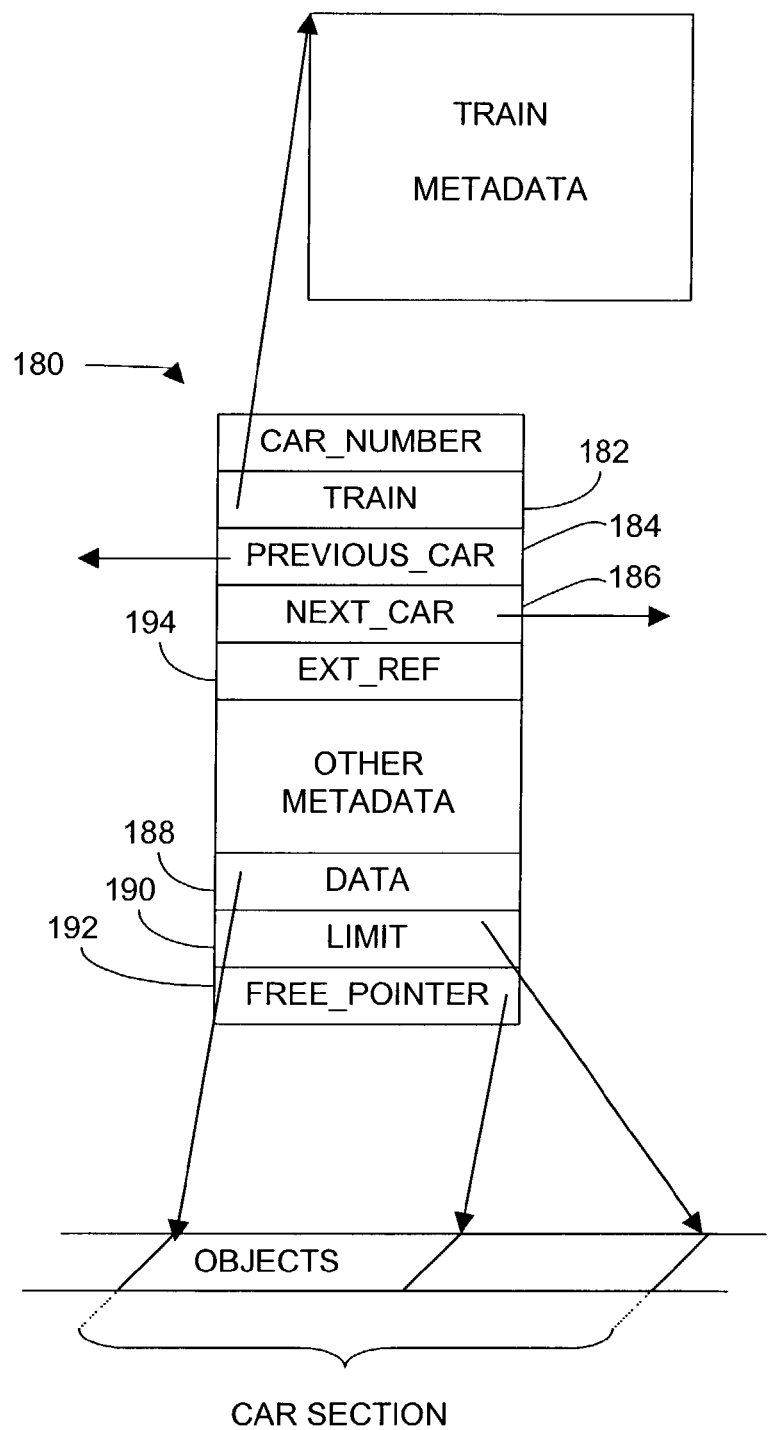
FIG. 14 is a data-structure diagram of a typical car structure.

Suppose the collector maintains car metadata in a structure such as FIG. 14's car structure 180, for example. FIG. 14 depicts typical fields 182, 184, and 186 as containing pointers to structures that respectively contain information concerning (1) the train to which the car belongs, (2) the previous car in the train, and (3) the next car in the train. Further pointers 188 and 190 point to the locations in the heap at which the associated car section begins and ends, whereas pointer 192 points to the place at which the next object can be added to the car section. A collector that employs the train algorithm would typically maintain a structure or structures containing these and/or other car metadata. So a typical way to mark a car is to enter a predetermined value in an appropriate field of such a structure. Car structure 180 is therefore shown as including a field 194 that indicates whether the car has been found to be externally reachable during the current collection increment.

When the young generation's collection has been completed, the collector turns to old-generation collection. As was mentioned above in connection with the conventional train-algorithm approach described above by reference to FIG. 8, a collector that employs such an approach finds internal references to collection-set objects by scanning locations represented by collection-set cars' remembered sets. When it finds such references, it evacuates the referred-to collection-set objects to the trains from which they were referred.

The FIG. 13 embodiment performs similar operations, but it includes an optimization that some embodiments may employ: it does not immediately evacuate collection-set objects to which its remembered-set processing finds references. The evacuation operation is instead preceded by an operation, represented by block 200, in which the collector places in reverse train order the references that it found during remembered-set processing. Specifically, the collector builds scratch-pad lists for respective trains by placing entries in each list that tell where references to collection-set objects can be found in the associated train.

With the scratch-pad lists thus built, the collector accesses them in reverse train order to find potentially reachable collection-set objects and evacuate them to respective trains, as blocks 202 and 204 indicate. The purpose of thus processing the references in reverse train order is to reduce the number of evacuations in subsequent increments. If a collection-set object is referred to from, say, both the seventh train and the twentieth train, it is better to evacuate it to the twentieth train rather than to the seventh train. Doing so avoids an evacuation to the twentieth train that otherwise would likely be required when the seventh train comes up for collection.

As block 202 indicates, the loop controlled by the test it represents does not encompass the processing for the oldest train's scratch-pad-list entries. Also, whereas the external-reference train is conventionally considered the youngest—and would thus be the first in a reverse train order—some embodiments may assign that train a greater "age." (Again, age in this discussion refers to pointers in the collection order, not necessarily to chronological age.) To reflect this fact, FIG. 13 includes block 206, which represents processing the external-reference train's scratch-pad list after all others except for the oldest train's. Other evacuation sequences are possible, too, of course. Indeed, there may be more than one external-reference train, and evacuation into different external-reference trains may be interleaved into different evacuation-sequence positions during evacuations into other trains.

As was mentioned above, collectors that employ the train algorithm determine whether any reference outside the oldest train refers to an object inside it. If none does, then the whole oldest train is collected without the need to process its cars' remembered sets. This can be looked upon as expanding the collection set when the right conditions are met. Block 208 represents performing a conditional collection-set expansion in the illustrated embodiment. As conventional approaches do, the illustrated embodiment adds the oldest train to the collection set if no references located outside that train refer to objects inside it.

But the test it employs for this purpose is different from that of conventional approaches, and it may also add more or less than a whole train to the collection set. Specifically, the collector uses youngest- and/or oldest-car indicators to identify dead cars and add some or all of them to the collection set, as will be explained below. If all of the oldest train's cars are thereby found to be dead, the whole train can be added to the collection set. If less or more than all of the train's cars are found to be dead, they can still be added, even though they make up more or less than a train.

Before we describe the ways in which the collector may thus extend the collection set, we will complete the discussion of FIG. 13's collection increment. Block 208's collection-set expansion operation is shown as occurring after the occurrence of all evacuation except that of the collection-set objects referred to only from the oldest train. Now, it is not essential to perform that operation at that point in the collection increment. Indeed, there are reasons why performing it before or after all evacuation, for example, may be preferable in some embodiments. For example, commonly owned co-pending U.S. patent application Ser. No. 10/313,254 of Alexander T. Garthwaite, which is entitled Combining External and Intragenerational Reference Processing in a Garbage Collector Based on the Train Algorithm, was filed on the same date as this application, and is hereby incorporated by reference, discusses some of the advantages of various reference-processing sequences. Since the illustrated embodiment performs collection-set expansion operation before the oldest train's scratch-pad-list entries have been processed, though, that operation may have added the whole oldest train to the collection set and thus made searching for references to its objects unnecessary. So, as blocks 210, 212, and 214 indicate, the collector processes those entries—and evacuates any potentially reachable objects thereby found—only if the collection set's expansion has not included the entire oldest train.

Some embodiments of the invention will be employed in systems that support weak references. Preferably, evacuation operations corresponding to those described so far are based only on strong references even for those systems, so block 216 represents processing the weak references after all strong-reference processing has occurred. As blocks 218 and 220 indicate, the collection set's memory space can then be reclaimed, and the mutator can resume execution.

We now turn to the collection-set-expansion operation that block 208 represents. In most embodiments its goal is to find cars that, without searching their remembered sets, can be identified as containing only garbage. In essence, this is a generalization of what was referred to above as the train algorithm's central test. It arises from recognition that, although evacuation in accordance with train membership is necessary in order to group garbage data structures, the train need not be the unit employed for finding regions that contain only garbage. Actually, as will be seen below, the invention can be practiced in such a way as to declare some cars dead, and thus eligible for addition to the collection set, that contain objects reachable through reference chains that include references in the collection set. Even though such cars may contain non-garbage objects, their collection, too, is relatively inexpensive, because it does not require that their remembered sets be processed.

Figure 15:
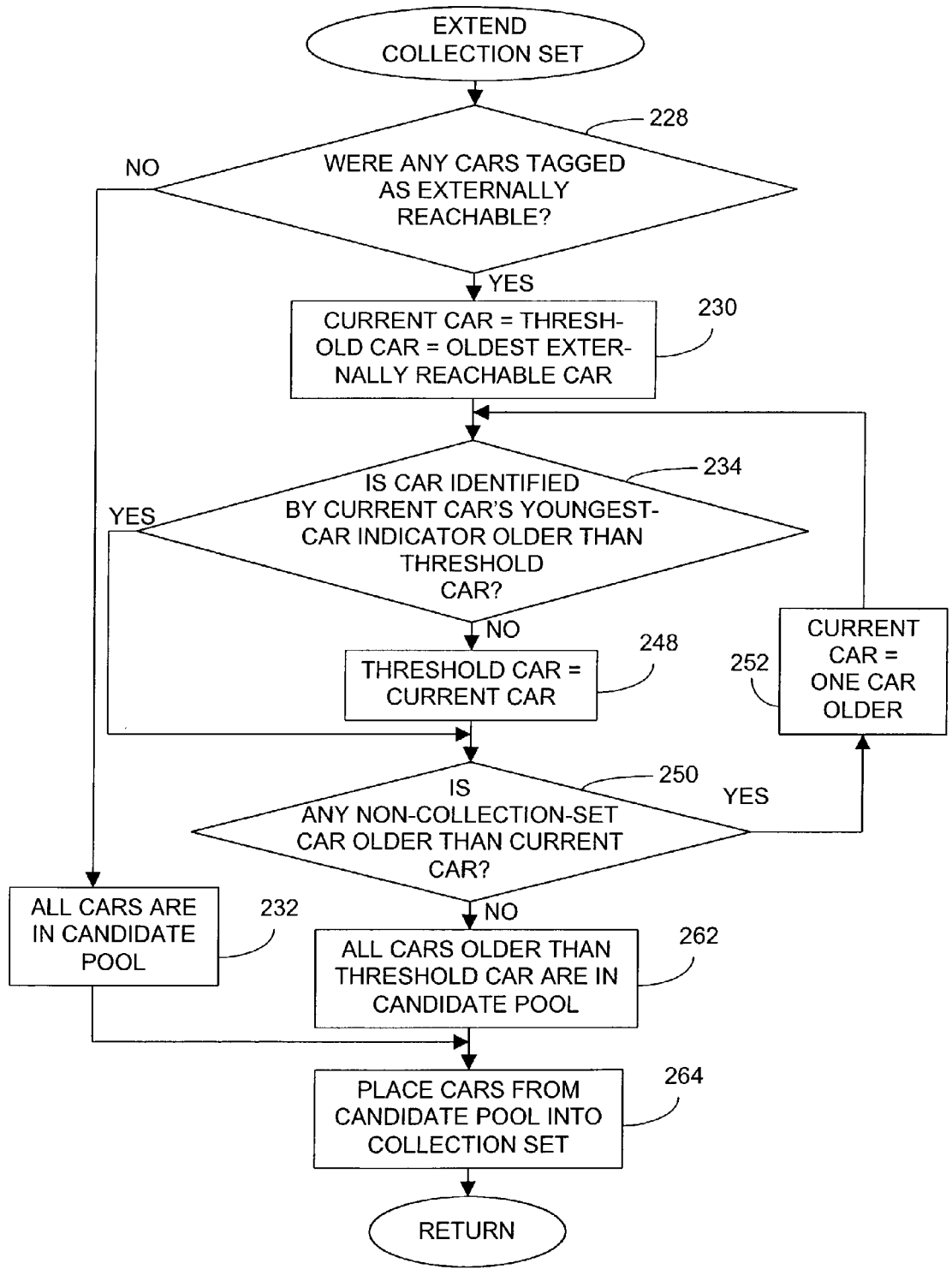
FIG. 15 is a flow chart of a routine used by one embodiment of the invention to expand the collection set.

FIG. 15 illustrates one way of performing the present invention's collection-set-expansion. Its particular approach employs youngest-car indicators but not oldest-car indicators. As blocks 228 and 230 indicate, it begins by finding the oldest car, if any, that was marked, typically during young-generation collection, as reachable from outside the generation. If no cars were so marked, the collector can conclude that no object in the generation is strongly reachable from outside the generation. The entire generation therefore contains only dead or dying objects, so all cars are candidates for addition to the collection set, as block 232 indicates.

Ordinarily, though, at least one car will contain one or more objects to which a reference located outside the generation refers. So the collector normally proceeds to the test that block 234 represents. To understand this test, consider FIG. 16, in which reference numeral 236 identifies a collection set depicted as containing two car sections, and in which the remainder of the generation's object-containing portion is depicted as organized into three trains 238, 240, and 242. The curved arrows represent respective youngest-car indicators. For instance, curved arrow 244 represents car section 2.3's youngest-car indicator and depicts it as indicating that no car younger than car section 2.5 contains a reference to an object in car section 2.3.

Straight arrow 246 represents a mark made to indicate that car section 2.3 contains an object referred to by an external reference, i.e., by a reference located outside the generation. We will assume that car section 2.3 is the oldest car that contains an object potentially referred to by an external reference. That is, car 2.3 is the car that the collector identifies in FIG. 15's block-230 operation, in which the collector also adopts this car as its initial "reachability threshold." The meaning of that designation will presently become apparent.

Since the collector has identified a reference located outside the generation that refers to an object in car 2.3, the collector must treat that car as potentially containing reachable objects. Adding that car to the collection set would therefore require inspecting that car's remembered set, whereas the intention of the FIG. 15 operation is to add to the collection set only cars for which this is unnecessary. So that car will not be a candidate for addition. Moreover, the FIG. 15 operation will not be able to add any younger cars to the collection set, either; since that operation deals only with youngest-car indicators, it has no way of determining whether car 2.3, which is older than those younger cars, has any references into them. This is why car 2.3 is a reachability threshold: the FIG. 15 operation will be unable to rule out the reachability of objects in any cars as young as or younger than car 2.3.

The collector now proceeds to determine whether it can infer from any older car's youngest-car indicator that no car as young as the reachability threshold contains a reference into that older car. To this end, the collector performs the operation represented by block 234. Initially, the current car, car 2.3, is the same as the threshold car, and the car identified by that car's youngest-car indicator 244 is car section 2.5. So the block-234 test's outcome is negative: this car section's youngest-car indicator is indeed at least as young as the current threshold car section, namely, car section 2.3, so its reachability cannot be ruled out. The threshold car section therefore becomes (or, in this case, remains) the current car section, as block 248 indicates.

Figure 17:
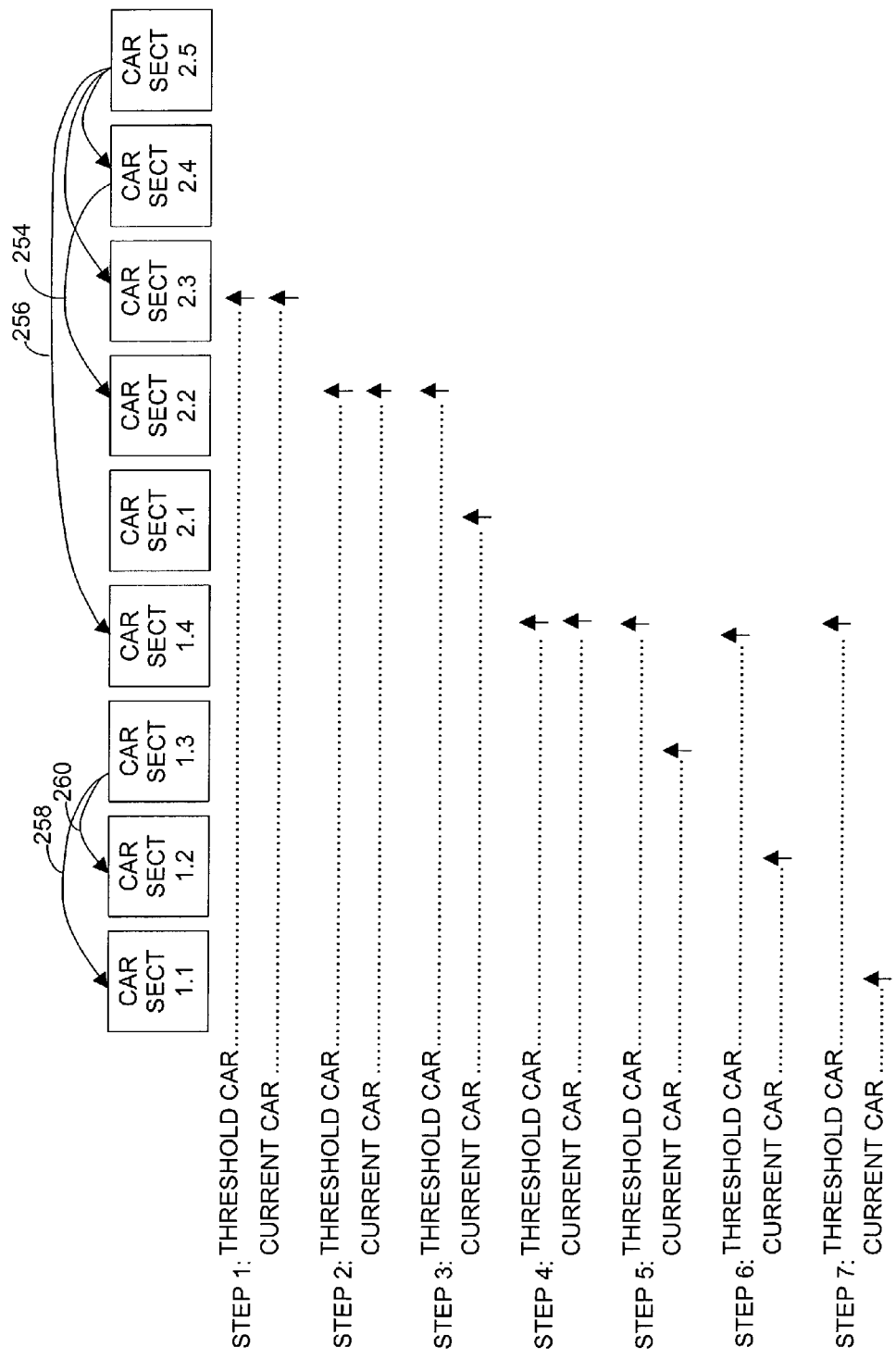
FIG. 17 is a diagram that depicts that routine's progress through successive routine steps.

Since further cars remain ahead of the current car section 2.3, the collector advances to the next car, as FIG. 15's blocks 250 and 252 indicate, and repeats the loop for each older car. FIG. 17 illustrates the resultant progression. That drawing shows that car section 2.3 is both the current car and the resultant threshold car at the end of "Step 1," i.e., of the first pass through the loop just described. In the second step, the collector observes in the test represented by FIG. 15's block 234 that car section 2.2's youngest-car indicator, represented by FIG. 17's curved arrow 254, identifies car section 2.4. This car is younger than the previous threshold car section, namely, car section 2.3, so the result of FIG. 15's block-234 operation is negative. FIG. 15's block-248 instruction is therefore executed in FIG. 17's second step and results in car section 2.2's becoming the threshold car section.

In the third step, the collector considers car section 2.1. Now, FIG. 17 contains no curved arrow at all pointing into car section 2.1. The meaning of the youngest-car-indicator value that this is intended to represent indicates that there are no references pointing into car section 2.1 from any car section younger than car 2.1. Now, some other implementations of the present invention will so maintain their youngest-car indicators as to identify the youngest such car even if it is older than the car with which the youngest-car indicator is associated. In the illustrated embodiment, though, the youngest-car indicator associated with a given car is used to keep track only of reference-containing cars that are younger than the given car. So the value of car section 2.1's youngest-car indicator does not also mean that there are no references into car section 2.1 from older car sections.

In any event, the value of car section 2.1's youngest-car indicator could be, say, NULL, identifying no car, to represent this absence of any younger car section containing a reference into it. In the illustrated embodiment, though, it is preferable for it to identify car 2.1 itself. To understand why, consider the usual nature of a youngest-car indicator's contents. Typically, the contents would not simply be the identified car's position in the collection sequence. Although some embodiments of the present invention may implement the youngest-car indicator in that manner, doing so necessitates updating youngest-car indicators when, as can happen in some train-algorithm implementations, the cars that youngest-car indicators identify are re-linked into new positions in the collection sequence.

So it is preferable for the youngest-car indicator's value to be something like a pointer to the thereby-identified car section's metadata structure, whose location ordinarily would not be changed when the car section's collection-sequence position changes. This being the case, operations in which the youngest-car indicator's value is used, say, for comparing the indicated car's collection-sequence position with that of some other car will normally include following that indicator as a pointer. If a possible value of that pointer is NULL, though, the routine for making the comparison always needs to start with a test for that value if it is to avoid a null-pointer exception. No such test is needed, though, if the youngest-car indicator instead points, as it does in the illustrated embodiment, to the metadata structure for the car with which that youngest-car indicator is associated.

A similar approach can be employed in embodiments in which the youngest-car indicator also keeps track of reference-containing cars older than the car with which the youngest-car indicator is associated. Such embodiments would provide a metadata structure for a "zero car," i.e., for a fictional car that is older than any actual car section in the generation. Whereas the illustrated embodiment's youngest-car indicators are initialized with pointers to the metadata structures for the car sections with which they are associated, therefore, such indicators would preferably be initialized with a pointer to such a zero-car metadata structure in embodiments in which the youngest-car indicator for a given car section can identify cars older than the given car section.

Since no younger car contains a reference to an object in car 2.1, the threshold car remains car 2.2 at the end of the third step; the collector can rule out car section 2.1's having any object referred to by a reference in a car as young as the current reachability threshold.

In the fourth step, though, car section 1.4's youngest-car indicator 256 identifies car section 2.5. Since that car section is younger than the previous reachability-threshold car section, i.e., than car section 2.2, the threshold car section becomes car section 1.4.

The threshold advances no further in the fifth through seventh steps. Car section 1.3's youngest-car indicator identifies car section 1.3 itself, and car section 1.1's and 1.2's youngest-car indicators 258 and 260 identify car section 1.3. Since that car section is not as young as the threshold car section, namely, car section 1.4, the threshold car section remains car section 1.4 through the remaining steps of the process.

When car section 1.1's youngest-car indicator has been tested, FIG. 15's block-250 test concludes that no cars are left to review. In the illustrated scenario, therefore, the collector can reliably conclude, without reviewing their remembered sets, that car sections 1.1, 1.2, and 1.3 contain no objects that are strongly reachable, at least by way of reference chains that do not pass through the collection set. They are therefore candidates for addition to the collection set, as FIG. 15's block 262 indicates.

Actually, some objects in those cars may still be reachable through collection-set objects. Suppose, for example, that car section 1.4 is in the oldest train, whose scratch-pad-list entries have not yet been processed, and that it contains a reference to a collection-set object that in turn contains a reference to an object in car section 1.1. That object will have to be evacuated when the oldest train's scratch-pad list is processed.

Some embodiments may perform the expansion in such a way as to avoid the need for any such evacuation from added cars. For instance, some may perform a test corresponding to FIG. 15's block 250 in a different fashion. Specifically, they may retain youngest-car indicators for the cars in the initial collection set and continue the operation of finding potentially live cars until that operation has considered all cars, including those in the collection set. Performing the operation in that fashion would mark cars that still need evacuation and would thereby prevent their being included in the collection-set expansion.

Figure 11A:
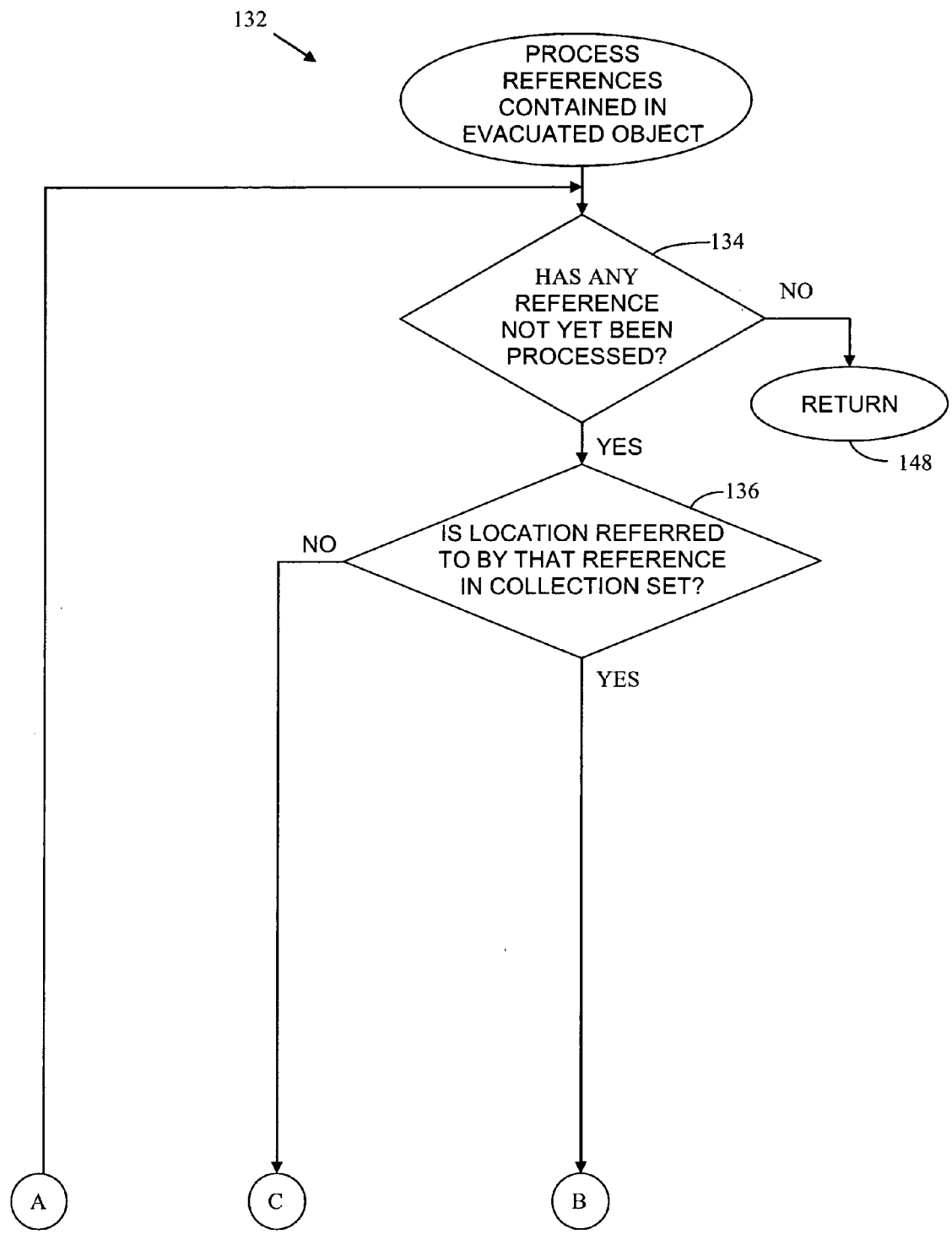
FIGS. 11A and 11B, discussed above, together form a flow chart that illustrates in more detail the FIG. 10 flow chart's step of processing evacuated objects' references.
Figure 11B:
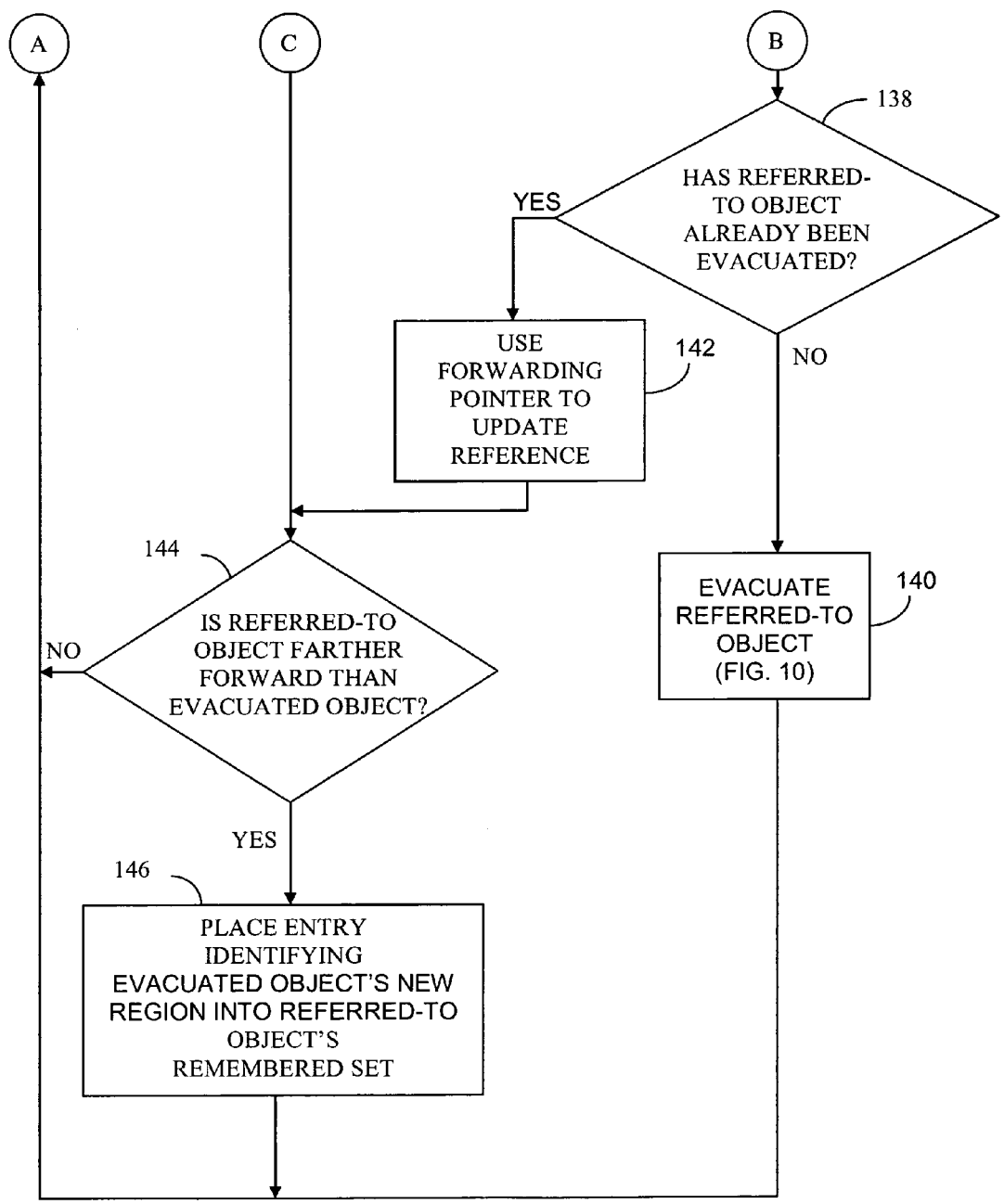
Figure 12A:
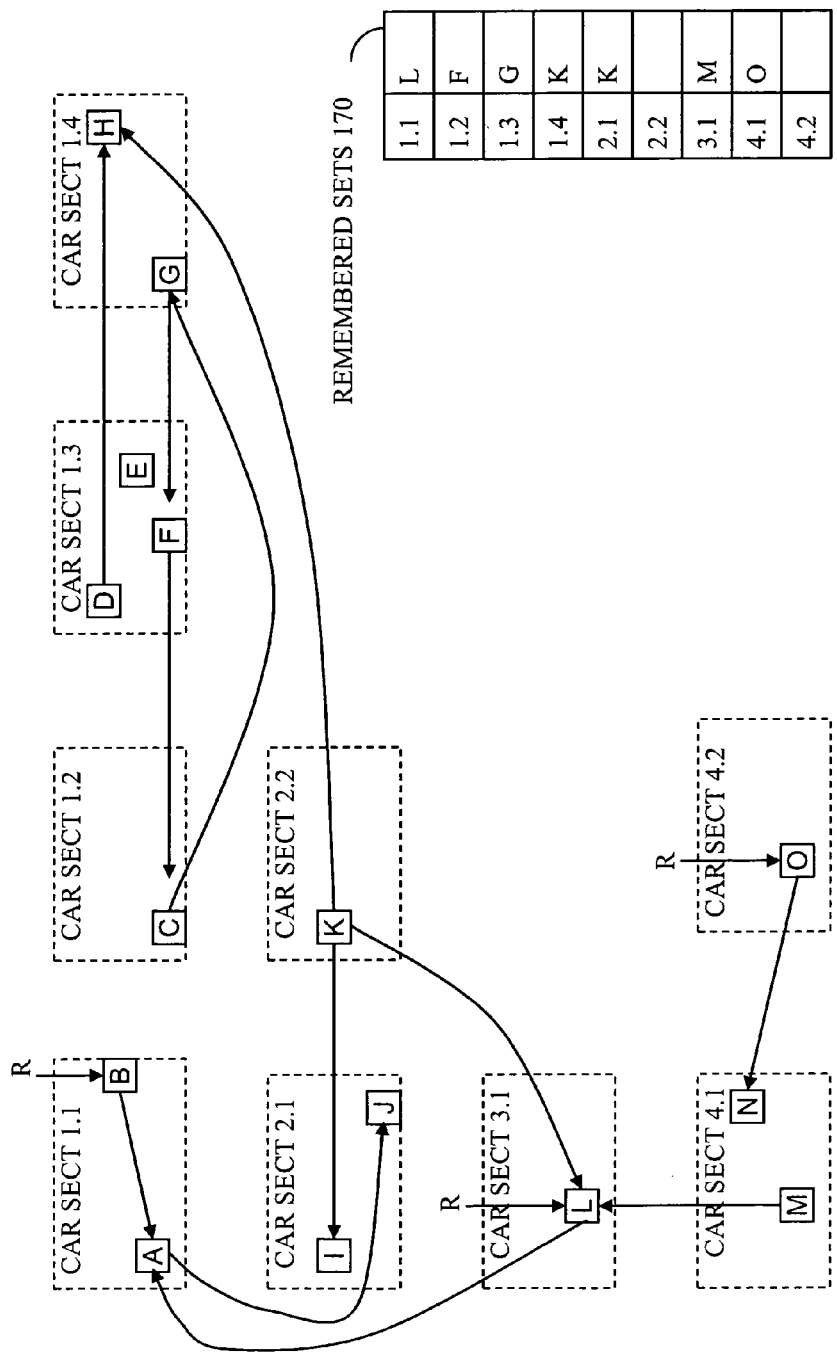
FIGS. 12A–12J, discussed above, are diagrams that illustrate a collection scenario that can result from using the train algorithm.
Figure 12B:
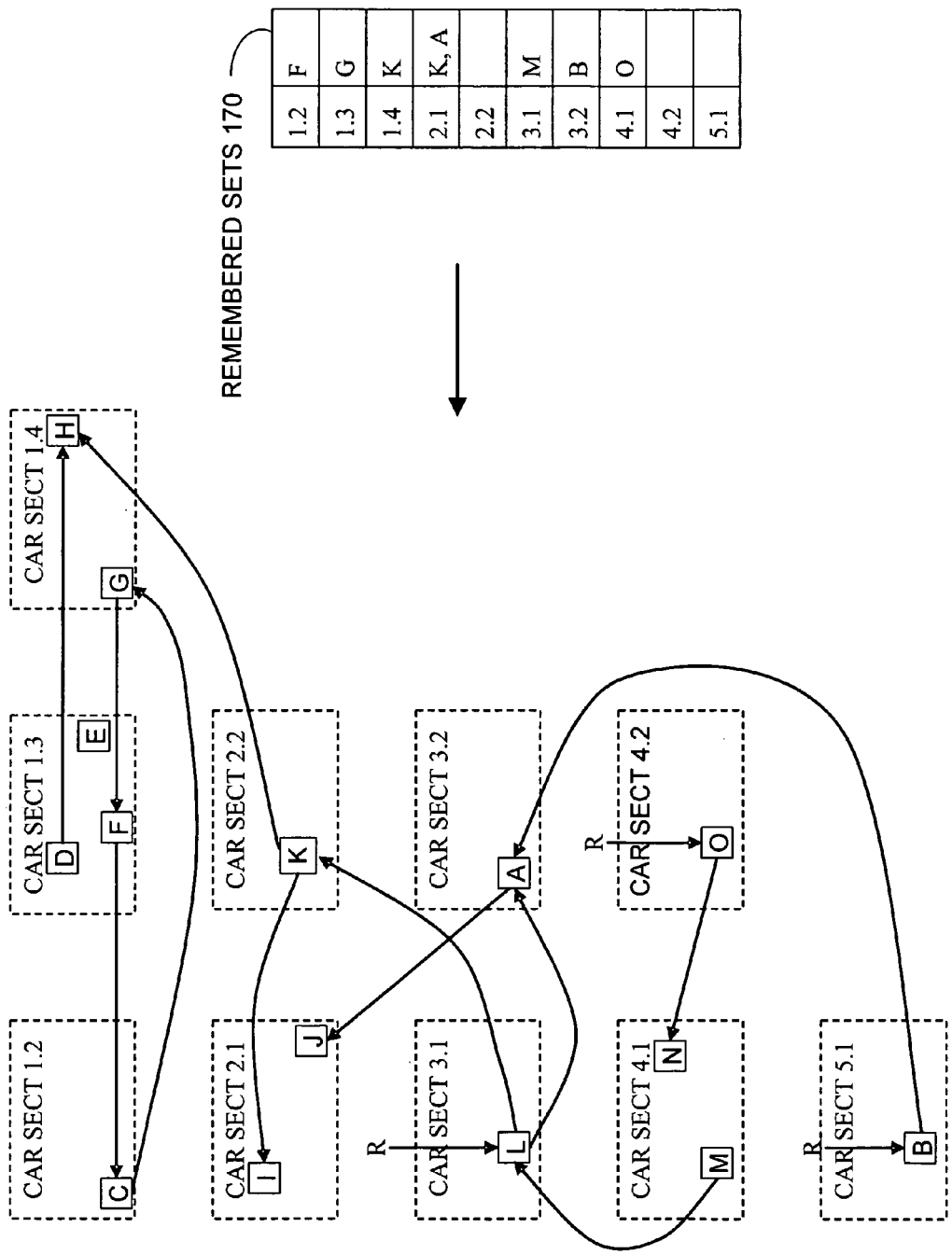
Figure 12C:
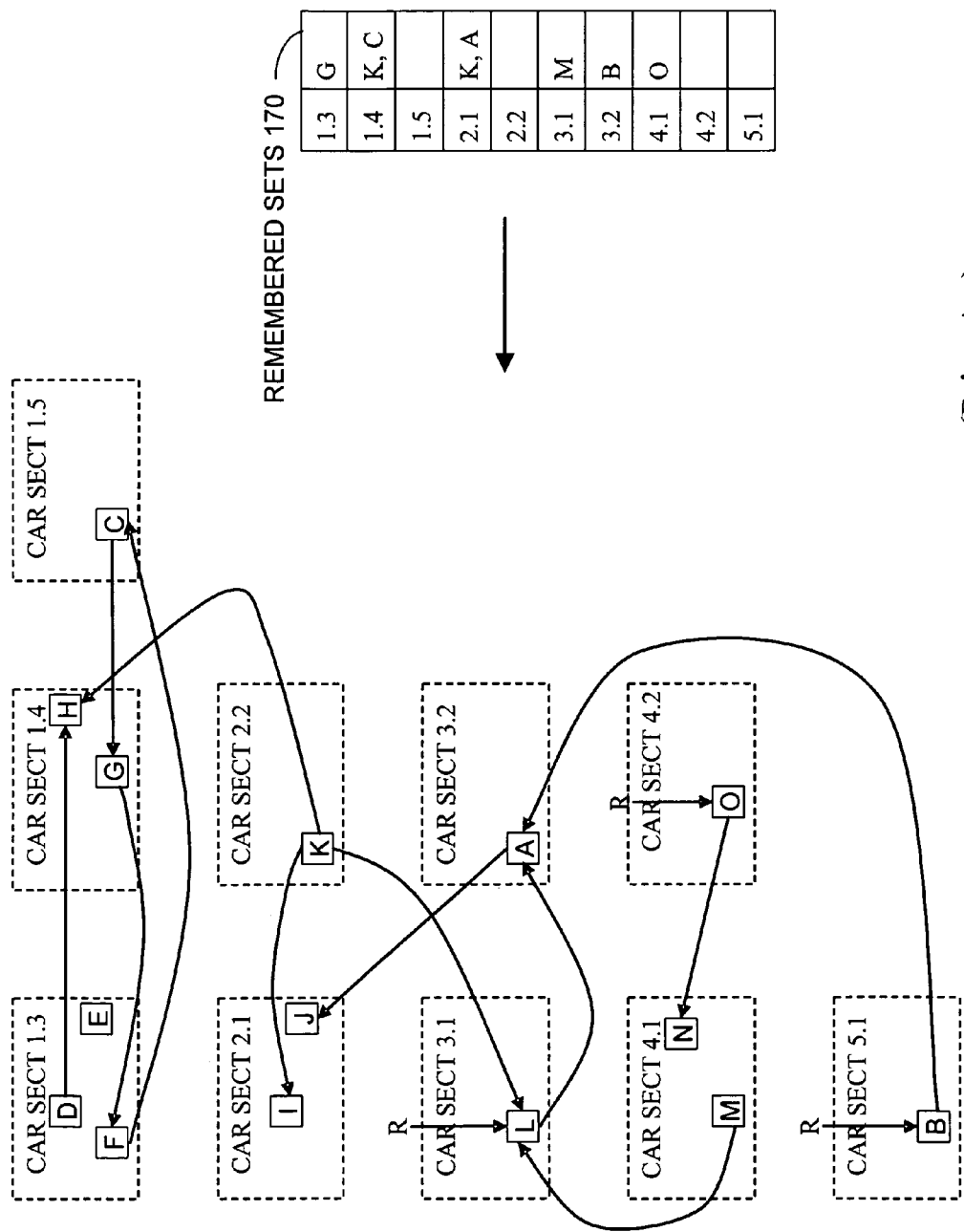
Figure 12D:
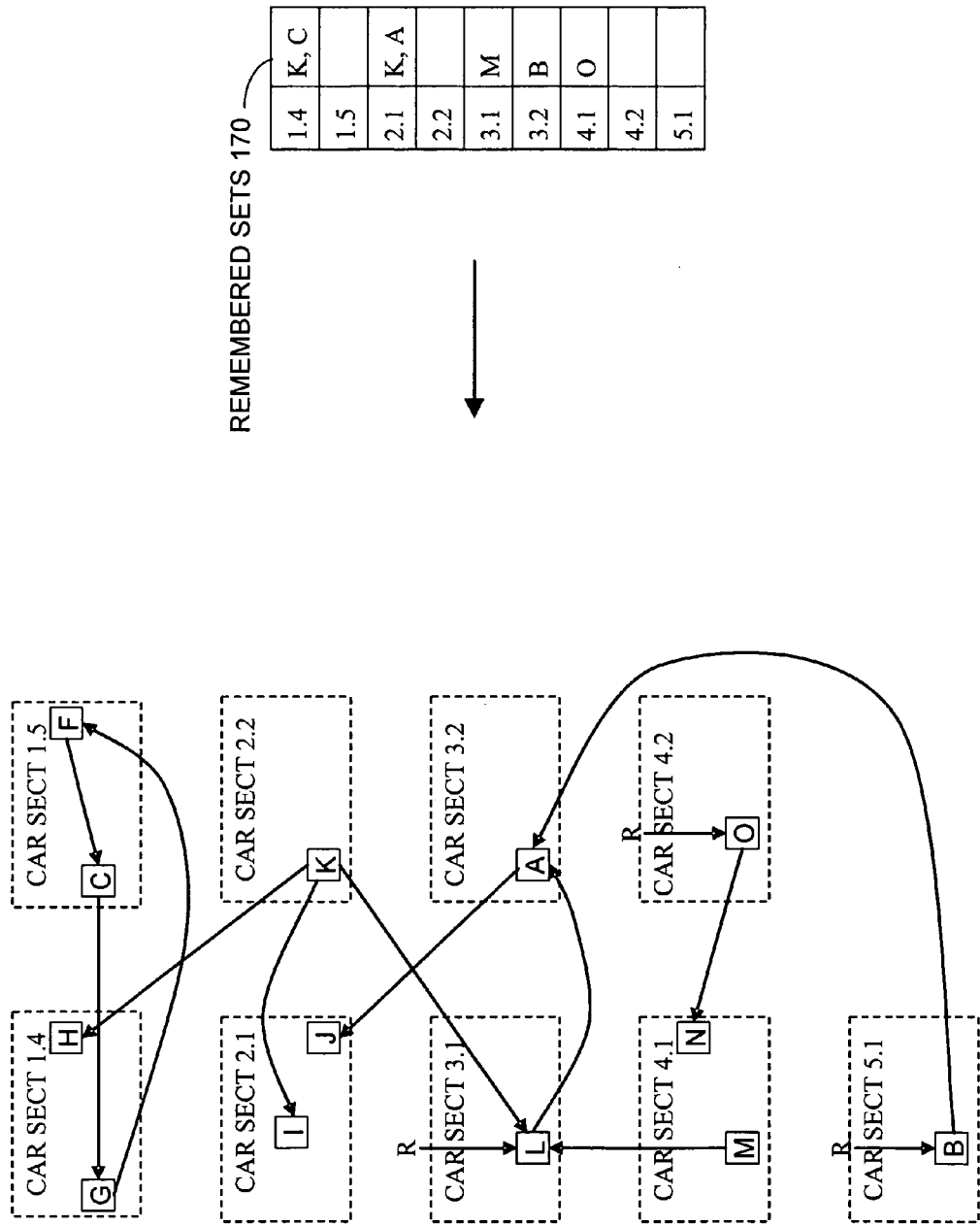
Figure 12E:
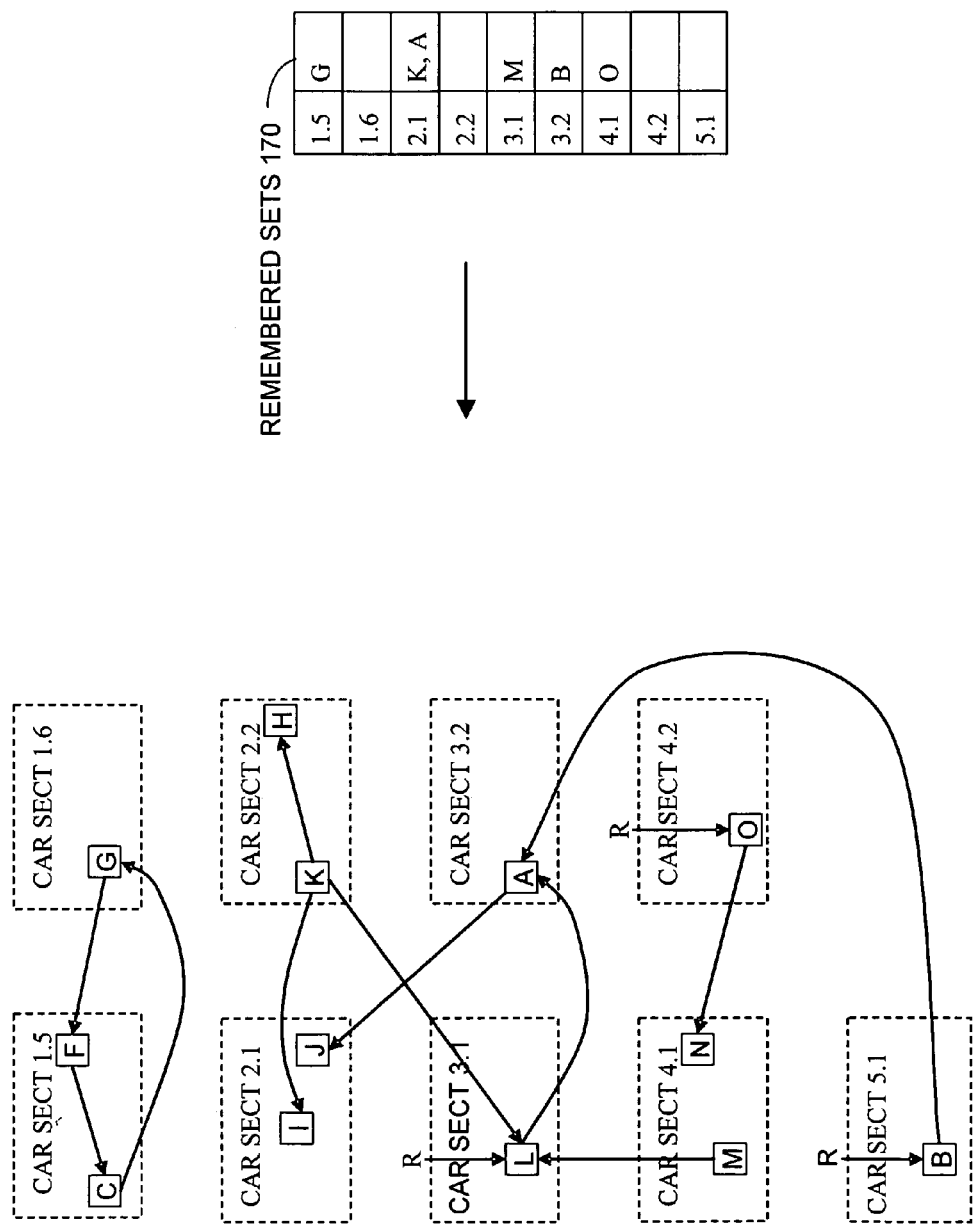
Figure 12F:
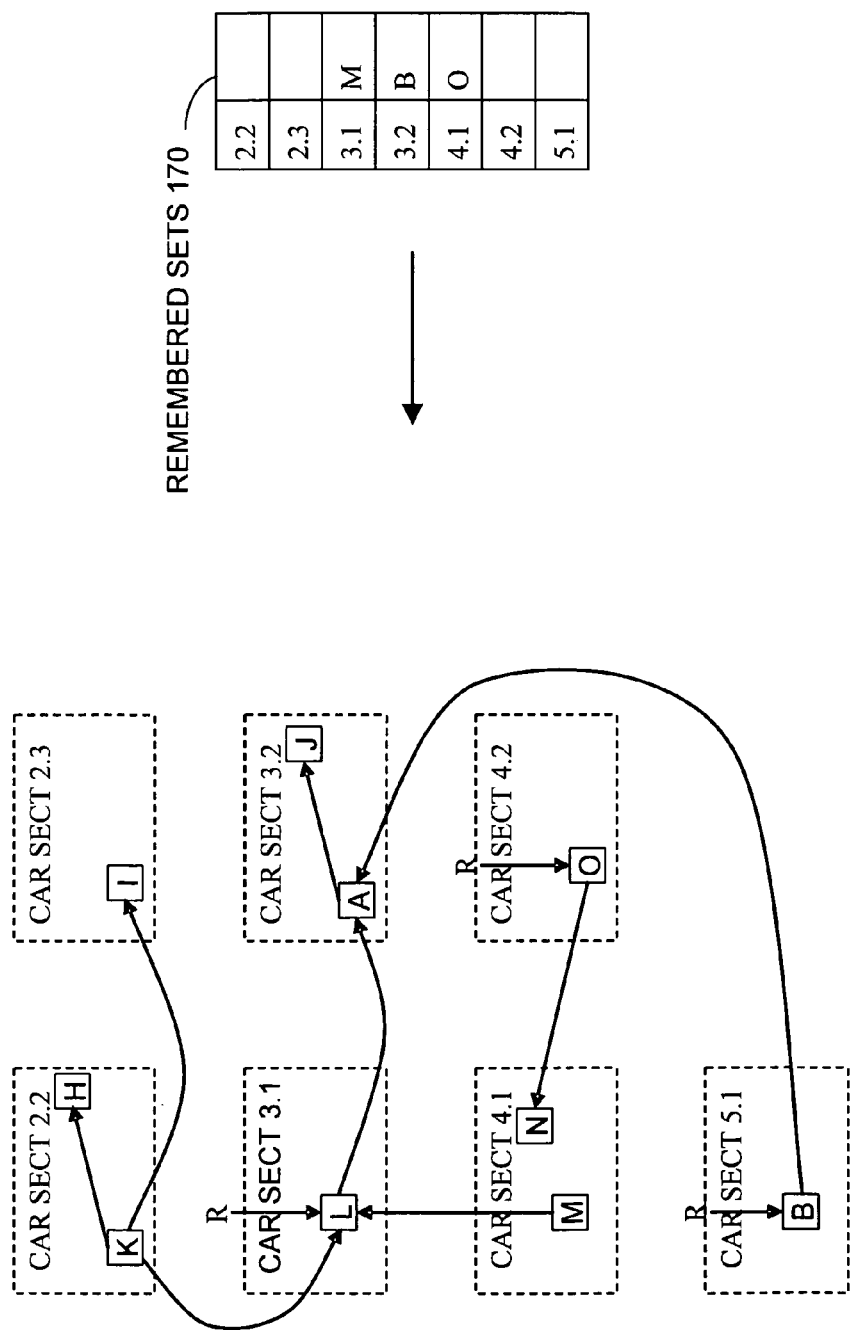
Figure 12G:
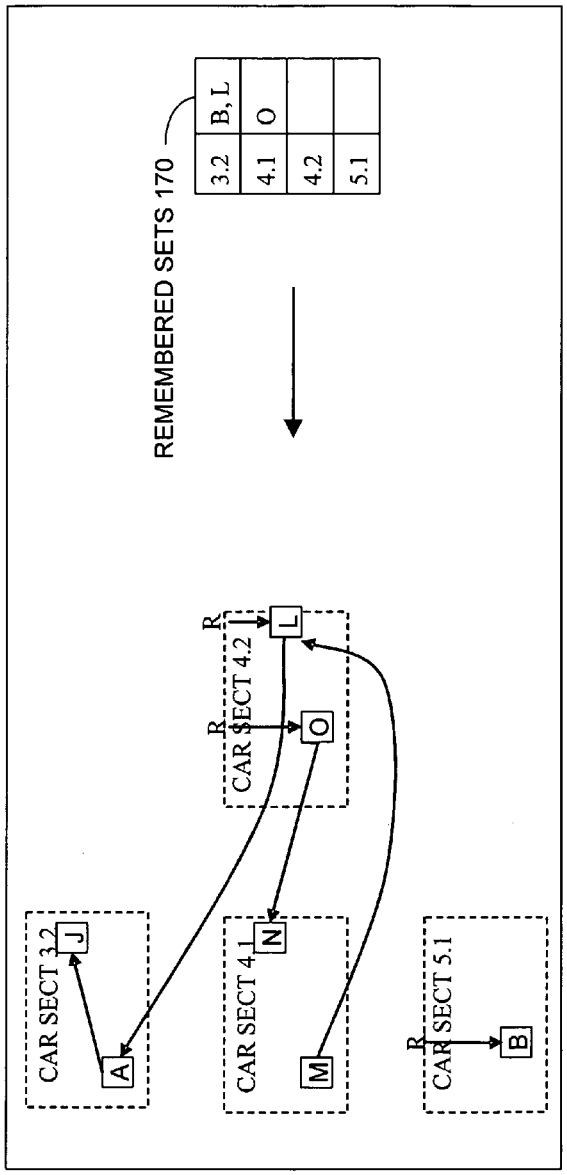
Figure 12H:
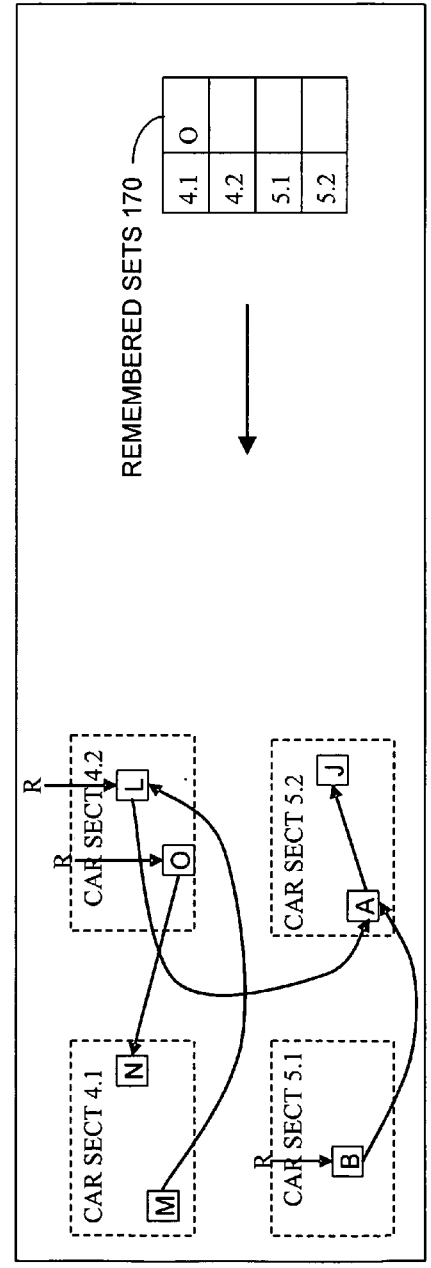
Figure 12I:
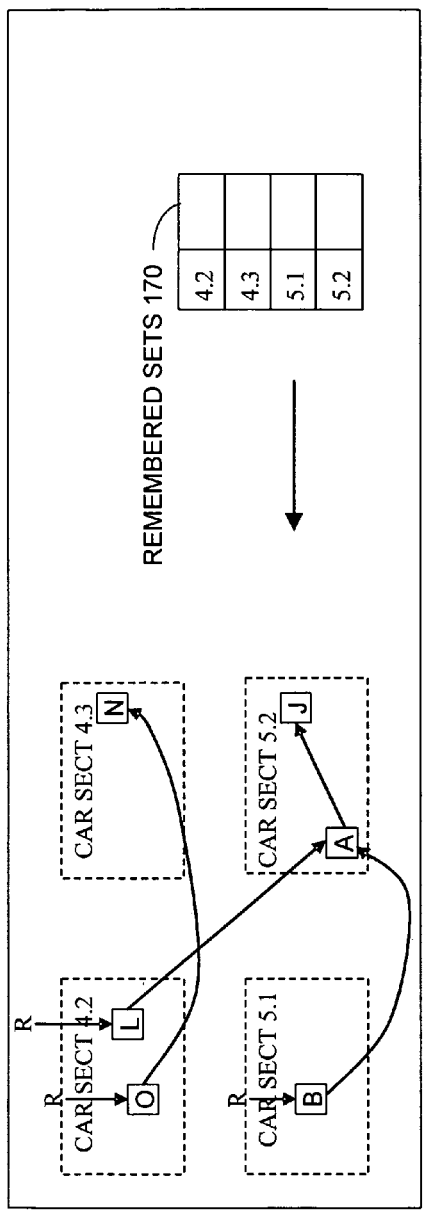
Figure 12J:
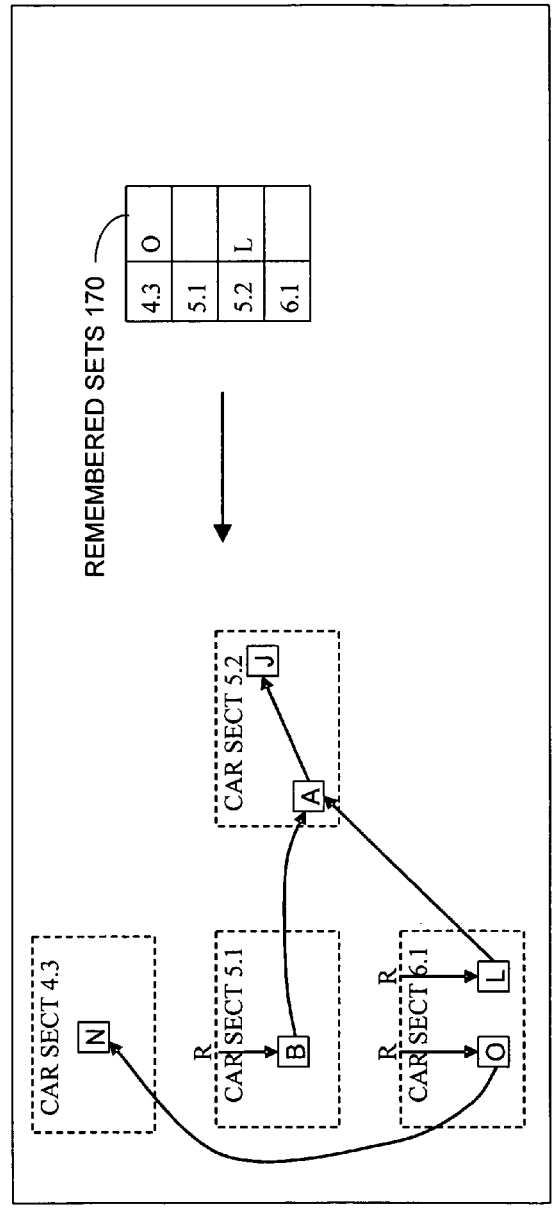

Another way to avoid such evacuation is to postpone collection-set expansion until after all evacuation. This, too, would prevent cars that still need evacuation from being included in collection-set expansion. As FIG. 11B's block 146 indicates, evacuation of a collection-set object is accompanied by the collector's updating the remembered set associated with the car containing the referred-to object. This would typically be accompanied in the present invention's embodiments by youngest- and/or oldest-car-indicator updating, and that would result in a car's being recognized as reachable through an erstwhile collection-set object.

As will be seen below, other approaches to collection-set expansion, too, can eliminate the need to evacuate objects from added cars.

Now, different collectors will base their choices of initial collection-set size on different criteria. But a main criterion will normally be the collection-increment duration; at least if the collector is not operating concurrently with the mutator and the increment is not divided among several intervals, the collection-set size should be so chosen as to avoid causing too great a pause time in mutator operation. Suppose, for instance, that the collection-set size chosen in accordance with this criterion in the illustrated scenario was two car sections. To avoid too great a pause time, the collector could decide not to extend the collection set to include all three further car sections that have now been determined to be dead.

Now, some embodiments will include dead cars in the collection set preferentially. That is, a car that has not been identified as dead is included in the collection set only if all cars that have been are, too. Such an embodiment will not necessarily form an initial collection set before the collection-set-expansion operation. In that case all cars would be considered to be outside the collection set for the purposes of that operation, and the operation of "adding" identified dead cars would itself be the initial collection-set formation. In such embodiments, it is less likely that not all identified dead cars would be added. But the dead cars may not yield a large enough collection set by themselves, so the collector may, say, supplement the dead cars with cars not identified as dead.

Even in a collector in which an initial collection set has been formed before the operation of identifying dead cars, though, the typical embodiment would probably add all three dead cars in this scenario; their addition to the collection set would be unlikely to increase pause time greatly. In contrast to the processing of the two initial collection-set car sections, these three additional car sections' processing will not involve consulting remembered-set entries, searching for references in the locations that they identify, and selectively evacuating the objects to which those references refer. As was just explained, the oldest train's scratch-pad-list processing may in some embodiments result in a certain amount of evacuation from those additional car sections, but there usually will not be much evacuation of that sort.

True, adding dead cars also involves additional weak-reference processing in some embodiments. But the number of weak references is usually small. Also, if the original collection set's weak-reference processing is, as in the illustrated embodiment, delayed until it can be performed together with any such processing needed for the added cars, the collector can minimize the impact of the additional weak-reference processing. Specifically, the collector will thereby save the cost of a context switch to the weak-reference-processing routine, avoid some of the attendant page faults, etc.

In the step that FIG. 15's block 264 represents, therefore, the collector will typically add all candidate cars it has identified. It then performs the remainder of FIG. 13's collection increment.

FIG. 13 depicts the collection-set expansion as occurring before any weak-reference processing. This is particularly beneficial in embodiments in which the youngest-car indicators are maintained without considering weak references, as was suggested above. As was mentioned above, expansion cars may require weak-reference processing, and some savings results from performing such processing together with the weak-reference processing for the collection set's original members.

Of course, weak references could be taken into consideration in maintaining the youngest-car indicators. This would eliminate the need for weak-reference processing in connection with the cars that the collection-set-extension operation adds, so some embodiments may maintain the youngest-car indicators in that manner. But it is preferable not to do so, because doing so unduly restricts the pool of candidate expansion cars.

Figure 16:
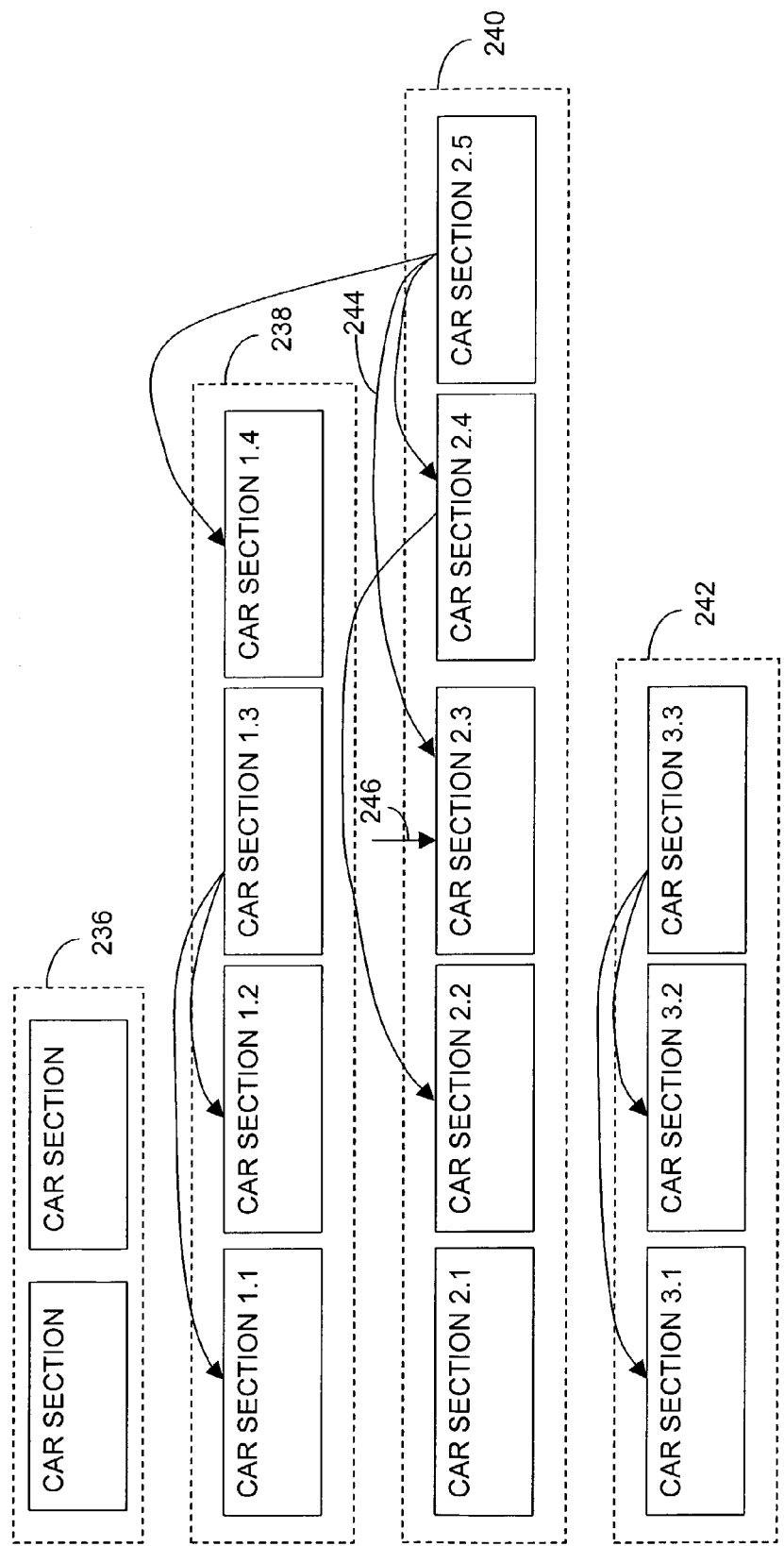
FIG. 16 is a block diagram that illustrates one scenario in which that routine may be used.

The type of collection-set-expansion operation that FIGS. 14-16 illustrate employs youngest-car indicators. Such indicators may already be maintained for other purposes. For example, they may be used in evacuating special cars whose remembered-set data structures have size limits. They may also be used for evacuating objects that are reachable from such special cars. Additionally, if a given collection-set car's youngest-car indicator identifies another car in the collection set, the collector does not need to process the remembered set associated with the given car.

To make the operation of identifying candidates for collection-set expansion even more efficient, a collector may additionally maintain oldest-car indicators. The oldest-car indicators are maintained essentially in the same manner as youngest-car indicators are, although, as will be explained below, they are more likely to require updating when older cars enter the collection set and are reclaimed.

Figure 18:
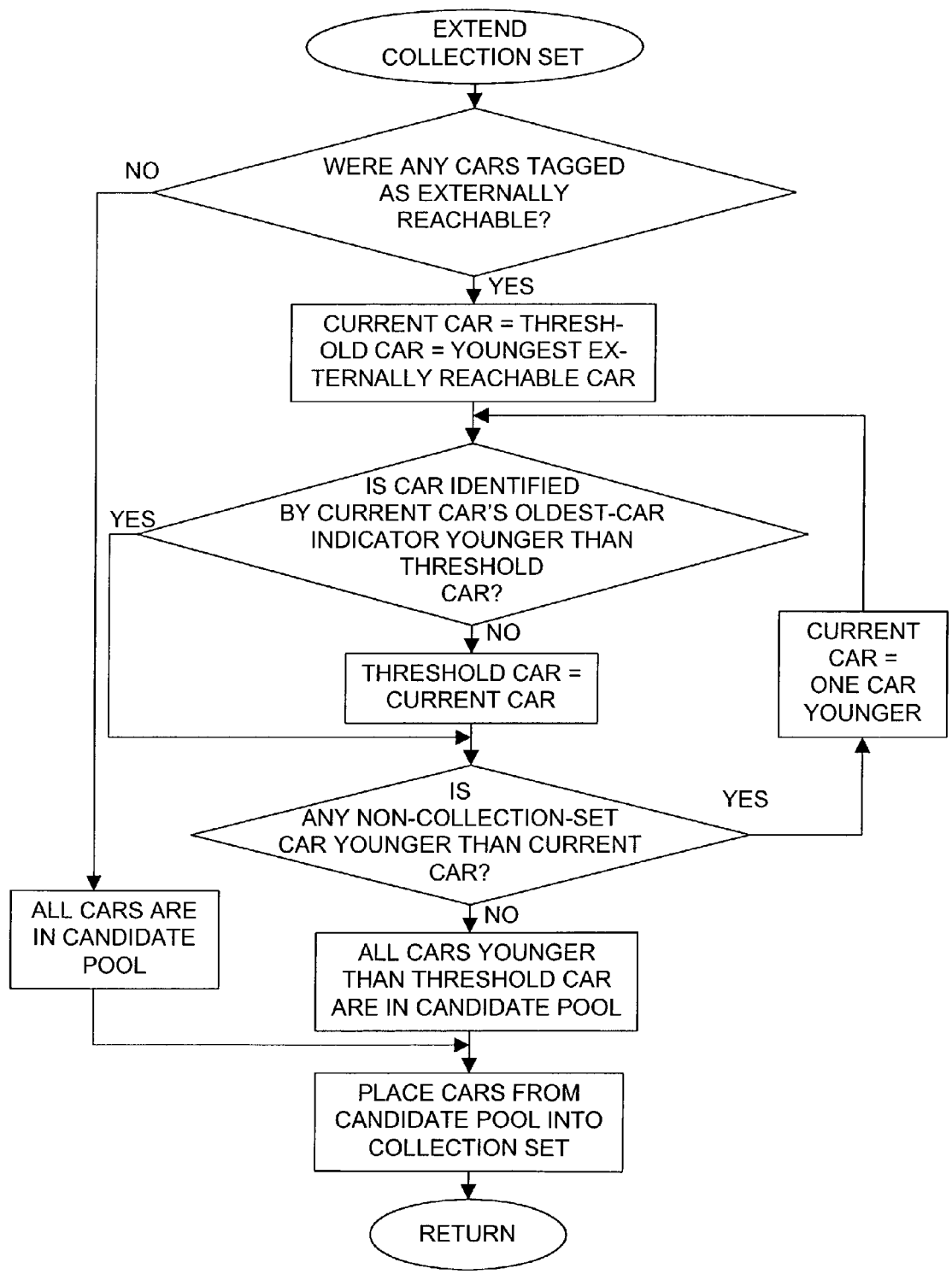
FIG. 18 is a flow chart of a routine used by another embodiment of the invention to expand the collection set.

Oldest-car indicators can be used by themselves to find a sequence of youngest dead cars in a manner essentially the same as that illustrated in FIGS. 14-16 for using youngest-car indicators to find a sequence of oldest dead cars. FIG. 18 depicts an algorithm for doing so, showing that it is the same as that of FIG. 15 except that it proceeds from the young end to the old end rather than the reverse. Oldest-car indicators are maintained in a manner similar to that in which youngest-car indicators are. If they are intended only to keep track of references in car sections older than those with which they are associated, they are preferably so initialized as to identify the associated cars. If they can instead also be used to identify younger cars, they are preferably initialized to identify the "infinity car," i.e., a fictional car younger than any real car. The value used to identify the infinity car would typically be a pointer to a metadata structure used for no real car section but containing fields indicating that it represents the youngest car.

Figure 19A:
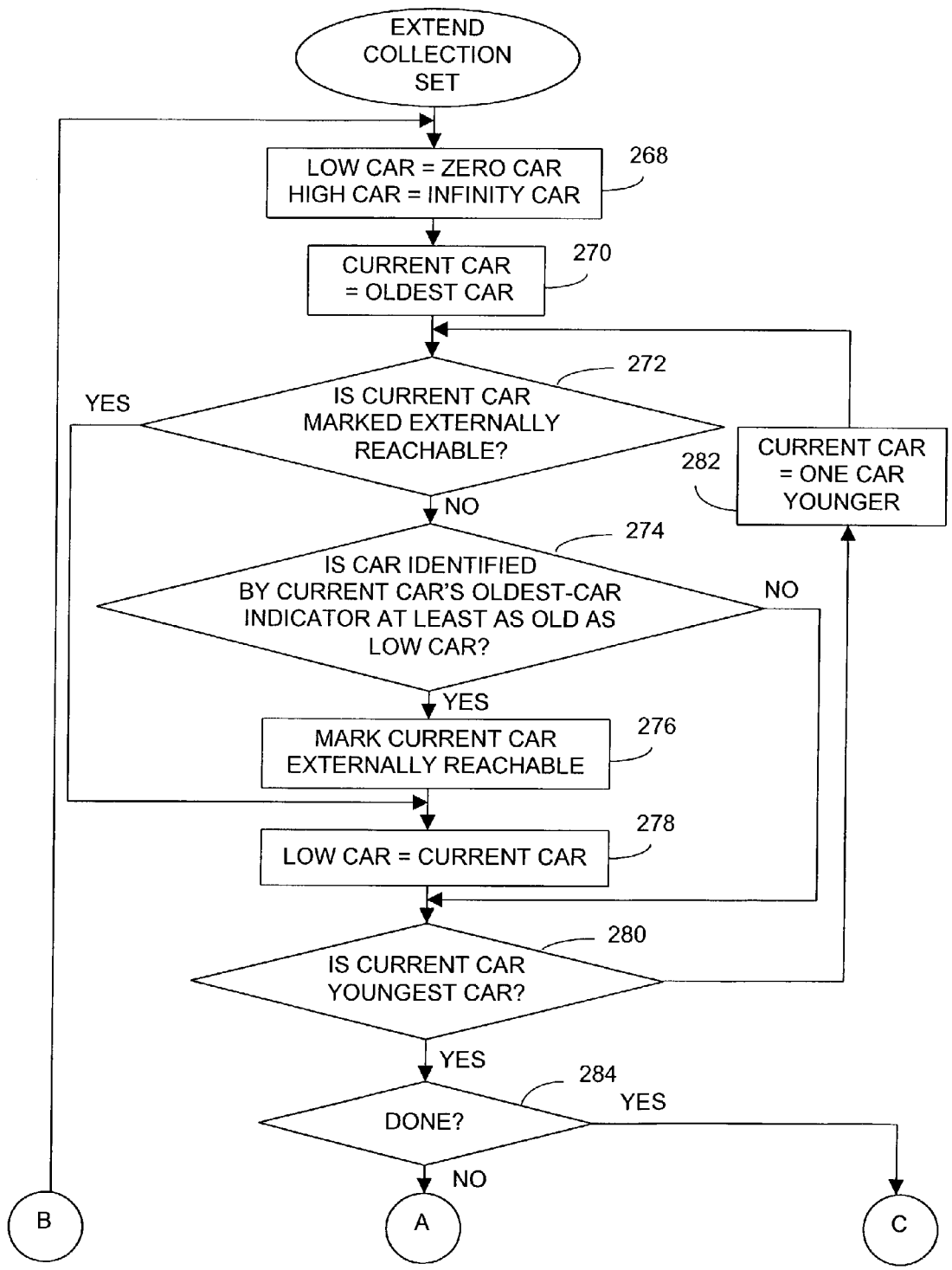
FIGS. 19A and 19B constitute a flow chart of a routine used by yet another embodiment of the invention to expand the collection set.
Figure 19B:
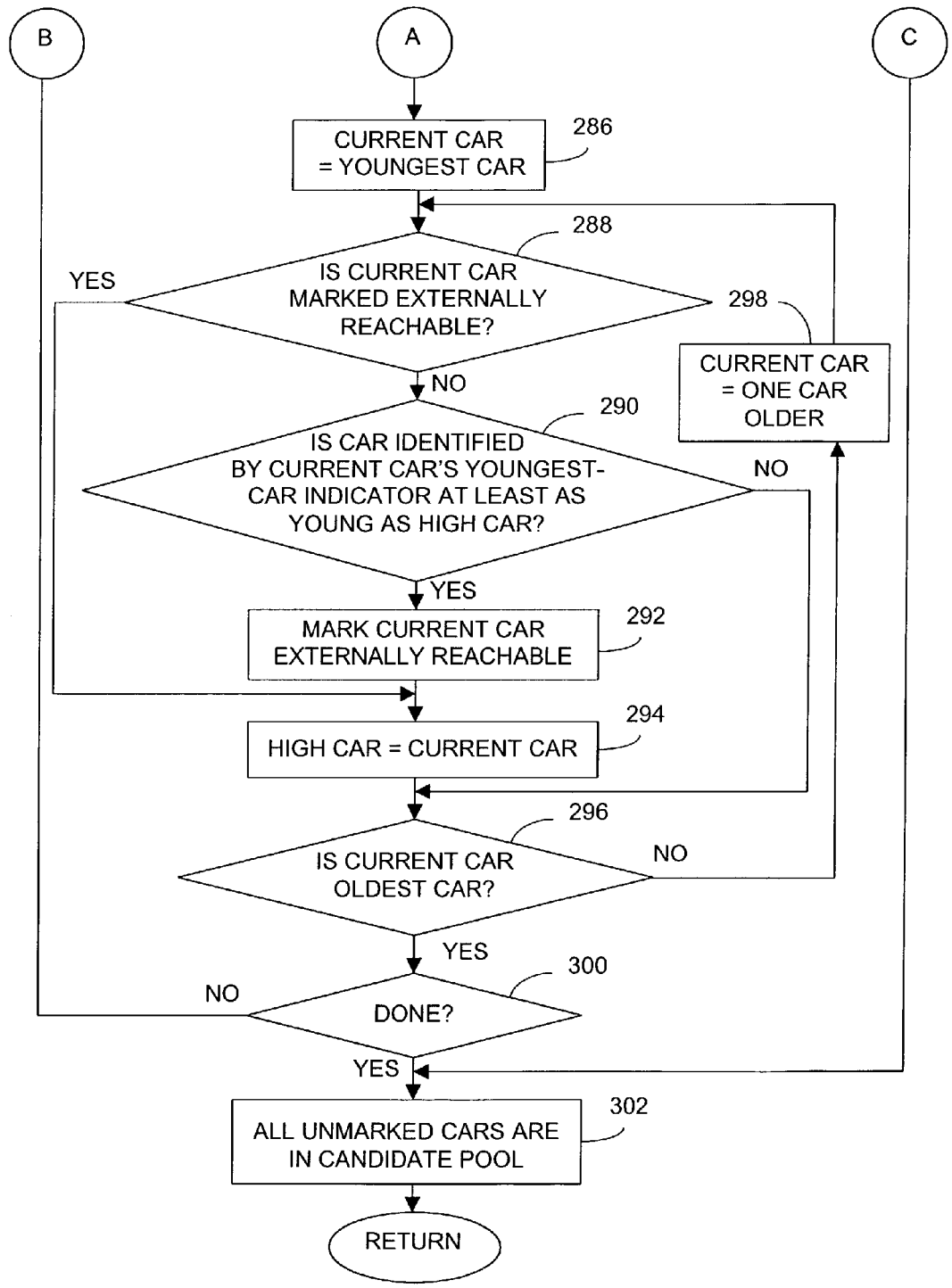

The routine of FIG. 18 can be used by itself or in addition to that of FIG. 15. But FIGS. 19A and 19B (together, "FIG. 19") illustrate a collection-set-expansion operation that can be used to employ youngest-and oldest-car indicators in concert and thereby potentially identify more garbage cars than would result from employing those indicators individually. The operation that FIG. 19 illustrates is similar in some respects to the operation that FIG. 15 illustrates. As will shortly be explained, though, the cars are not traversed in only a single pass toward the old-car direction. Instead, they are traversed repeatedly in both the young-and the old-car directions until the collector has made a pass without newly finding a potentially reachable car.

Although FIG. 19 does not show this, a test similar to that of FIG. 15's block 228 would be performed initially to determine whether the whole generation can be reclaimed. Otherwise, as FIG. 19's block 268 indicates, a double pass through the cars begins by initializing what will be called low-car and high-car values to identify the zero and infinity cars, respectively. These values' purposes will become apparent in due to course. The collector then proceeds to inspect the cars' oldest-car and youngest-car indicators in age order, proceeding toward the youngest car as it inspects the oldest-car indicators, and proceeding toward the oldest car as it considers the youngest-car indicators. The indicator set with which the collector starts is not important, but the illustrated embodiment considers the oldest-car indicators first, beginning toward the old-car end and proceeding toward the young-car end.

Block 270 represents starting with the oldest car, or at least with the oldest car identified as containing an object referred to by a reference located outside the generation. As blocks 272 and 274 indicate, if the current car has not already been marked as externally reachable, the collector determines whether the current car's oldest-car indicator identifies a car at least as old as the one that the low-car value represents. The low-car value represents the youngest car identified so far in a given pass as reachable. If the current car's oldest-car indicator indicates that the current car can be reached from a car at least as old as the car represented by the low-car value, then the collector cannot rule out the current car's reachability, so it marks that car as reachable. Block 276 represents the marking step. If the current car is thereby marked reachable—or had already been marked reachable—it becomes the youngest car identified as potentially reachable during the current pass, and the low-car value is updated to represent that fact, as block 278 indicates.

The low-car value will not be updated to represent the first-encountered car in a given pass unless that car had previously been marked as externally reachable, either because it had been marked during young-generation collection as containing an object referred to by an external reference or because it had been marked in a previous pass. Otherwise, the car represented by the low-car value remains the zero car.

As blocks 280 and 282 indicate, this operation of identifying reachable cars is repeated for successively younger cars until the collector has completed the youngest car. (Some embodiments may limit the scopes of their searches for candidate expansion cars to only some range within the car sequence. In such a case, the "youngest car" referred to in block 280 would be only the youngest car within that range, and the initial low-car and high-car values would refer to the actual cars immediately outside that range if the entire generation's actual oldest and youngest cars, respectively, are not in the range being considered.)

Figure 20:
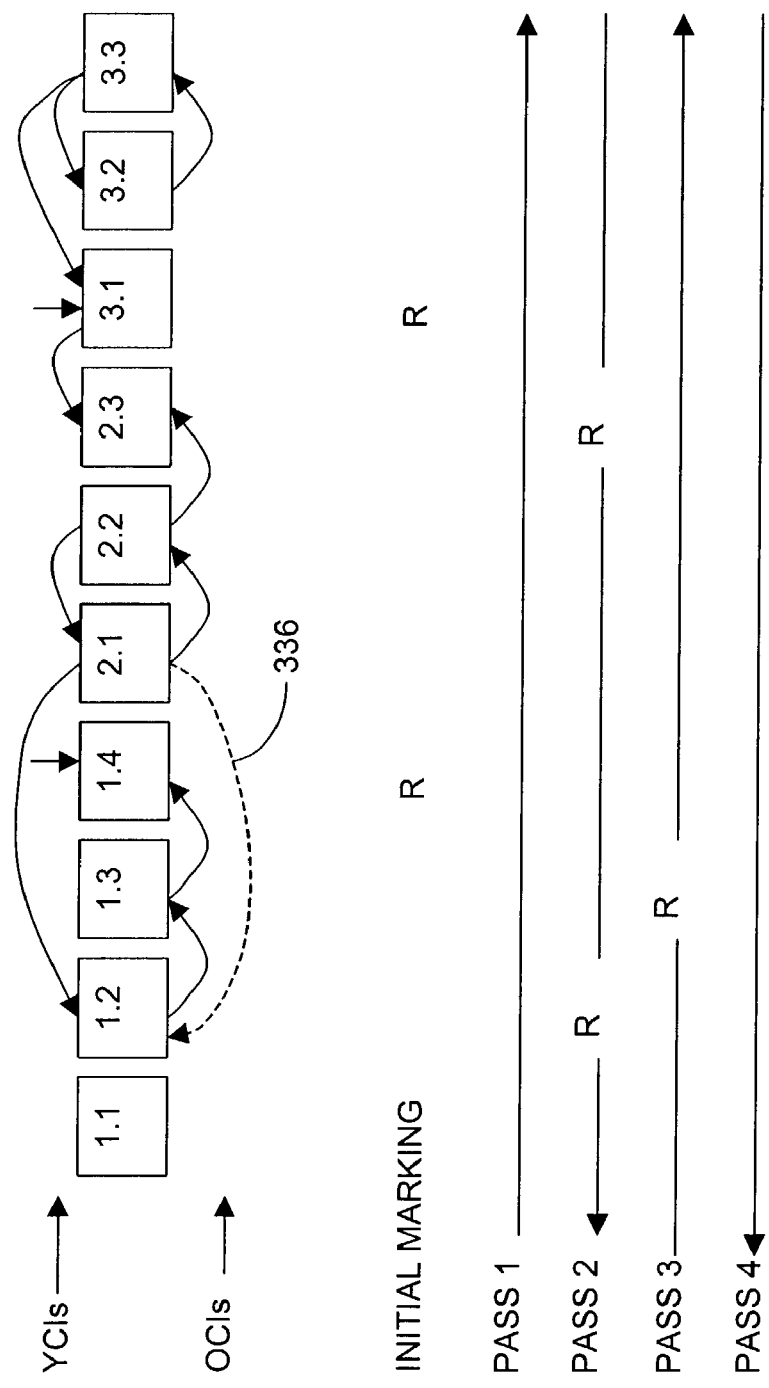
FIG. 20 is a diagram of a scenario that illustrates that routine.

To appreciate this routine's result, consider FIG. 20. The FIG. 20 diagram is similar to that of FIG. 17 in that curved arrows above the car-representing rectangles represent youngest-car indicators ("YCIs"). In addition, FIG. 20 includes curved arrows located below the rectangles, which represent oldest-car indicators ("OCIs"). The straight arrows pointing to car sections 1.4 and 3.1 represent references located outside the generation that refer to objects in car sections 1.4 and 3.1. Finally, the Rs represent reachability markings, the two Rs in the "initial marking" row representing the marks made to cars 1.4 and 3.1 in the initial marking operation to reflect the fact that they contain objects directly referred to by extra-generational references.

In the scenario that FIG. 20 depicts, the first pass through all of the cars results in no additional markings, as will now be explained. The absence of an OCI arrow pointing to car section 1.1 in FIG. 20 indicates that no older car contains a reference to an object in car 1.1, so the test represented by FIG. 19A's block 274 produces a negative result. The collector therefore neither marks that car nor changes the low-car value.

Car section 1.2's oldest-car indicator also indicates the absence of a reference from any older car, so it, too, results in no marking during the first pass. Car section 1.3's oldest-car indicator does identify an older car, namely, car 1.2, but that car has not yet been recognized as externally reachable, so consideration of car 1.3 results in no marking, either.

Car section 1.4 was already marked, in the initial-marking phase, so the collector does not mark it again. Since it has been marked, though, the collector advances the low-car value for the first pass to identify car section 1.4.

Still in the first pass, the collector next considers car section 2.1, and that car's OCI also indicates the absence of any reference into car 2.1 from an older car. Car 2.2's OCI indicates that there may be a reference from car 2.1 to its objects, but car 2.1 has not been recognized as reachable, so car 2.2 does not get marked, either. For the same reason, car section 2.3 receives no mark during the first pass.

Car 3.1 was marked before the first pass, so it is not marked again, but the low-car indicator for the first pass is updated to identify it as the youngest car identified so far in the first pass as being externally reachable. Since their oldest-car indicators indicate that no car as old as car 3.1 contains a reference to any of their objects, the collector does not mark car section 3.2 or 3.3 in the first pass as reachable, either.

With the first pass completed, the collector proceeds to a second pass. In the second pass, it will scan the cars' youngest-car indicators rather than their oldest-car indicators. Before it does so, though, it performs the test of FIG. 19A's block 284: it determines whether a further pass is necessary. The criterion for making this determination is ordinarily whether any marks were made in the previous pass. But at least one reverse pass must always be made. So, although no mark was made during the previous, first pass, the collector proceeds with its second pass, starting at the youngest-car end of the chosen range, as block 286 indicates. FIG. 19B's blocks 288, 290, 292, 294, 296, and 298 represent the collector's performing for youngest-car indicators steps equivalent to those performed in the forward pass for the oldest-car indicators.

FIG. 20's second-pass row illustrates the result of such a pass in the scenario there illustrated. There is no younger car that contains a reference to an object in car 3.3, so that car's YCI refers to car 3.3 itself. Since the high-car value represents the infinity car, i.e., a fictional car younger than any real car, inspection of car 3.3's YCI results in no marking or high-value change.

Car section 3.2's YCI indicates that no car younger than car 3.3 contains a reference to an object that car 3.2 contains. Since car 3.2 is older than the infinity car, the collector neither marks it nor changes the high-car value.

Car section 3.1 has already been marked as reachable, so inspection of its youngest-car indicator results in no marking, but the fact that is has already been marked results in the collector's setting the second pass's high-car value to identify car section 3.1 as the oldest car section so far identified as reachable during the second pass.

Car section 2.3's youngest-car indicator indicates that there may be a reference into it from a car as young as the one that the high-car indicator identifies, i.e., as young as car section 3.1. The collector therefore cannot rule out the reachability of car 2.3's objects, so it marks that car as potentially reachable. It also updates the high-car value to indicate that car section 2.3 is the oldest car identified so far in the second pass as being potentially reachable.

Similar considerations result in no marking or high-car-value updating in response to the collector's inspection of the YCIs associated with cars 2.2 and 2.1, but car 1.4 is recognized as having already been marked, so the second pass's high-car value is updated to identify car 1.4.

Inspection of car 1.3's youngest-car indicator results in no marking or high-car-value updating, but car 1.2's youngest-car indicator identifies car 2.1, which is younger than the high-car value for the current pass and thus results in car 1.2's being marked as potentially containing reachable objects. Inspection of the youngest-car indicator associated with the last car section, namely, car section 1.1, results in no further marking.

This completes the second pass. The collector then determines, as FIG. 19B's block 300 indicates, whether it needs to perform any further passes. Since it added a mark during the immediately preceding pass, a further pass is necessary, so execution returns to the step of FIG. 19A's block 268 to begin a third pass. Since car 1.2 was previously marked, the low-car value is set to identify it when it is reached during this pass. And, as FIG. 20 indicates, the third pass results in yet another mark, this time to car section 1.3, because that car section's oldest-car indicator reveals that there may be a reference to one of its objects in a car section as old as (reachable) car section 1.2.

No further cars are marked during the third pass, though, and the subsequent, fourth pass results in no marking, either. The test represented by FIG. 19B's block 300 therefore produces an affirmative result: the collector has finished identifying cars that potentially contain reachable objects. As the Rs below them in FIG. 20 indicate, the car sections thus identified are car sections 1.2, 1.3, 1.4, 2.3, and 3.1. All other cars are considered candidates for addition to the collection set, so the collector adds one or more of them to the collection set, as block 302 indicates.

In the scenario just described, additionally employing oldest-car indicators results in the identification of many more garbage cars than the use of oldest- or youngest-car indicators would have alone. If only youngest-car indicators had been employed, for example, car section 1.1 would have been the only garbage car identified. By additionally employing oldest-car indicators, the collector is able to identify five such cars.

Figure 1:
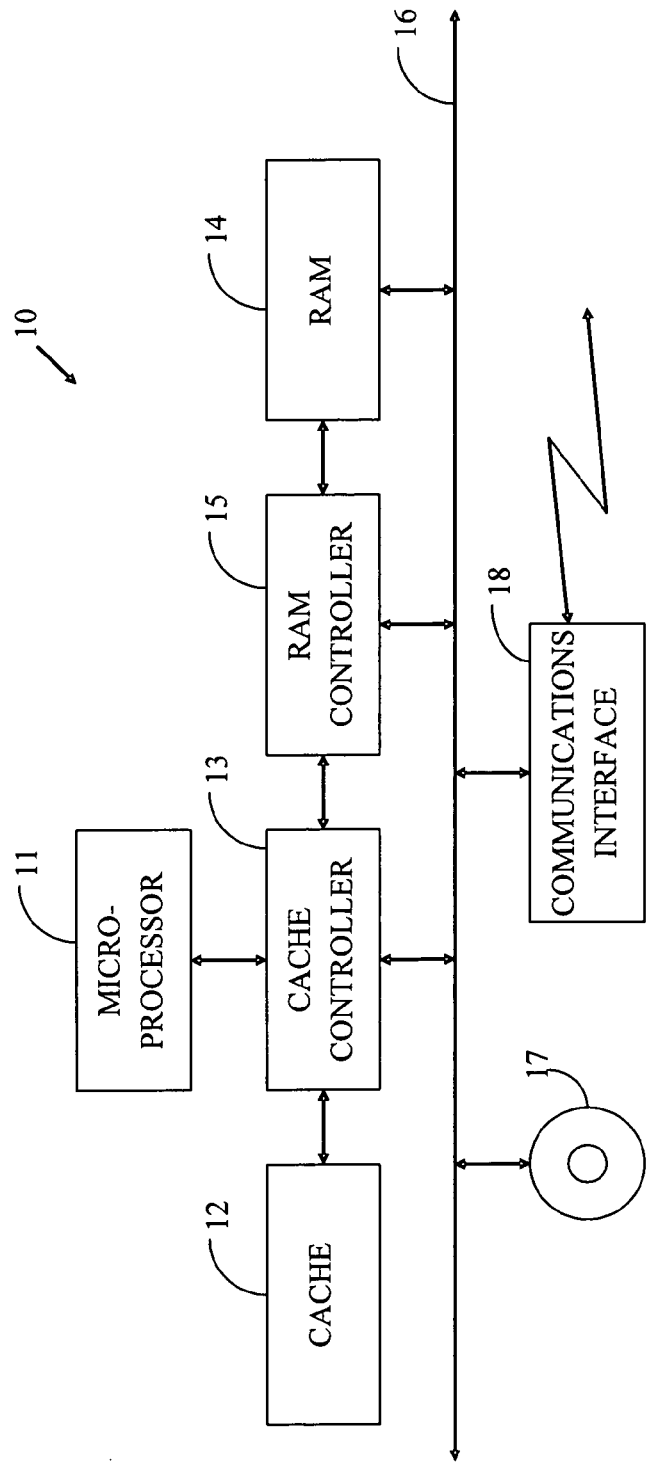
FIG. 1, discussed above, is a block diagram of a computer system in which the present invention's teachings can be practiced.
Figure 2:
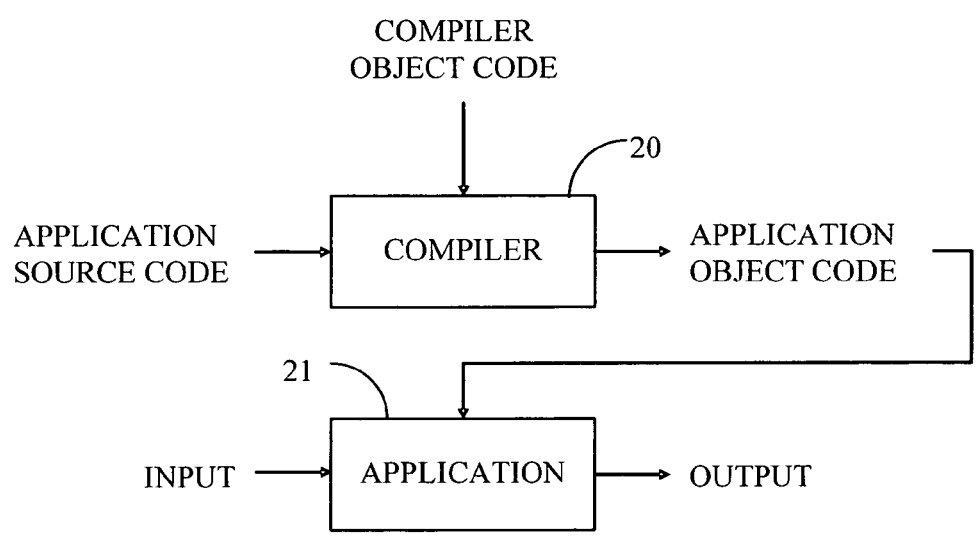
FIG. 2, discussed above, is a block diagram that illustrates a compiler's basic functions.
Figure 3:
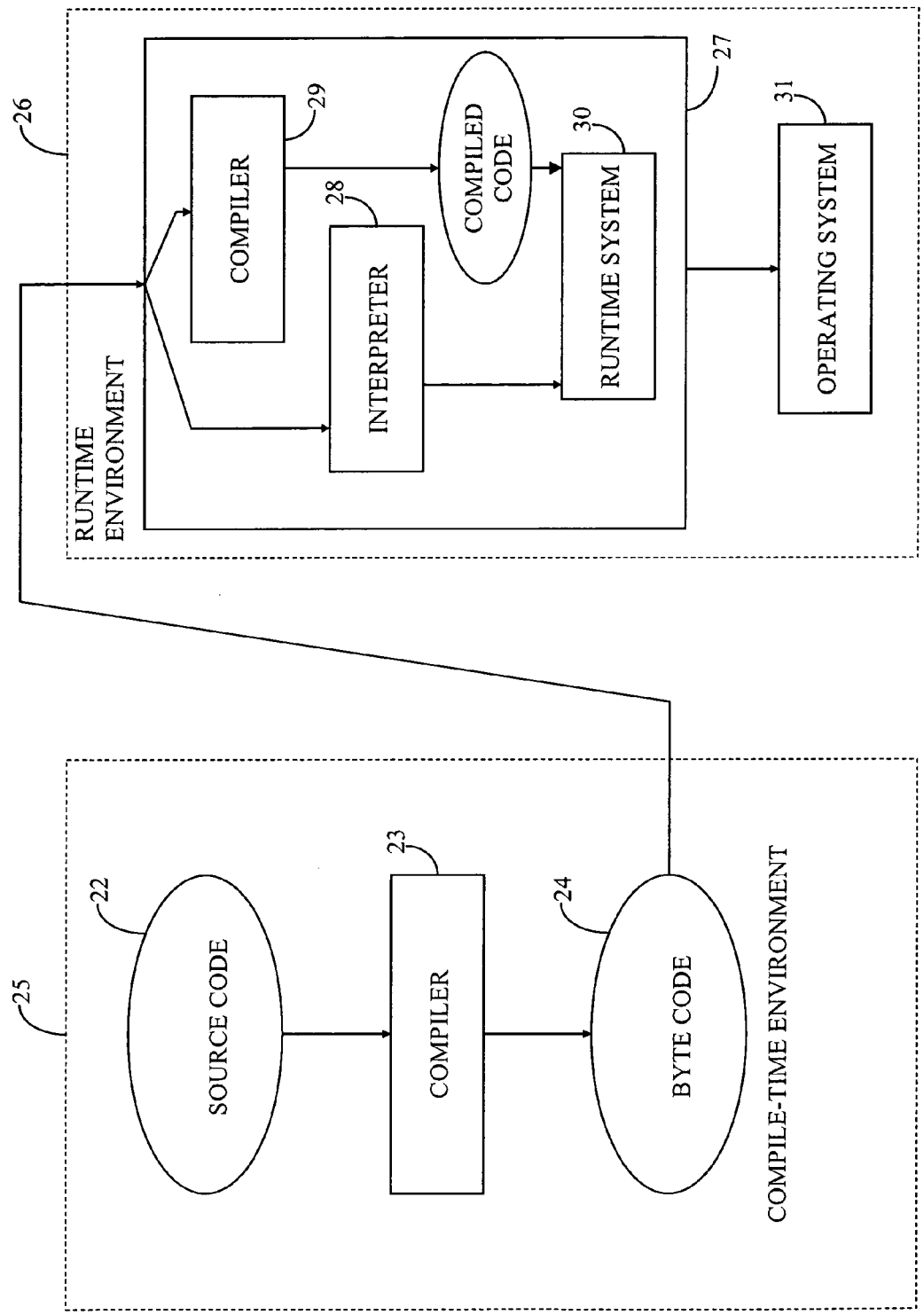
FIG. 3, discussed above, is a block diagram that illustrates a more-complicated compiler/interpreter organization.
Figure 4:
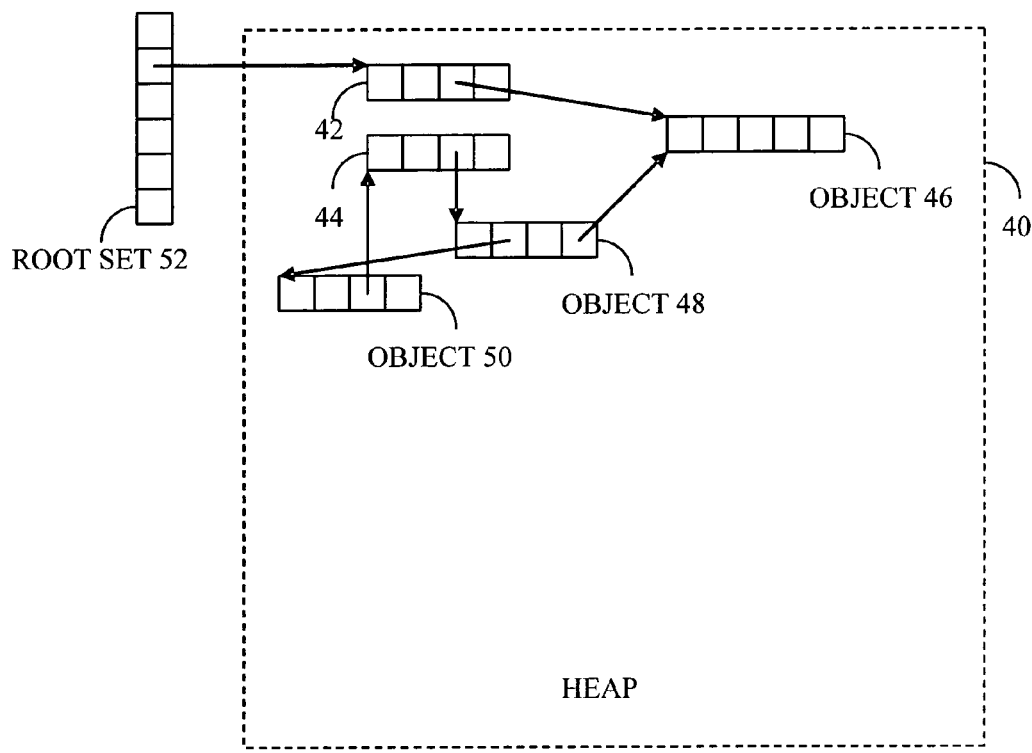
FIG. 4, discussed above, is a diagram that illustrates a basic garbage-collection mechanism.
Figure 5:
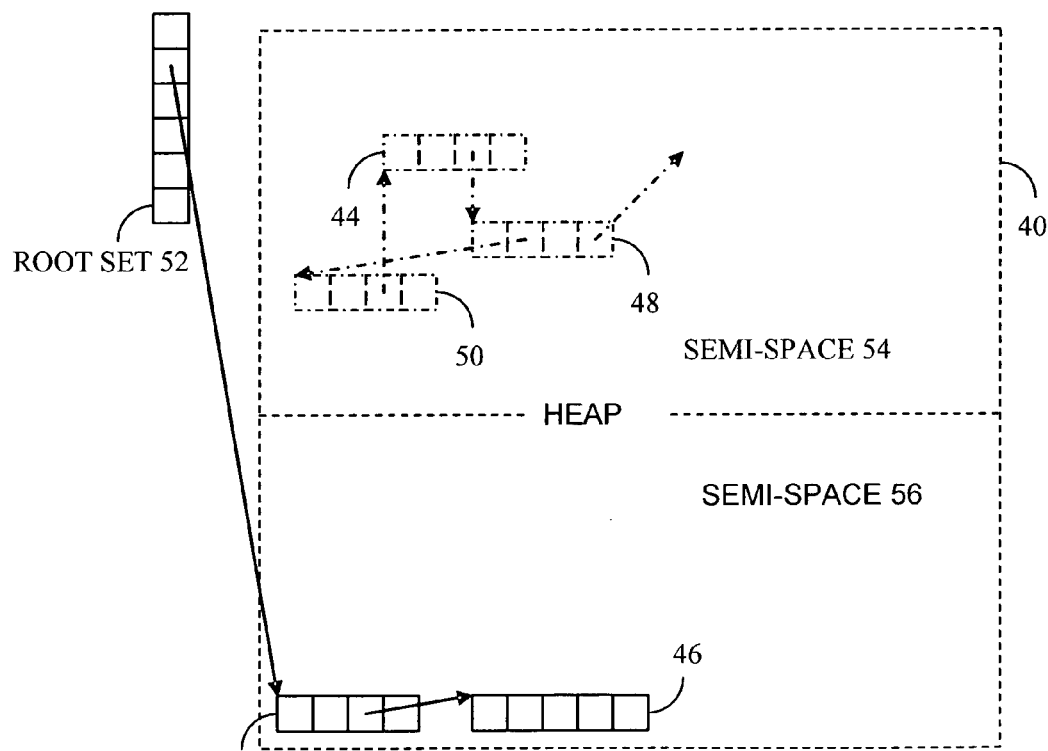
FIG. 5, discussed above, is a similar diagram illustrating that garbage-collection approach's relocation operation.
Figure 6:
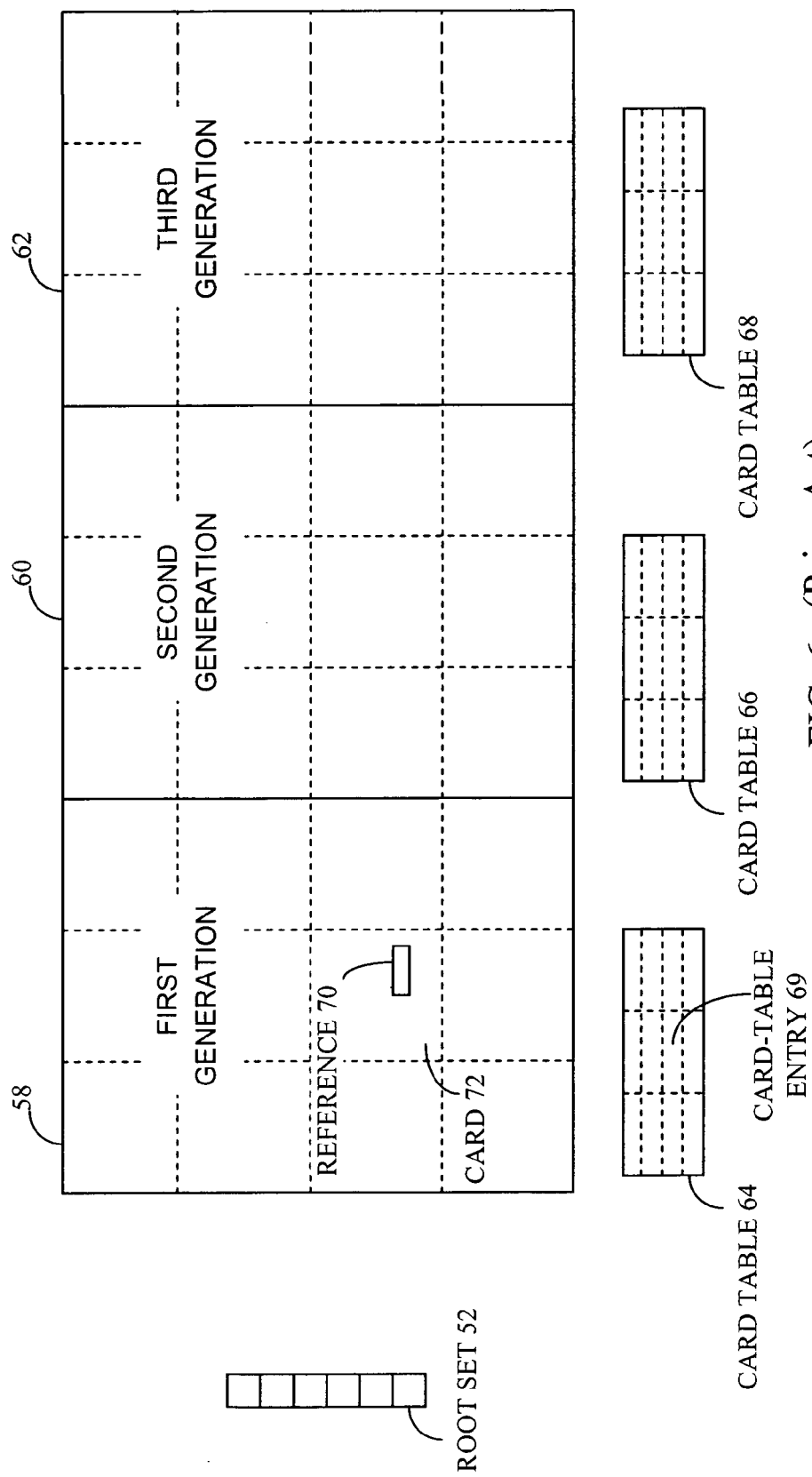
FIG. 6, discussed above, is a diagram that illustrates a garbage-collected heap's organization into generations.
Figure 7:
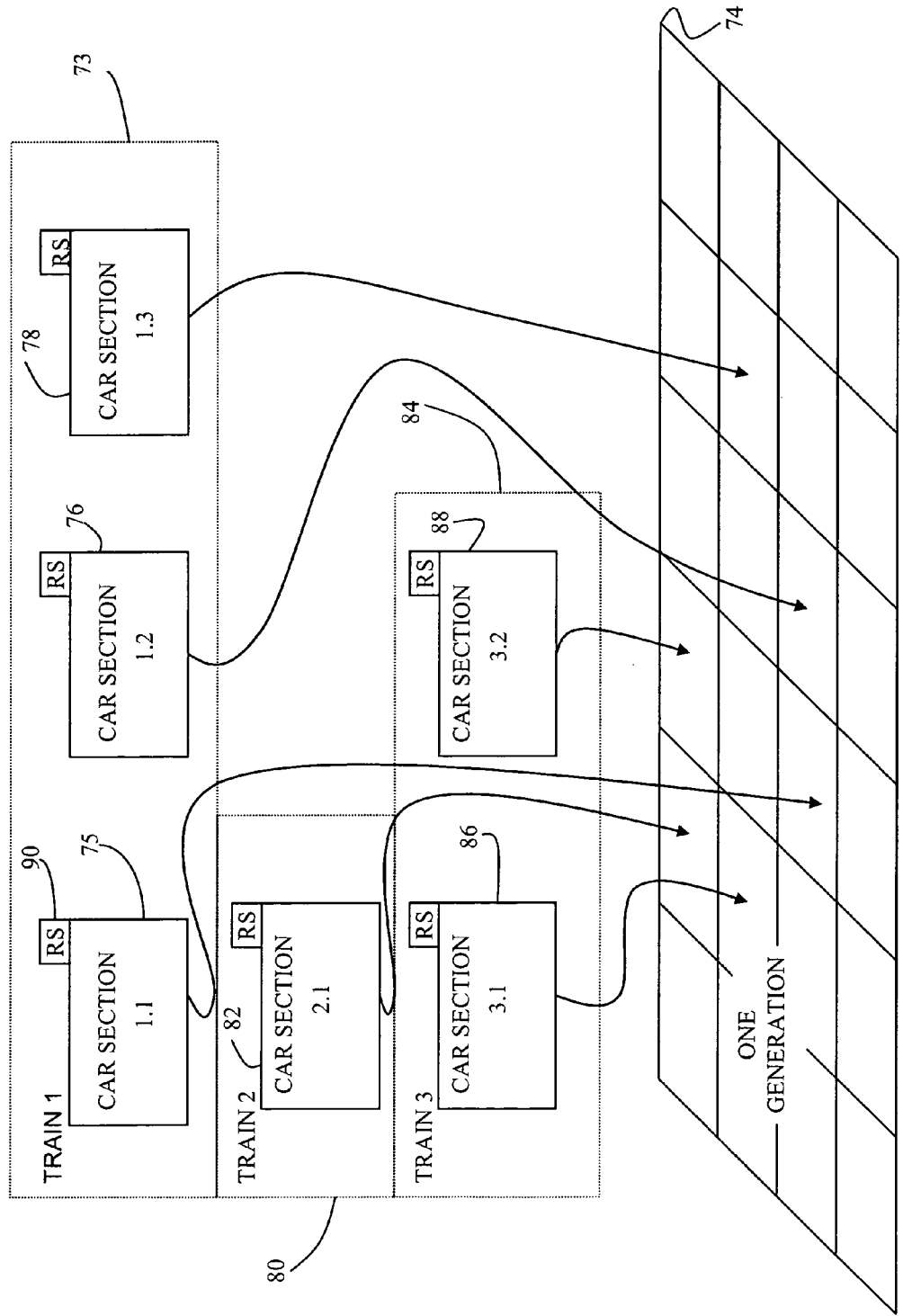
FIG. 7, discussed above, is a diagram that illustrates a generation organization employed for the train algorithm.

Now, one might question how well such an approach scales; whereas the cost of the lowest-car-indicator-only approach does not increase more than linearly with the number of object-containing cars in the generation, the cost of the operation described in FIGS. 18A and 5B could in theory increase quadratically. In practical applications, though, I have found that this approach to employing both oldest-car and youngest-car indicators usually terminates in four to eight passes.

As was mentioned above, the youngest-car indicators may be so maintained as to identify only cars younger than the ones with which they are associated, and oldest-car indicators can similarly be maintained to identify only older cars. The operation that FIGS. 18 and 19 illustrate takes advantage of only that information. But there are ways in which the collector can profitably employ the additional information that results when the oldest-car and youngest-car indicators' maintenance is not so limited.

Figure 21:
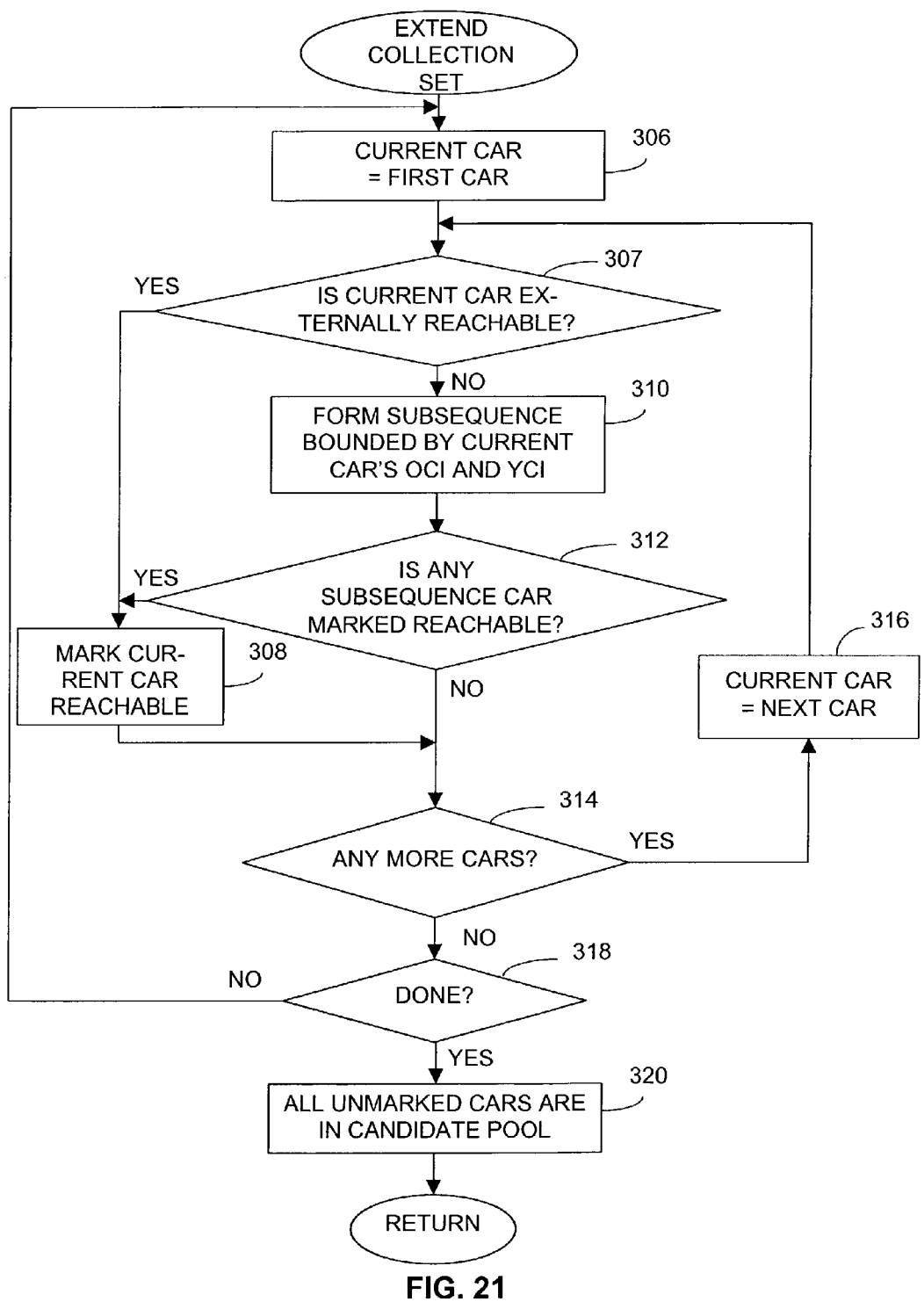
FIG. 21 is a flow chart of a routine used by another embodiment of the invention to expand the collection set.

FIG. 21 is a flow chart that illustrates one way of doing so. In the routine that FIG. 21 depicts, the collector proceeds repeatedly through all the generation's cars that are not in the collection set, or at least through a subset that is contiguous in the collection sequence. The particular order in which it processes those cars is not important, and block 306 merely represents starting with whichever car has been chosen to be processed first. Block 307 represents determining whether the current car is directly reachable by an external reference. If it is, it is marked reachable, as block 308 indicates. (Again, that marking actually may already have been done during young-generation collection if the current car is directly reachable by an internal reference.)

If test 307's outcome is negative, the collector performs block 310's operation of forming a subsequence bounded by and including the cars that the current car's oldest-car and youngest-car indicators identify. If any car in the resultant subsequence has been marked reachable (in, for instance, the external-reference processing performed during young-generation collection), the collector marks the current car reachable, too, as blocks 312 and 308 indicate. As blocks 314 and 316 indicate, this marking operation is repeated until it has been executed for each car in the sequence. At the end of such a pass through all of the cars, the collector determines whether it needs to execute another pass, as block 318 indicates. The collector needs to perform another pass if any car was marked during the previous pass. When it has performed a pass in which no further cars have been marked, any cars that remain unmarked are candidates for addition to the collection set.

Figure 22:
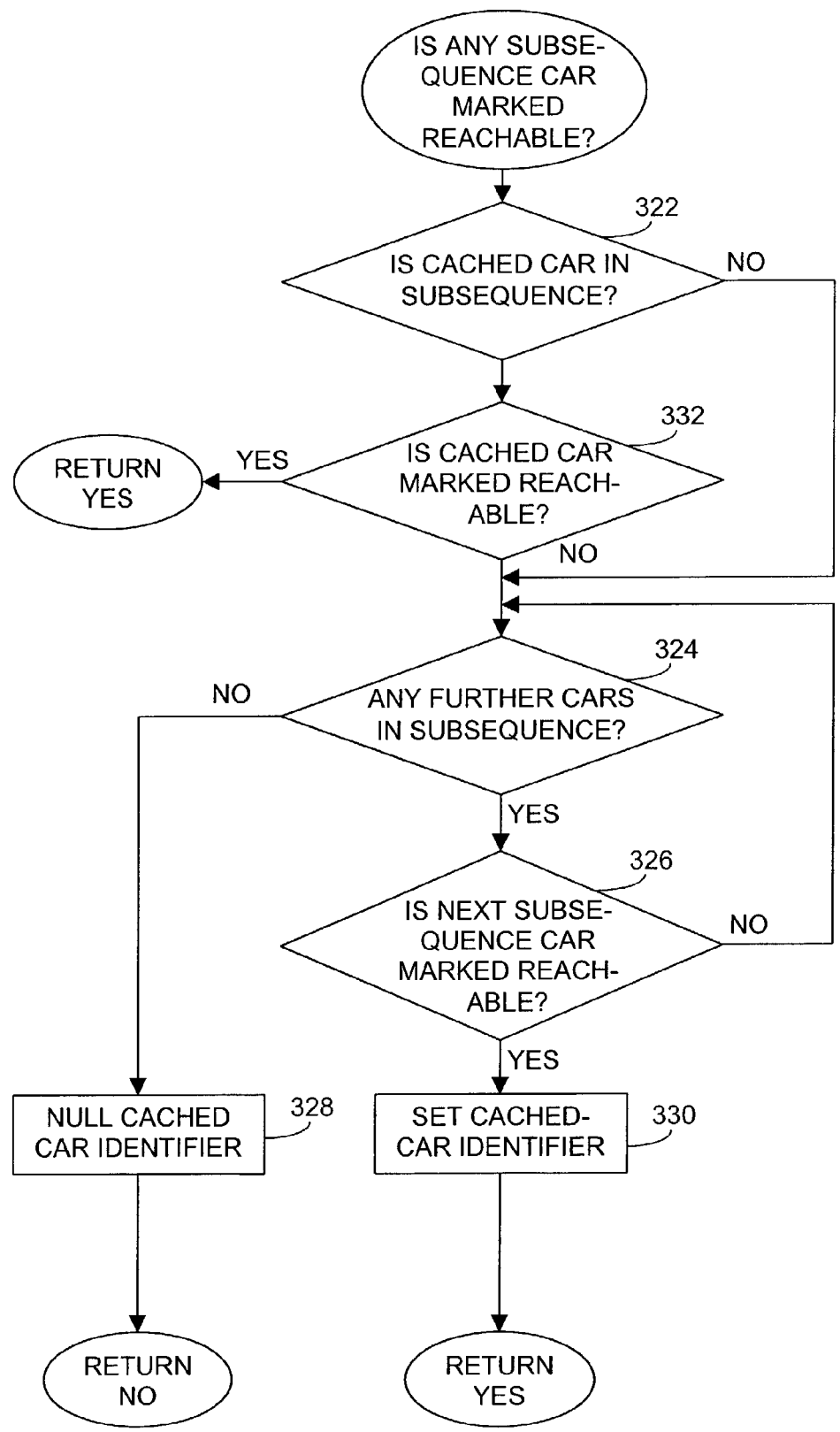
FIG. 22 is a flow chart that illustrates in more detail a way to perform one of the steps depicted in FIG. 21.

Now, it is theoretically possible for the FIG. 21 routine's cost to be on the order of cubic in the number of cars in the sequence. As a practical matter, though, expense of that order can essentially be avoided, at least after the first increment in which that routine is performed. One way of keeping that routine's cost low is to employ an optimization in which each car's metadata include a "cached-car identifier." When a given car is identified as potentially reachable because of the presence of another potentially reachable car's presence in the sequence that the given car's youngest- and oldest-car indicators define, the collector caches that other car's identity in the cached-car indicator associated with the given car. When the routine is then executed in a subsequent increment, the cached value is used to identify reachable cars quickly, as FIG. 22 illustrates.

That drawing is a flow chart depicting one way in which the determination represented by 21's block 312 can be performed. FIG. 22's block 322 represents determining whether the car whose identity was cached in the previous collection increment is still in the subsequence that the current car's youngest- and oldest-car indicators identify. If it is not, or if no such car's identity was cached, the collector checks other cars in the subsequence to determine whether any has been marked during the FIG. 21 routine's current execution, as blocks 324 and 326 indicate. As block 328 indicates, the identifier is set to identify no car if inspection of the cars in the subsequence reveals none that has been marked, i.e., if the current car is not thereby determined to be potentially reachable. Otherwise, the collector sets that identifier to identify the first subsequence car found to have been marked reachable, as block 330 indicates.

Most frequently, though, the collector will not have to consider any other cars in the subsequence. As block 332 indicates, the collector first inspects the cached car if that car is still in the current car's subsequence. As was mentioned above, the particular order in which the routine of FIG. 21 considers cars is not important. But it is best if the collector uses the same order (with accommodations for reclaimed cars) during each collection increment. If it does, the cached car, which was the first one in the current car's subsequence found to be reachable during the last collection increment, will in most cases already have been marked reachable during the current collection increment. To find that a car is potentially reachable, that is, the collector will most frequently need to consider only one other car.

To appreciate the advantage that the FIG. 21 routine's thus employing the additional information can afford, return to the FIG. 20 scenario. Recall that, according to car section 1.2's oldest-car indicator, no older car contained a reference to an object in car section 1.2, but that, according to its youngest-car indicator, a reference to one of car section 1.2's objects could be located in a car as young as car section 2.1. Since car section 2.1 is younger than car section 1.4, to which an external reference had been found, it was not possible to rule out the possibility that some object in car section 1.2 was reachable. Car section 1.2 was therefore marked reachable and excluded from the pool of candidates for addition to the collection set.

But suppose that, as dashed arrow 336 indicates, car section 1.2's oldest-car indicator additionally identified car section 2.1 as the oldest car section containing a reference to an object in car section 1.2. Although the routine of FIG. 19 employs no information concerning oldest reference-containing cars that are younger than the referred-to cars, the FIG. 21 routine does. It recognizes that the only car that possibly contains a reference to an object into car 1.2 is car 2.1. Specifically, the subsequence formed in operation 308 includes only (unmarked) car section 2.1, so car section 1.2 is not marked. And, since car section 1.2 is thereby recognized as unreachable, car section 1.3 is, too. So using the additional information in the FIG. 20 scenario results in the recognition of two additional unreachable cars.

Figure 23:
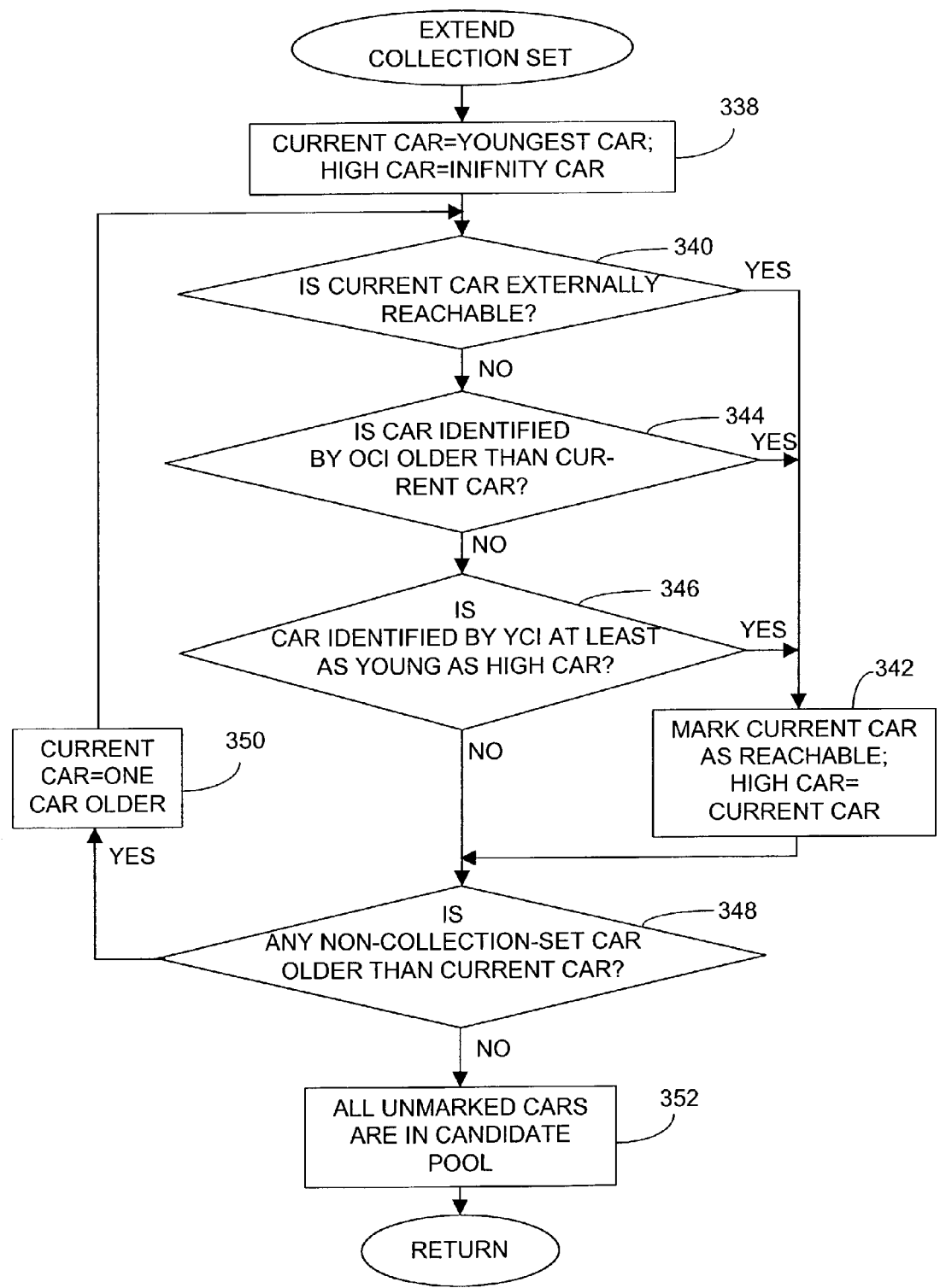
FIG. 23 is a flow chart a routine used by a further embodiment of the invention to expand the collection set.

Although the approaches just described for employing the oldest-car indicators and youngest-car indicators together to identify dead cars employ multiple passes, some of the benefit of employing both types of indicators together can be obtained in a single-pass approach, as FIG. 23 illustrates. In that drawing's example of a single-pass approach to extending the collection set, the collector begins at the youngest-car end of the car sequence, as block 338 indicates. As will be seen, it will be necessary to keep track of which is the oldest car that has so far been identified as potentially reachable. This will be called the "high car." Reachability for the purposes of this routine will be assigned only as cars are encountered in the routine's single pass through the cars. Initially, therefore, no car has yet been identified as potentially reachable. So, as block 338 also indicates, the high car is given a value representing the fictional infinity car, i.e., a car younger than any real car.

If the current car has been found to contain an object referred to by a reference located outside the generation, the car may not be dead. As blocks 340 and 342 indicate, that car is therefore marked as potentially reachable. (In practice, the step represented by block 342 may actually be superfluous; the car may have been thus marked when it was identified as been externally reachable.) Since no older car's reachability has yet been ruled out and this approach employs only one pass, the car will also be considered potentially reachable if its oldest-car indicator indicates that it is reachable from an older car. Blocks 344 and 342 together indicate that the car is marked in that case.

The collector then determines whether the current car's youngest-car indicator indicates that there may be an object in the current car that is referred to from a car as old as the high car, i.e., as the oldest car so far identified as potentially reachable. When the current car is the youngest car, of course, this determination has a negative result, but its outcome may be affirmative for other cars. Any such other car will be pronounced reachable, as blocks 346 and 342 indicate.

As blocks 348 and 350 indicate, this operation is repeated for successively older cars until all cars not in the collection set have been considered. As block 352 indicates, any cars that remain unmarked at this point can be considered dead and can be added to the collection set.

Although the routine of FIG. 23 begins at the young-car end of the sequence and proceeds toward the old-car end, one can employ essentially the same approach but begin at the old-car end by mirroring the FIG. 23 routine just as the FIG. 18 routine mirrors that of FIG. 15.

As was mentioned above, youngest- and oldest-car indicators that identify cars in the collection set must be updated when those collection-set cars are collected. One approach to updating an oldest- or youngest-car indicator associated with a given car is to scan that car's remembered set and thereby identify the oldest or youngest car that contains a location represented by one of the remembered-set entries. And this approach has its advantages. For oldest-car indicators, though, and for youngest-car indicators that do not restrict themselves to references in younger cars, this approach necessitates making remembered-set entries not only for references in younger cars but also for references in older cars. So I prefer an approach that ends up identifying fewer dead cars but does not require such large remembered sets—and can be performed more rapidly.

To understand this approach, suppose that in some generation the oldest-car indicator of a car numbered 2.5 identifies car 1.1 and that car 1.1 had been the oldest car and has now been placed into the collection set. Car 2.5's oldest-car indicator will need to be updated. Now also suppose that car section 1.2 belongs to the collection set, too, but that car 1.3 does not. Suppose further that the next-oldest car containing a reference to an object in car section 2.5 is car section 1.4. If remembered sets are not required to contain entries for references in older cars, car section 2.5's remembered set will not include an entry identifying that reference's location. The collector therefore cannot use car 2.5's remembered set in updating its oldest-car indicator; that remembered set has no entry for the car, namely, car 1.4, that will become the oldest car containing a reference into car 2.5. But the approach I prefer does not rely on the remembered sets. Instead, as will be seen, it simply replaces car 2.5's oldest-car indicator with a value that identifies car 1.3, which is the next-oldest car outside the collection set.

This value is not optimum, but it is acceptable. It is acceptable because it indicates that no car older than car 1.3 contains a reference to an object in car 2.5, and this indication is true. It is not optimum, because car 1.3 does not contain a reference into car 2.3, either, so it may not enable the collector to recognize as many dead cars as it would if it identified car section 1.4. But this approach can be far less expensive than an update approach that includes maintaining a larger remembered set and scanning it.

Figure 24A:
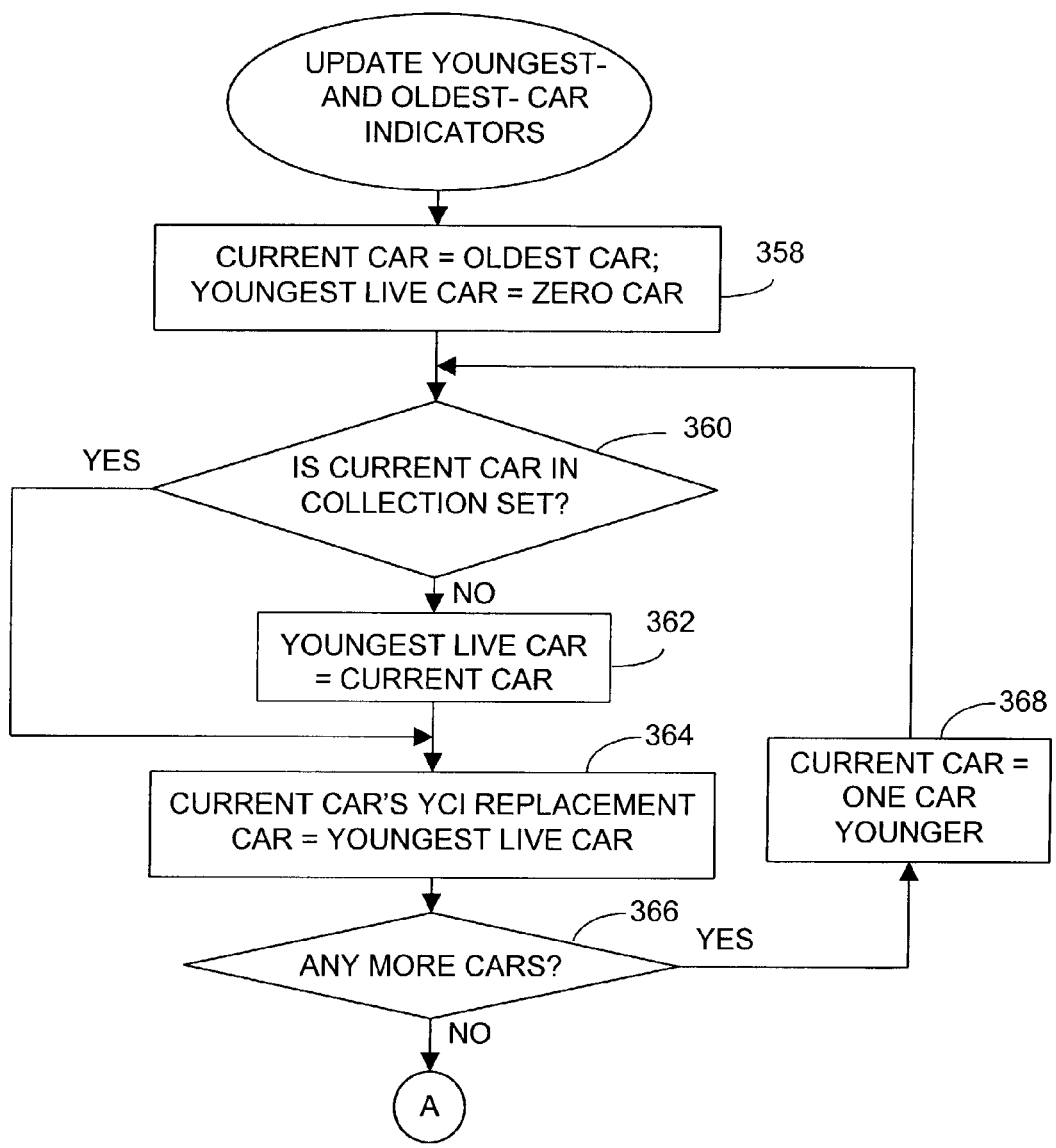
FIGS. 24A, 24B, and 24C together constitute a flow chart for updating oldest- and youngest-car indicators.
Figure 24B:
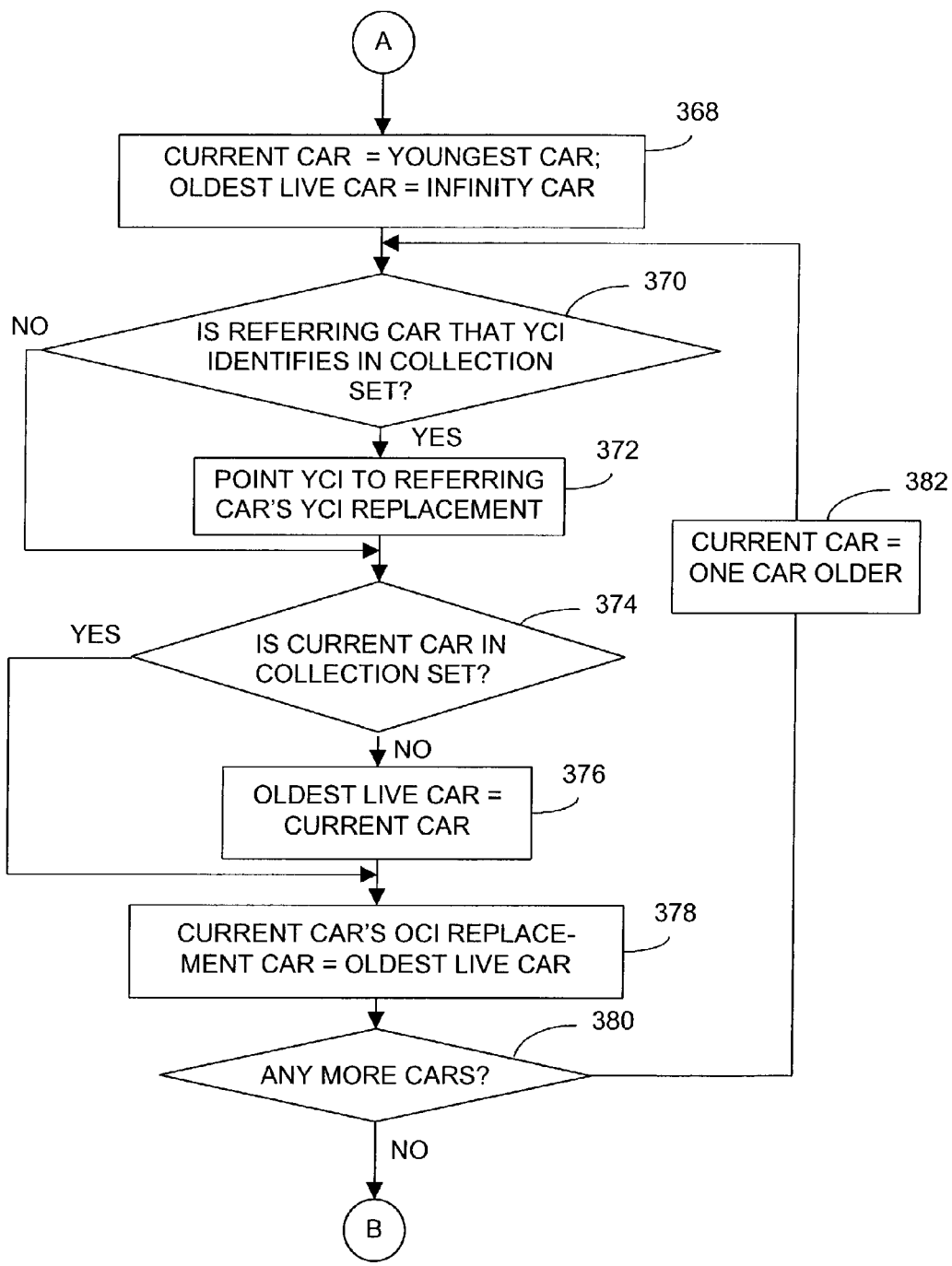
Figure 24C:
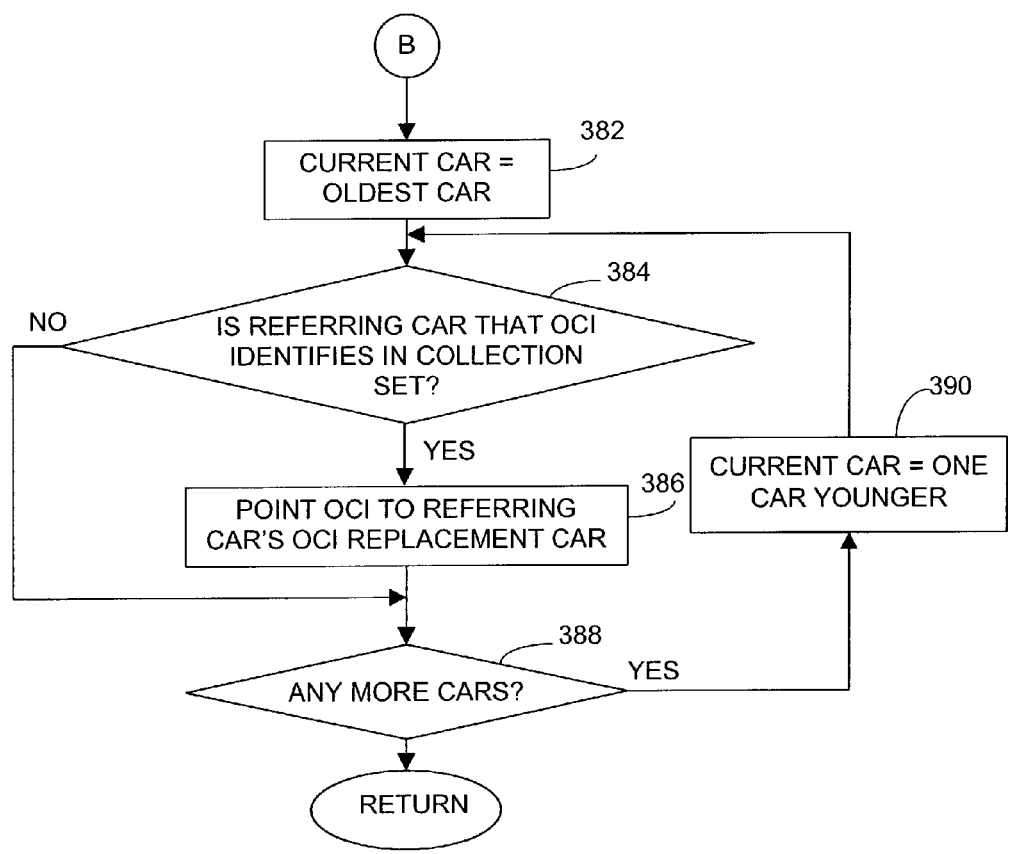

As will also become apparent, the operation that FIGS. 24A, 24B, and 24C (together, "FIG. 24") illustrates not only implements this approach for updating oldest-car indicators but in at least some circumstances also implements a similar approach for youngest-car indicators. Now, updates of youngest-car indicators that point into the collection set present no problem when the collection set consists only of the erstwhile oldest cars; such a youngest-car indicator is simply set to the default value—i.e., made to identify the zero car or the car with which that indicator is associated—in order to indicate the absence of references into the associated cars.

As was explained above, though, the collector may select for inclusion in the collection set one or more cars that are actually younger than cars that have not been included. If one of the older, unincluded cars contains a reference into a car whose youngest-car indicator identifies a younger car selected for inclusion in the collection set, then a reference outside the collection set remains that refers to an object in the car with which the youngest-car indicator is associated. In contrast to the situation in which the collection set consists exclusively of the oldest cars, therefore, the youngest-car indicator in this situation cannot be set to the default value. So, for those situations at least, youngest-car indicators are updated in a manner similar to that employed for oldest-car indicators.

We now turn to FIG. 24 to consider an implementation of this update approach, which may, for instance be performed immediately after the collection set has been expanded, as FIG. 13's blocks 208 indicates. As FIG. 24's block 358 indicates, the collector begins with the oldest car. In this routine, that includes the oldest car in the collection set, so the initial current car is typically in the collection set. In subsequent passes the then-current car may not be, though. If not, the collector remembers it as the youngest "live" (non-collection-set) car encountered so far during the operation, as blocks 360 and 362 indicate. Independently of whether the current car is in the collection set, the collector then associates with it an identifier of the youngest live car encountered so far. For reasons that will become apparent in due course, the car that this value identifies is referred to in block 364 as the "YCI replacement car." If, as is typical, the current car for the first loop is in the collection set, the youngest-live-car value identifies the zero car, as block 358 indicates, and this is the value that is associated with the first car.

As blocks 366 and 368 indicate, this operation is repeated for successively younger cars until the collector has assigned YCI replacement cars to all cars. For a car outside the collection set, the resultant YCI replacement car is the car itself. For a collection-set car, the resultant YCI replacement car is the youngest car that is outside the collection set but older than that collection-set car. In most cases this will be the fictional zero car. As was observed above, though, some cars are advanced into the collection set ahead of cars that are older than they are, so the replacement car can in some cases be a real car.

With replacement-car values thus assigned, the collector performs a second pass through the cars, this time determining whether the current car's youngest-car indicator points to a collection-set car and, if so, replacing that youngest-car indicator's value with one the points to that collection-set car's YCI replacement car. The particular order in which the collector makes this pass is not important in principle, but it is preferable in practice for the pass to be performed in the reverse order so that the collector can simultaneously be performing the first pass of an operation for updating the oldest-car indicators. FIG. 24B's block 368 therefore represents beginning with the youngest car.

Blocks 370 and 372 represent updating the current car's youngest-car indicator in the manner just described. Before proceeding to youngest-car-indicator updating for the next car, the collector assigns the current car a replacement-car value to be used for oldest-car updating, as blocks 374, 376, and 378 indicate. As block 368 indicates, an "oldest live car" value used for that purpose initially contains a value that points to the infinity car.

As blocks 380 and 382 indicate, these operations of updating youngest-car indicators and providing replacement values for oldest-car-indicator updating are repeated for all cars.

The collector then proceeds to updating oldest-car indicators. The order in which it does this is not important, but FIG. 24C's block 382 depicts it as beginning with the oldest car not in the collection set. Blocks 384 and 386 represent updating oldest-car indicators in a manner analogous to the one used for the youngest-car indicators, and blocks 388 and 390 indicate that this operation is repeated for all cars outside the collection set.

Now, FIG. 24 sets forth the version of the update operation that is most generally applicable. As was explained above, it applies even when relatively young cars have been advanced into the collection set ahead of older cars. Of course, it also applies in the more-typical case, in which such advancement has not occurred. In that case, though, the operation of updating the youngest-car indicators can be simplified even further; the pass that FIG. 24A depicts can be eliminated, because the replacement car for every car is known to be the default replacement car. In any event, a review of the FIG. 24 routine reveals that it scales well; its cost increases at most linearly with the number of object-containing cars in the generation. In contrast, the cost of approaches that, for instance, rely on scanning individual cars' remembered sets can increase as much as quadratically with the number of cars.

As the foregoing description demonstrates, the present invention's teachings enable a garbage collector to perform more-productive collection cycles. It thus constitutes a significant advance in the art.

What is claimed is:

1. A method of performing garbage collection comprising:
A) providing a computer system that includes memory and executes a mutator that modifies references in a dynamically allocated heap in the memory;
B) configuring the computer system to act as a garbage collector that collects respective collection sets in collection increments and that:
  i) treats at least a generation in the heap as divided into regions assigned a collection order from oldest to youngest;
  ii) maintains for each of a plurality of the regions a respective youngest-region indicator associated therewith, the youngest-region indicator associated with a given region identifying a region such that no region younger than the region thereby identified contains a strong reference to an object in the given region; and
  iii) during each of at least some collection increments:
    a) performs a region search by employing the youngest-region indicators to attempt to identify regions that are unreachable, at least with respect to the portion or the heap outside the collection set;
    b) if any such region is thereby identified, includes at least a portion of at least one such region in the collection set; and
    c) reclaims space occupied by unreachable objects in the collection set;
C) employing the computer system to execute the garbage collector.

2. A method as defined in claim 1 wherein the region search identifies only cars that contain no reachable objects.

3. A method as defined in claim 1 wherein the regions identified in the region search are included in the collection in preference to regions not thus identified.

4. A method as defined in claim 1 wherein the garbage collector implements the train algorithm, treating the generation as divided into car sections grouped into trains and the regions are the car sections.

5. A method as defined in claim 1 wherein the garbage collector, in response to modifications of at least some strong-references located in the generation:
D) identifies the region in which the object to which a strong reference whose modification is thereby reported refers; and
E) updates the youngest-region indicator associated with the region in which the object referred to is located if necessary to make it identify the region in which the strong reference is located if and only if the region in which the strong reference is located is younger than:
  i) the region identified by that youngest-region indicator; and
  ii) the region in which the object referred to is located.

6. A method as defined in claim 5 wherein, if no reference to a given region has been found in the generation outside the given region, the youngest-region indicator associated with the given region identifies the region itself.

7. A method as defined in claim 1 wherein the garbage collector, in response to modifications of at least some strong-references located in the generation:
D) identifies the region in which the object to which a strong reference whose modification is thereby reported refers; and
E) updates the youngest-region indicator associated with the region in which the object referred to is located, if necessary to make it identify the region in which the strong reference is located, if the region in which the strong reference is located is younger than the region identified by that youngest-region indicator, even if the region in which the strong reference is located is not at young as the region in which the object referred to is located.

8. A method as defined in claim 7 wherein the garbage collector:
F) maintains metadata structures, associated with respective regions, that contain order information specifying the collection order, as well as a fictional-region metadata structure associate with a fictional region, which specifies that the fictional region is older than any other region;
G) maintains for each of a plurality of the regions a youngest-region indicator that is associated with that region and identifies one said region by identifying the metadata structure associated therewith; and
H) if no strong reference to any object in a given region has been found in the generation outside the given region, causes the youngest-region indicator associated with the given region to identify the fictional-region metadata structure.

9. A method as defined in claim 1 wherein:
D) the garbage collector maintains a said youngest-region indicator at least for each said region outside the collection set that is older than the oldest region that contains an object directly referred to by a strong reference located outside the generation; and
E) the region search includes:
  i) marking as reachable at least the oldest region that contains an object directly referred to by a strong reference located outside the generation;
  ii) marking each region outside the collection set that is older than, and whose youngest-region indicator identifies a region at least as young as, the oldest region theretofore marked reachable; and
  iii) identifying as unreachable any region outside the collection set that is older than the oldest marked region and remains unmarked.

10. A method as defined in claim 1 wherein the garbage collector additionally:
D) maintains for each of a plurality of the regions a respective oldest-region indicator associated therewith, the oldest-region indicator associated with a given region identifying a region such that no region older than the region thereby identified contains a strong reference to an object in the given region; and
E) during each of at least some collection increments:
  i) employs the oldest-region indicators to attempt to identify regions that are unreachable, at least with respect to the portion or the heap outside the collection set; and
  ii) if any regions that contain no reachable objects are thereby identified, includes at least a portion of at least one such region in the collection set.

11. A method as defined in claim 10 wherein:
F) the garbage collector maintains a respective youngest-region indicator and oldest-region indicator at least for each said region in a sequence thereof uninterrupted in the collection order; and
G) the region search includes:
  i) marking as reachable each of the regions in the sequence that contains an object directly referred to by a strong reference located outside the generation;
  ii) processing in collection order each region in the sequence by marking that region as reachable unless its youngest-region indicator identifies no region younger than that region and its oldest region indicator identifies a region younger than the youngest older region previously marked as reachable; and
  iii) identifying as unreachable any region thus processed that remains unmarked.

12. A method as defined in claim 10 wherein:
F) the garbage collector maintains a respective youngest-region indicator and oldest-region indicator at least for each said region in a sequence thereof uninterrupted in the collection order; and
G) the region search includes:
  i) marking as reachable each of the regions in the sequence that contains an object directly referred to by a strong reference located outside the generation;
  ii) processing in reverse collection order each region in the sequence by marking that region as reachable unless its oldest-region indicator identifies no region older than that region and its youngest-region indicator identifies a region older than the oldest younger region previously marked as reachable; and
  iii) identifying as unreachable any region thus processed that remains unmarked.

13. A method as defined in claim 10 wherein:
F) the garbage collector maintains a respective youngest-region indicator and oldest-region indicator at least for each said region in a sequence thereof uninterrupted in the collection order; and
G) the region search includes:
  i) marking as reachable each region in the sequence that contains an object directly referred to by a strong reference located outside the generation;
  ii) marking each region in the sequence whose youngest-region indicator identifies a region at least as young as a marked younger region and each region in the plurality thereof whose oldest-region indicator identifies a region at least as old as a marked older region; and
H) identifying as unreachable any region in the sequence that remains unmarked.

14. A method as defined in claim 10 wherein:
F) the garbage collector maintains a respective youngest-region indicator and oldest-region indicator at least for each said region in a sequence thereof uninterrupted in the collection order; and
G) the region search includes:
  i) marking as reachable each region in the sequence that contains an object directly referred to by a strong reference located outside the generation;
  ii) associating with each region in the sequence the subsequence of regions that includes and is bordered in the collection sequence by the regions identified by that region's oldest- and youngest-region indicators;
  iii) marking each region with which the subsequence thereby associated includes a marked region; and
  iv) identifying as unreachable any region in the sequence that remains unmarked.

15. A method of performing garbage collection comprising:
A) providing a computer system that includes memory and executes a mutator that modifies references in a dynamically allocated heap in the memory;
B) configuring the computer system to act as a garbage collector that collects respective collection sets in collection increments and that:
  i) treats at least a generation of the heap as divided into regions assigned a collection order from oldest to youngest;
  ii) maintains for each of a plurality of the regions a respective oldest-region indicator associated therewith, the oldest-region indicator associated with a given region identifying a region such that no region older than the region thereby identified contains a strong reference to an object in the given region; and
  iii) during each of at least some collection increments:
    a) performs a region search by employing the oldest-region indicators to attempt to identify regions that are unreachable, at least with respect to the portion or the heap outside the collection set;
    b) if any regions that contain no reachable objects are thereby identified, includes at least a portion of at least one such region in the collection set; and
    c) reclaims space occupied by unreachable objects in the collection set;

C) employing the computer system to execute the garbage collector.

16. A method as defined in claim 15 wherein the region search identifies only cars that contain no reachable objects.

17. A method as defined in claim 15 wherein the regions identified in the region search are included in the collection in preference to regions not thus identified.

18. A method as defined in claim 15 wherein the garbage collector implements the train algorithm, treating the generation as divided into car sections grouped into trains and the regions are the car sections.

19. A method as defined in claim 15 wherein the garbage collector, in response to modifications of at least some strong-references located in the generation:
   D) identifies the region in which the object to which a strong reference whose modification is thereby reported refers; and
   E) updates the oldest-region indicator associated with the region in which the object referred to is located if necessary to make it identify the region in which the strong reference is located if and only if the region in which the strong reference is located is older than:
      i) the region identified by that oldest-region indicator; and
      ii) the region in which the object referred to is located.

20. A method as defined in claim 19 wherein if no reference to a given region has been found in the generation outside the given region, the oldest-region indicator associated with the given region identifies the region itself.

21. A method as defined in claim 15 wherein the garbage collector, in response to each of at least some write barriers that report strong-reference modifications:
   D) identifies the region in which the object to which a strong reference whose modification is thereby reported refers; and
   E) updates the oldest-region indicator associated with the region in which the object referred to is located, if necessary to make it identify the region in which the strong reference is located, if the region in which the strong reference is located is older than the region identified by that oldest-region indicator, even if the region in which the strong reference is located is not at old as the region in which the object referred to is located.

22. A method as defined in claim 21 wherein the garbage collector:
   F) maintains metadata structures, associated with respective regions, that contain order information specifying the collection order, as well as a fictional-region metadata structure associate with a fictional region, which specifies that the fictional region is younger than any other region;
   G) maintains for each of a plurality of the regions an oldest-region indicator that is associated with that region and identifies one said region by identifying the metadata structure associated therewith; and
   H) if no strong reference to any object in a given region has been found in the generation outside the given region, causes the oldest-region indicator associated with the given region to identify the fictional-region metadata structure.

23. A computer system comprising:
   A) processor circuitry operable to execute processor instructions; and
   B) memory circuitry, to which the processor circuitry is responsive, that contains processor instructions readable by the processor circuitry to configure the computer system as a garbage collector that:
      i) treats at least a generation of a garbage collected heap in the memory as divided into regions assigned a collection order from oldest to youngest;
      ii) maintains for each of a plurality of the regions a respective youngest-region indicator associated therewith, the youngest-region indicator associated with a given region identifying a region such that no region younger than the region thereby identified contains a strong reference to an object in the given region; and
      iii) during each of at least some collection increments:
         a) performs a region search by employing the youngest-region indicators to attempt to identify regions that are unreachable, at least with respect to the portion or the heap outside the collection set;
         b) if any such region is thereby identified, includes at least a portion of at least one such region in the collection set; and
   C) reclaims space occupied by unreachable objects in the collection set.

24. A computer system as defined in claim 23 wherein the region search identifies only cars that contain no reachable objects.

25. A computer system as defined in claim 23 wherein the regions identified in the region search are included in the collection in preference to regions not thus identified.

26. A computer system as defined in claim 23 wherein the garbage collector implements the train algorithm, treating the generation as divided into car sections grouped into trains and the regions are the car sections.

27. A computer system as defined in claim 23 wherein the garbage collector, in response to modifications of at least some strong-references located in the generation:
   D) identifies the region in which the object to which a strong reference whose modification is thereby reported refers; and
   E) updates the youngest-region indicator associated with the region in which the object referred to is located if necessary to make it identify the region in which the strong reference is located if and only if the region in which the strong reference is located is younger than:
      i) the region identified by that youngest-region indicator; and
      ii) the region in which the object referred to is located.

28. A computer system as defined in claim 27 wherein, if no reference to a given region has been found in the generation outside the given region, the youngest-region indicator associated with the given region identifies the region itself.

29. A computer system as defined in claim 23 wherein the garbage collector, in response to modifications of at least some strong-references located in the generation:
   D) identifies the region in which the object to which a strong reference whose modification is thereby reported refers; and
   E) updates the youngest-region indicator associated with the region in which the object referred to is located, if necessary to make it identify the region in which the strong reference is located, if the region in which the strong reference is located is younger than the region identified by that youngest-region indicator, even if the region in which the strong reference is located is not at young as the region in which the object referred to is located.

30. A computer system as defined in claim 29 wherein the garbage collector:
F) maintains metadata structures, associated with respective regions, that contain order information specifying the collection order, as well as a fictional-region metadata structure associate with a fictional region, which specifies that the fictional region is older than any other region;
G) maintains for each of a plurality of the regions a youngest-region indicator that is associated with that region and identifies one said region by identifying the metadata structure associated therewith; and
H) if no strong reference to any object in a given region has been found in the generation outside the given region, causes the youngest-region indicator associated with the given region to identify the fictional-region metadata structure.

31. A computer system as defined in claim 23 wherein:
D) the garbage collector maintains a said youngest-region indicator at least for each said region outside the collection set that is older than the oldest region that contains an object directly referred to by a strong reference located outside the generation; and
E) the region search includes:
 i) marking as reachable at least the oldest region that contains an object directly referred to by a strong reference located outside the generation;
 ii) marking each region outside the collection set that is older than, and whose youngest-region indicator identifies a region at least as young as, the oldest region theretofore marked reachable; and
 iii) identifying as unreachable any region outside the collection set that is older than the oldest marked region and remains unmarked.

32. A computer system as defined in claim 23 wherein the garbage collector additionally:
D) maintains for each of a plurality of the regions a respective oldest-region indicator associated therewith, the oldest-region indicator associated with a given region identifying a region such that no region older than the region thereby identified contains a strong reference to an object in the given region; and
E) during each of at least some collection increments:
 i) employs the oldest-region indicators to attempt to identify regions that are unreachable, at least with respect to the portion or the heap outside the collection set; and
 ii) if any regions that contain no reachable objects are thereby identified, includes at least a portion of at least one such region in the collection set.

33. A computer system as defined in claim 32 wherein:
F) the garbage collector maintains a respective youngest-region indicator and oldest-region indicator at least for each said region in a sequence thereof uninterrupted in the collection order; and
G) the region search includes:
 i) marking as reachable each of the regions in the sequence that contains an object directly referred to by a strong reference located outside the generation;
 ii) processing in collection order each region in the sequence by marking that region as reachable unless its youngest-region indicator identifies no region younger than that region and its oldest-region indicator identifies a region younger than the youngest older region previously marked as reachable; and
 iii) identifying as unreachable any region thus processed that remains unmarked.

34. A computer system as defined in claim 32 wherein:
F) the garbage collector maintains a respective youngest-region indicator and oldest-region indicator at least for each said region in a sequence thereof uninterrupted in the collection order; and
G) the region search includes:
 i) marking as reachable each of the regions in the sequence that contains an object directly referred to by a strong reference located outside the generation;
 ii) processing in reverse collection order each region in the sequence by marking that region as reachable unless its oldest-region indicator identifies no region older than that region and its youngest-region indicator identifies a region older than the oldest younger region previously marked as reachable; and
 iii) identifying as unreachable any region thus processed that remains unmarked.

35. A computer system as defined in claim 32 wherein:
F) the garbage collector maintains a respective youngest-region indicator and oldest-region indicator at least for each said region in a sequence thereof uninterrupted in the collection order; and
G) the region search includes:
 i) marking as reachable each region in the sequence that contains an object directly referred to by a strong reference located outside the generation;
 ii) marking each region in the sequence whose youngest-region indicator identifies a region at least as young as a marked younger region and each region in the plurality thereof whose oldest-region indicator identifies a region at least as old as a marked older region; and
H) identifying as unreachable any region in the sequence that remains unmarked.

36. A computer system as defined in claim 32 wherein:
F) the garbage collector maintains a respective youngest-region indicator and oldest-region indicator at least for each said region in a sequence thereof uninterrupted in the collection order; and
G) the region search includes:
 i) marking as reachable each region in the sequence that contains an object directly referred to by a strong reference located outside the generation;
 ii) associating with each region in the sequence the subsequence of regions that includes and is bordered in the collection sequence by the regions identified by that region's oldest- and youngest-region indicators;
 iii) marking each region with which the subsequence thereby associated includes a marked region; and
 iv) identifying as unreachable any region in the sequence that remains unmarked.

37. A computer system comprising:
A) processor circuitry operable to execute processor instructions; and
B) memory circuitry, to which the processor circuitry is responsive, that contains processor instructions readable by the processor circuitry to configure the computer system as a garbage collector that:
 i) treats at least a generation of a garbage collected heap in the memory as divided into regions assigned a collection order from oldest to youngest;
 ii) maintains for each of a plurality of the regions a respective oldest-region indicator associated therewith, the oldest-region indicator associated with a given region identifying a region such that no region older than the region thereby identified contains a strong reference to an object in the given region; and iii) during each of at least some collection increments:

a) performs a region search by employing the oldest-region indicators to attempt to identify regions that are unreachable, at least with respect to the portion or the heap outside the collection set;

b) if any regions that contain no reachable objects are thereby identified, includes at least a portion of at least one such region in the collection set; and C) reclaims space occupied by unreachable objects in the collection set.

38. A computer system as defined in claim 37 wherein the region search identifies only cars that contain no reachable objects.

39. A computer system as defined in claim 37 wherein the regions identified in the region search are included in the collection in preference to regions not thus identified.

40. A computer system as defined in claim 37 wherein the garbage collector implements the train algorithm, treating the generation as divided into car sections grouped into trains and the regions are the car sections.

41. A computer system as defined in claim 37 wherein the garbage collector, in response to modifications of at least some strong-references located in the generation:

D) identifies the region in which the object to which a strong reference whose modification is thereby reported refers; and E) updates the oldest-region indicator associated with the region in which the object referred to is located if necessary to make it identify the region in which the strong reference is located if and only if the region in which the strong reference is located is older than:

i) the region identified by that oldest-region indicator; and ii) the region in which the object referred to is located.

42. A computer system as defined in claim 41 wherein if no reference to a given region has been found in the generation outside the given region, the oldest-region indicator associated with the given region identifies the region itself.

43. A computer system as defined in claim 37 wherein the garbage collector, in response to each of at least some write barriers that report strong-reference modifications:

D) identifies the region in which the object to which a strong reference whose modification is thereby reported refers; and E) updates the oldest-region indicator associated with the region in which the object referred to is located, if necessary to make it identify the region in which the strong reference is located, if the region in which the strong reference is located is older than the region identified by that oldest-region indicator, even if the region in which the strong reference is located is not at old as the region in which the object referred to is located.

44. A computer system as defined in claim 43 wherein the garbage collector:

F) maintains metadata structures, associated with respective regions, that contain order information specifying the collection order, as well as a fictional-region metadata structure associate with a fictional region, which specifies that the fictional region is younger than any other region;

G) maintains for each of a plurality of the regions an oldest-region indicator that is associated with that region and identifies one said region by identifying the metadata structure associated therewith; and H) if no strong reference to any object in a given region has been found in the generation outside the given region, causes the oldest-region indicator associated with the given region to identify the fictional-region metadata structure.

45. A storage medium containing instructions readable by a computer system that includes memory to configure the computer to operate as a garbage collector that:

A) treats at least a generation of a garbage collected heap in the computer system's memory as divided into regions assigned a collection order from oldest to youngest;

B) maintains for each of a plurality of the regions a respective youngest-region indicator associated therewith, the youngest-region indicator associated with a given region identifying a region such that no region younger than the region thereby identified contains a strong reference to an object in the given region; and C) during each of at least some collection increments:

i) performs a region search by employing the youngest-region indicators to attempt to identify regions that are unreachable, at least with respect to the portion or the heap outside the collection set;

ii) if any such region is thereby identified, includes at least a portion of at least one such region in the collection set; and D) reclaims space occupied by unreachable objects in the collection set.

46. A storage medium as defined in claim 45 wherein the region search identifies only cars that contain no reachable objects.

47. A storage medium as defined in claim 45 wherein the regions identified in the region search are included in the collection in preference to regions not thus identified.

48. A storage medium as defined in claim 45 wherein the garbage collector implements the train algorithm, treating the generation as divided into car sections grouped into trains and the regions are the car sections.

49. A storage medium as defined in claim 45 wherein the garbage collector, in response to modifications of at least some strong-references located in the generation:

E) identifies the region in which the object to which a strong reference whose modification is thereby reported refers; and F) updates the youngest-region indicator associated with the region in which the object referred to is located if necessary to make it identify the region in which the strong reference is located if and only if the region in which the strong reference is located is younger than:

i) the region identified by that youngest-region indicator; and ii) the region in which the object referred to is located.

50. A storage medium as defined in claim 49 wherein, if no reference to a given region has been found in the generation outside the given region, the youngest-region indicator associated with the given region identifies the region itself.

51. A storage medium as defined in claim 45 wherein the garbage collector, in response to modifications of at least some strong-references located in the generation:

E) identifies the region in which the object to which a strong reference whose modification is thereby reported refers; and F) updates the youngest-region indicator associated with the region in which the object referred to is located, if necessary to make it identify the region in which the strong reference is located, if the region in which the strong reference is located is younger than the region identified by that youngest-region indicator, even if the region in which the strong reference is located is not as young as the region in which the object referred to is located.

52. A storage medium as defined in claim 51 wherein the garbage collector:
G) maintains metadata structures, associated with respective regions, that contain order information specifying the collection order, as well as a fictional-region metadata structure associate with a fictional region, which specifies that the fictional region is older than any other region;
H) maintains for each of a plurality of the regions a youngest-region indicator that is associated with that region and identifies one said region by identifying the metadata structure associated therewith; and
I) if no strong reference to any object in a given region has been found in the generation outside the given region, causes the youngest-region indicator associated with the given region to identify the fictional-region metadata structure.

53. A storage medium as defined in claim 45 wherein:
E) the garbage collector maintains a said youngest-region indicator at least for each said region outside the collection set that is older than the oldest region that contains an object directly referred to by a strong reference located outside the generation; and
F) the region search includes:
i) marking as reachable at least the oldest region that contains an object directly referred to by a strong reference located outside the generation;
ii) marking each region outside the collection set that is older than, and whose youngest-region indicator identifies a region at least as young as, the oldest region theretofore marked reachable; and iii) identifying as unreachable any region outside the collection set that is older than the oldest marked region and remains unmarked.

54. A storage medium as defined in claim 45 wherein the garbage collector additionally:
E) maintains for each of a plurality of the regions a respective oldest-region indicator associated therewith, the oldest-region indicator associated with a given region identifying a region such that no region older than the region thereby identified contains a strong reference to an object in the given region; and
F) during each of at least some collection increments:
i) employs the oldest-region indicators to attempt to identify regions that are unreachable, at least with respect to the portion or the heap outside the collection set; and
ii) if any regions that contain no reachable objects are thereby identified, includes at least a portion of at least one such region in the collection set.

55. A storage medium as defined in claim 54 wherein:
G) the garbage collector maintains a respective youngest-region indicator and oldest-region indicator at least for each said region in a sequence thereof uninterrupted in the collection order; and
H) the region search includes:
i) marking as reachable each of the regions in the sequence that contains an object directly referred to by a strong reference located outside the generation;
ii) processing in collection order each region in the sequence by marking that region as reachable unless its youngest-region indicator identifies no region younger than that region and its oldest-region indicator identifies a region younger than the youngest older region previously marked as reachable; and
iii) identifying as unreachable any region thus processed that remains unmarked.

56. A storage medium as defined in claim 54 wherein:
G) the garbage collector maintains a respective youngest-region indicator and oldest-region indicator at least for each said region in a sequence thereof uninterrupted in the collection order; and
H) the region search includes:
i) marking as reachable each of the regions in the sequence that contains an object directly referred to by a strong reference located outside the generation;
ii) processing in reverse collection order each region in the sequence by marking that region as reachable unless its oldest-region indicator identifies no region older than that region and its youngest-region indicator identifies a region older than the oldest younger region previously marked as reachable; and
iii) identifying as unreachable any region thus processed that remains unmarked.

57. A storage medium as defined in claim 54 wherein:
G) the garbage collector maintains a respective youngest-region indicator and oldest-region indicator at least for each said region in a sequence thereof uninterrupted in the collection order; and
H) the region search includes:
i) marking as reachable each region in the sequence that contains an object directly referred to by a strong reference located outside the generation;
ii) marking each region in the sequence whose youngest-region indicator identifies a region at least as young as a marked younger region and each region in the plurality thereof whose oldest-region indicator identifies a region at least as old as a marked older region; and
I) identifying as unreachable any region in the sequence that remains unmarked.

58. A storage medium as defined in claim 54 wherein:
G) the garbage collector maintains a respective youngest-region indicator and oldest-region indicator at least for each said region in a sequence thereof uninterrupted in the collection order; and
H) the region search includes:
i) marking as reachable each region in the sequence that contains an object directly referred to by a strong reference located outside the generation;
ii) associating with each region in the sequence the subsequence of regions that includes and is bordered in the collection sequence by the regions identified by that region's oldest- and youngest-region indicators;
iii) marking each region with which the subsequence thereby associated includes a marked region; and
iv) identifying as unreachable any region in the sequence that remains unmarked.

59. A storage medium containing instructions readable by a computer system that includes memory to configure the computer to operate as a garbage collector that:
A) treats at least a generation of a garbage collected heap in the computer system's memory as divided into regions assigned a collection order from oldest to youngest;

B) maintains for each of a plurality of the regions a respective oldest-region indicator associated therewith, the oldest-region indicator associated with a given region identifying a region such that no region older than the region thereby identified contains a strong reference to an object in the given region; and C) during each of at least some collection increments:
  i) performs a region search by employing the oldest-region indicators to attempt to identify regions that are unreachable, at least with respect to the portion or the heap outside the collection set;
  ii) if any regions that contain no reachable objects are thereby identified, includes at least a portion of at least one such region in the collection set; and D) reclaims space occupied by unreachable objects in the collection set.

60. A storage medium as defined in claim 59 wherein the region search identifies only cars that contain no reachable objects.

61. A storage medium as defined in claim 59 wherein the regions identified in the region search are included in the collection in preference to regions not thus identified.

62. A storage medium as defined in claim 59 wherein the garbage collector implements the train algorithm, treating the generation as divided into car sections grouped into trains and the regions are the car sections.

63. A storage medium as defined in claim 59 wherein the garbage collector, in response to modifications of at least some strong-references located in the generation: E) identifies the region in which the object to which a strong reference whose modification is thereby reported refers; and F) updates the oldest-region indicator associated with the region in which the object referred to is located if necessary to make it identify the region in which the strong reference is located if and only if the region in which the strong reference is located is older than: i) the region identified by that oldest-region indicator; and ii) the region in which the object referred to is located.

64. A storage medium as defined in claim 63 wherein if no reference to a given region has been found in the generation outside the given region, the oldest-region indicator associated with the given region identifies the region itself.

65. A storage medium as defined in claim 59 wherein the garbage collector, in response to each of at least some write barriers that report strong-reference modifications:
  E) identifies the region in which the object to which a strong reference whose modification is thereby reported refers; and
  F) updates the oldest-region indicator associated with the region in which the object referred to is located, if necessary to make it identify the region in which the strong reference is located, if the region in which the strong reference is located is older than the region identified by that oldest-region indicator, even if the region in which the strong reference is located is not at old as the region in which the object referred to is located.

66. A storage medium as defined in claim 65 wherein the garbage collector:
  G) maintains metadata structures, associated with respective regions, that contain order information specifying the collection order, as well as a fictional-region metadata structure associate with a fictional region, which specifies that the fictional region is younger than any other region;
  H) maintains for each of a plurality of the regions an oldest-region indicator that is associated with that region and identifies one said region by identifying the metadata structure associated therewith; and
  I) if no strong reference to any object in a given region has been found in the generation outside the given region, causes the oldest-region indicator associated with the given region to identify the fictional-region metadata structure.

67. A garbage collector operating in the memory of a computer comprising:
  A) means for treating at least a generation of a garbage collected heap in a computer system's memory as divided into regions assigned a collection order from oldest to youngest;
  B) means for maintaining for each of a plurality of the regions a respective youngest-region indicator associated therewith, the youngest-region indicator associated with a given region identifying a region such that no region younger than the region thereby identified contains a strong reference to an object in the given region; and
  C) means for, during each of at least some collection increments:
    i) performing a region search by employing the youngest-region indicators to attempt to identify regions that are unreachable, at least with respect to the portion or the heap outside the collection set;
    ii) if any such region is thereby identified, including at least a portion of at least one such region in the collection set; and
    iii) reclaiming space occupied by unreachable objects in the collection set.

68. A garbage collector operating in the memory of a computer comprising:
  A) means for treating at least a generation of a garbage collected heap in a computer system's memory as divided into regions assigned a collection order from oldest to youngest;
  B) means for maintaining for each of a plurality of the regions a respective oldest-region indicator associated therewith, the oldest-region indicator associated with a given region identifying a region such that no region older than the region thereby identified contains a strong reference to an object in the given region; and
  C) means for, during each of at least some collection increments:
    i) performing a region search by employing the oldest-region indicators to attempt to identify regions that are unreachable, at least with respect to the portion or the heap outside the collection set;
    ii) if any regions that contain no reachable objects are thereby identified, including at least a portion of at least one such region in the collection set; and
    iii) reclaiming space occupied by unreachable objects in the collection set.

* * * * *